US012652434B2

(12) United States Patent　　(10) Patent No.:　US 12,652,434 B2
Jiao et al.　　　　　　　　　　　　(45) Date of Patent:　　Jun. 9, 2026

(54) ELECTRONIC DEVICE, CONTENTS SEARCHING SYSTEM AND SEARCHING METHOD THEREOF

(71) Applicant: SAMSUNG ELECTRONICS CO., LTD., Suwon-si (KR)

(72) Inventors: Jingjun Jiao, Beijing (CN); Chengwei Zhou, Beijing (CN); Yanlong Sun, Beijing (CN); Wei Li, Beijing (CN); Zhezhu Jin, Beijing (CN); Yingying Jiang, Beijing (CN); Lanlan Zhang, Beijing (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 126 days.

(21) Appl. No.: 17/891,840

(22) Filed: Aug. 19, 2022

(65) Prior Publication Data

US 2022/0417590 A1　　Dec. 29, 2022

Related U.S. Application Data

(63) Continuation of application No. PCT/KR2021/002117, filed on Feb. 19, 2021.

(30) Foreign Application Priority Data

Feb. 20, 2020　(CN) ......................... 202010125545.0
Aug. 14, 2020　(CN) ......................... 202010820606.5

(51) Int. Cl.
　H04N 21/44　　　(2011.01)
　G06T 7/246　　　(2017.01)
　　　　　(Continued)

(52) U.S. Cl.
　CPC ....... H04N 21/44008 (2013.01); G06T 7/246 (2017.01); G06V 10/28 (2022.01);
　　　　　(Continued)

(58) Field of Classification Search
　CPC ............ H04N 21/44008; H04N 21/44; H04N 21/845; H04N 5/144; G06T 7/246;
　　　　　(Continued)

(56) References Cited

U.S. PATENT DOCUMENTS 8,213,725 B2　7/2012　Loui et al.
9,268,794 B2　2/2016　Cui et al.
　　　　　(Continued)

FOREIGN PATENT DOCUMENTS

CN　　　1984236 A　　6/2007
CN　　103886089 A　　6/2014
　　　　　(Continued)

OTHER PUBLICATIONS

Yi et al., "Detection of Moving Objects with Non-Stationary Cameras in 5.8ms: Bringing Motion Detection to your Mobile Device", Seoul National University, ASRI, 2013, (8 total pages).
　　　　　(Continued)

*Primary Examiner* — Thai Q Tran
*Assistant Examiner* — Nienru Yang
(74) *Attorney, Agent, or Firm* — Sughrue Mion, PLLC

(57) ABSTRACT

Optical flow information is determined and used to identify a video clip from among a sequence of frames. The video clip may be identified based on motion features derived in part from the optical flow information. In some embodiments, semantic information is concatenated with the motion features derived from the optical flow information.

19 Claims, 38 Drawing Sheets

CAPTURING OPTICAL FLOW INFORMATION OF AT LEAST ONE FRAME IMAGE IN A VIDEO TO BE PROCESSED — S110

EXTRACTING MOTION FEATURE OF THE AT LEAST ONE FRAME IMAGE BASED ON THE AT LEAST ONE FRAME IMAGE AND THE OPTICAL FLOW INFORMATION OF THE AT LEAST ONE FRAME IMAGE — S120

DETERMINING A VIDEO CLIP IN WHICH AN EVENT OCCURS IN THE VIDEO TO BE PROCESSED BASED ON THE MOTION FEATURE OF THE AT LEAST ONE FRAME IMAGE — S130

PERFORMING CORRESPONDING PROCESSING ON THE VIDEO TO BE PROCESSED ACCORDING TO THE VIDEO CLIP IN WHICH AN EVENT OCCURS — S140

(51) Int. Cl.
    *G06V 10/28*       (2022.01)
    *G06V 20/52*       (2022.01)

(52) U.S. Cl.
    CPC .... *G06V 20/52* (2022.01); *G06T 2207/10016*
        (2013.01); *G06T 2207/20081* (2013.01); *G06T*
        *2207/20084* (2013.01)

(58) Field of Classification Search
    CPC . G06T 2207/10016; G06T 2207/20081; G06T
                2207/20084; G06T 7/269; G06T
                2207/20016; G06V 20/52; G06V 10/28
    USPC ........................................................ 386/241
    See application file for complete search history.

(56)             References Cited

U.S. PATENT DOCUMENTS

| | | | |
|---|---|---|---|
| 10,482,334 | B1 | 11/2019 | Chen et al. |
| 2007/0286489 | A1 | 12/2007 | Amini et al. |
| 2008/0282287 | A1 | 11/2008 | Chen et al. |
| 2011/0052002 | A1 | 3/2011 | Cobb et al. |
| 2014/0072279 | A1* | 3/2014 | Maeda ................. G06V 10/255 |
| | | | 386/241 |
| 2015/0055821 | A1* | 2/2015 | Fotland ............... G06V 10/255 |
| | | | 382/103 |
| 2015/0235379 | A1 | 8/2015 | O'Gorman et al. |
| 2016/0093338 | A1* | 3/2016 | Laska .................. H04L 9/0822 |
| | | | 386/224 |
| 2016/0321506 | A1 | 11/2016 | Fridental et al. |
| 2017/0024614 | A1* | 1/2017 | Sanil ...................... G06F 16/70 |
| 2017/0185846 | A1 | 6/2017 | Hwangbo et al. |
| 2017/0323178 | A1 | 11/2017 | Kwatra et al. |
| 2019/0095716 | A1* | 3/2019 | Shrestha .............. G08B 21/187 |
| 2019/0289263 | A1* | 9/2019 | Amini ................... G06V 20/52 |
| 2020/0005061 | A1* | 1/2020 | Lu ......................... G06V 20/41 |
| 2020/0090484 | A1 | 3/2020 | Chen et al. |

FOREIGN PATENT DOCUMENTS

| | | |
|---|---|---|
| CN | 105809954 A | 7/2016 |
| CN | 105957017 A | 9/2016 |
| CN | 106650655 A | 5/2017 |
| CN | 107135401 A | 9/2017 |
| CN | 107609460 A | 1/2018 |
| CN | 108352174 A | 7/2018 |
| CN | 108681712 A | 10/2018 |
| CN | 109583360 A | 4/2019 |
| CN | 110166827 A | 8/2019 |
| CN | 110503076 A | 11/2019 |
| WO | 2017/112067 A1 | 6/2017 |

OTHER PUBLICATIONS

Yuan et al., "Temporal Action Localization with Pyramid of Score Distribution Features", National University of Singapore and Shanghai Jiao Tong University, 2016, (10 pages total).

Buch et al., "SST: Single-Stream Temporal Action Proposals", Stanford University and King Abdullah University of Science and Technology (KAUST), 2017, (10 pages total).

International Search Report (PCT/ISA/210) issued by the International Searching Authority in International Application No. PCT/KR2021/002117, issued on Jun. 18, 2021.

Written Opinion (PCT/ISA/237) issued by the International Searching Authority in International Application No. PCT/KR2021/002117, issued on Jun. 18, 2021.

Communication dated Mar. 4, 2024, issued by the State Intellectual Property Office of P.R. China in Chinese Application No. 202010820606.5.

Kang, "Crowd Abnormal Event Detection in Public Monitoring Scene", pp. 1-59 (65 pages total).

Ying et al., "Complex Environment Moving Object Detection Technology and Application", Jan. 31, 2014, pp. 20-23 (5 pages total).

Xu, "Research of Abnormal Behavior Detection Algorithm in Video Surveillance", South China University of Technology, Jul. 15, 2028, pp. 1-67 (77 pages total).

Hu et al., "Loop Closure Detection for Visual SLAM Fusing Semantic Information", Proceedings of the 38th Chinese Control Conference, Jul. 27, 2019, pp. 4136-4141 (6 pages total).

Liu et al., "Human Action Recognition via Spatio-temporal Dual Network Flow and Visual Attention Fusion", Journal of Electronics & Information Technology, Oct. 2018, vol. 40, No. 10, pp. 2395-2401 (7 pages total).

Communication issued Jul. 23, 2024 by the State Intellectual Property Office of P.R. China in Chinese Patent Application No. 202010820606.5.

* cited by examiner

FIG. 1

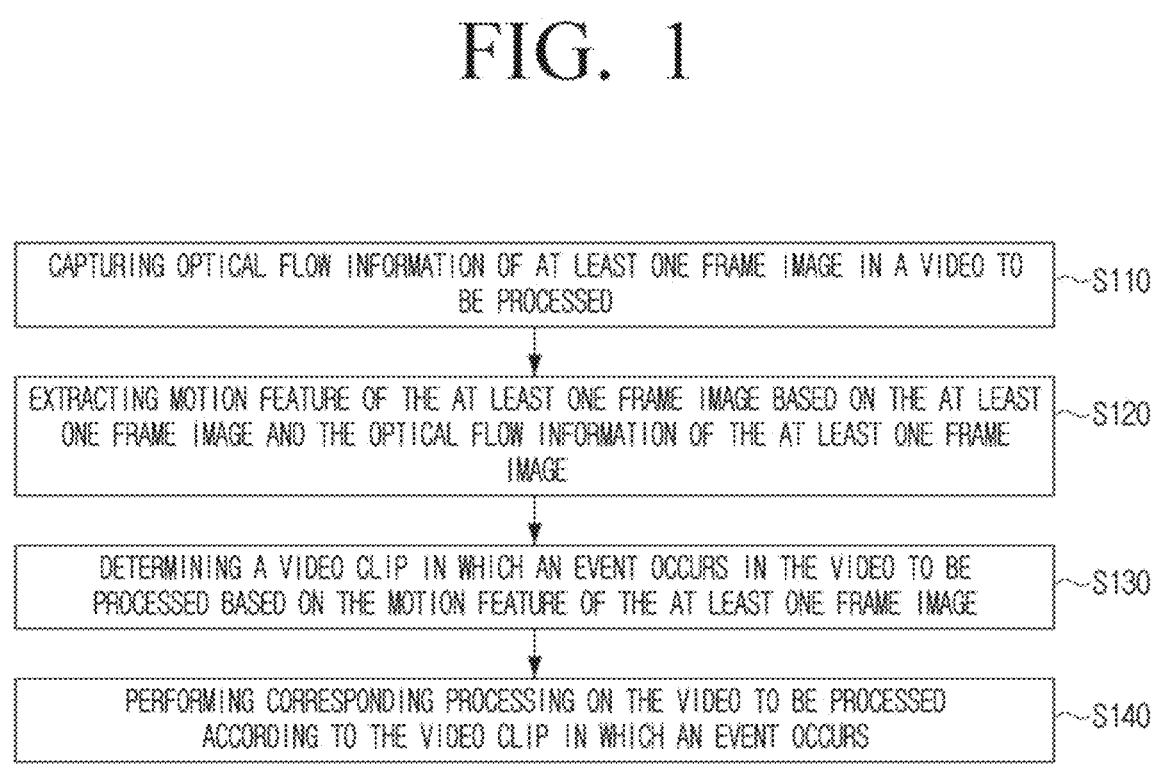

CAPTURING OPTICAL FLOW INFORMATION OF AT LEAST ONE FRAME IMAGE IN A VIDEO TO BE PROCESSED ～S110

EXTRACTING MOTION FEATURE OF THE AT LEAST ONE FRAME IMAGE BASED ON THE AT LEAST ONE FRAME IMAGE AND THE OPTICAL FLOW INFORMATION OF THE AT LEAST ONE FRAME IMAGE ～S120

DETERMINING A VIDEO CLIP IN WHICH AN EVENT OCCURS IN THE VIDEO TO BE PROCESSED BASED ON THE MOTION FEATURE OF THE AT LEAST ONE FRAME IMAGE ～S130

PERFORMING CORRESPONDING PROCESSING ON THE VIDEO TO BE PROCESSED ACCORDING TO THE VIDEO CLIP IN WHICH AN EVENT OCCURS ～S140

FIG. 5
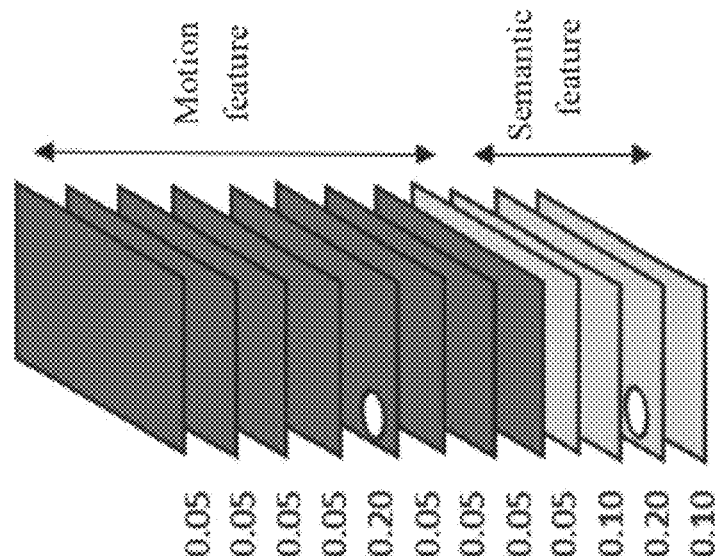
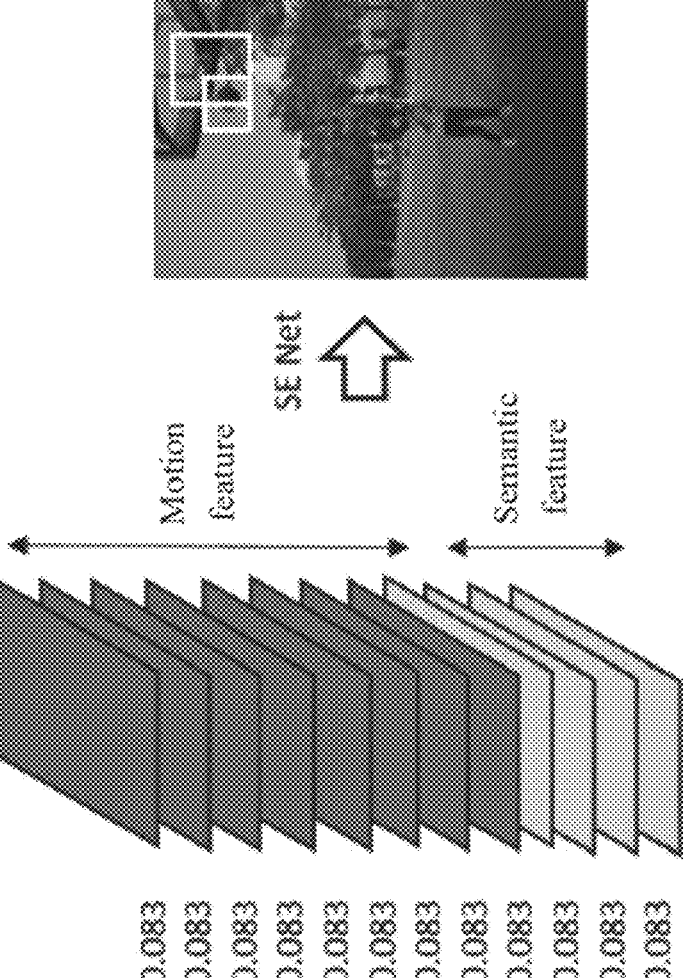

Image t

Image t+1

FIG. 11
t 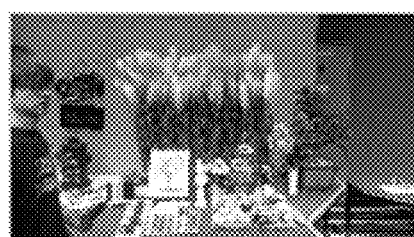        t+1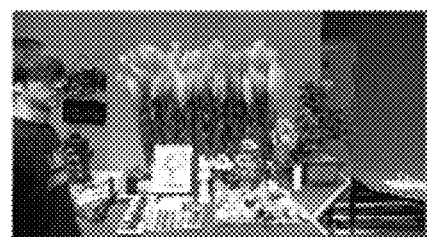
Blurred image t+1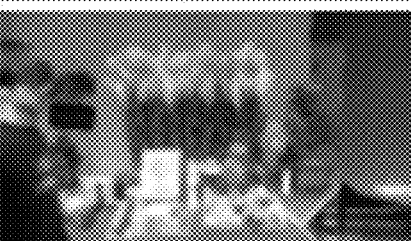
Motion compensated image t+1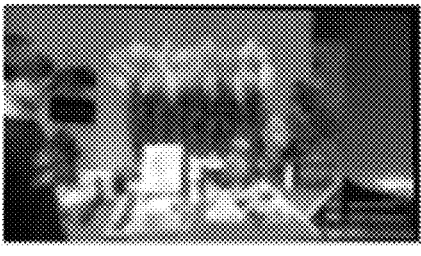

Without expansion result

FIG. 20C

With expansion result

| 1 | 1 | 1 | 1 |

| 0.5 | 1 | 0.5 |

| 1.25 |

No Event        Rise Arm        Finger Heart    Fall Arm        No Event

ELECTRONIC DEVICE, CONTENTS SEARCHING SYSTEM AND SEARCHING METHOD THEREOF

CROSS-REFERENCE TO RELATED APPLICATIONS

This application is a bypass Continuation of International Application No. PCT/KR2021/002117 designating the United States, filed on Feb. 19, 2021, in the Korean Intellectual Property Receiving Office, which claims priority to Chinese Patent Application No. 202010125545.0, filed on Feb. 20, 2020, and Chinese Patent Application No. 202010820606.5, filed on Aug. 14, 2020, in the State Intellectual Property Office of P.R. China, the disclosures of which are incorporated by reference herein in their entireties.

BACKGROUND

1. Field

The application relates to the field of computer and artificial intelligence technology. Specifically, the present application relates to a video processing method, an apparatus, an electronic device, and a readable storage medium.

2. Description of Related Art

Event cameras record video information via event trigger, which can effectively reduce the storage of redundant information and facilitate viewing of events. An event causing an event trigger may be associated with motion or an optical flow. Optical flow is a pattern of apparent motion of objects, surfaces, and/or edges in a visual scene caused by a relative motion between an observer and a scene. Optical flow is sometimes defined as a distribution of apparent velocities of movement of brightness pattern in an image.

The cameras used for video capture in commonly used electronic devices (such as mobile phones) may not be suitable for long-term monitoring, and it is a low possibility for these commonly used electronic devices to be equipped with event cameras in the short term due to various factors. In order to achieve functions similar to event cameras to meet the needs of reducing storage capacity, being convenient for video editing and reducing the calculation amount for subsequent video analysis and interpretation, it is necessary to perform event detection on the image information captured by ordinary video capturing cameras. Although there are existing methods for event detection on videos, the detection effect still needs to be optimized.

SUMMARY

The present application aims to provide a video processing method, an apparatus, an electronic device, and a readable storage medium. The specific solutions of the embodiments of the present application are described below.

Provided herein is a video processing method, including: acquiring first optical flow information of at least one object, surface or edge in a video, wherein the video includes a sequence of frame images; extracting motion features of the at least one object, surface or edge based on the sequence of frame images and the first optical flow information; determining a first video clip in which an event occurs, based on the motion features of the at least one object, surface or edge, wherein the sequence of frame images includes the first video clip; and generating a second video clip based on the first video clip.

Also provided herein is a video processing device, including: one or more processors configured to: acquire optical flow information of at least one object, surface or edge in a video, wherein the video includes a sequence of frame images; extract motion features of the at least one object, surface or edge based on the sequence of frame images and the optical flow information; determine a first video clip in which an event occurs, based on the motion features of the at least one object, surface or edge, wherein the sequence of frame images includes the first video clip; and generate a second video clip based on the first video clip.

Also provided herein is a non-transitory computer readable medium including instructions, the instructions configured to cause one or more processors of a computing device to: acquire optical flow information of at least one object, surface or edge in a video, wherein the video includes a sequence of frame images; extract motion features of the at least one object, surface or edge based on the sequence of frame images and the optical flow information; determine a first video clip in which an event occurs, based on the motion features of the at least one object, surface or edge, wherein the sequence of frame images includes the first video clip; and generate a second video clip based on the first video clip.

Additionally, in an additional aspect, a video processing method is provided in an embodiment of the present application, which comprises: acquiring optical flow information of at least one frame image in a video to be processed; extracting motion features of the at least one frame image based on the at least one frame image and the optical flow information of the at least one frame image; determining a video clip in which an event occurs in the video to be processed, based on the motion features of the at least one frame image; and generating a final video clip based on the determined the video clip in which the event occurs.

In yet another aspect, a video processing device is provided in an embodiment of the present application, which comprises: an optical flow information acquisition module, configured to acquire optical flow information of at least one frame image in a video to be processed; a motion feature extraction module, configured to extract motion features of the at least one frame image based on the at least one frame image and the optical flow information of the at least one frame image; an event clip determination module, configured to determine a video clip in which an event occurs in the video to be processed, based on the motion features of the at least one frame image; and a video processing module, configured to generate a final video clip based on the determined the video clip in which the event occurs.

In yet another aspect, an electronic device is provided in an embodiment of the present application, which comprises: a memory configured to store computer programs; and a processor configured perform the methods provided in embodiments of the present application when executing the computer programs.

In yet another aspect, a computer-readable storage medium is provided in an embodiment of the present application, in which computer program is stored, that when executed by a processor, performs the methods provided in embodiments of the present application.

The beneficial effects brought by the technical solutions provided in the embodiments of the present application will be described in detail in the description of the specific implementation mode below in conjunction with various optional embodiments, and will not be described here.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 1 shows a schematic flowchart of a video processing method provided in an embodiment of the present application;

FIG. 5 is a schematic diagram of weighting merged features by the weight determination network in an example of the present application;

FIG. 11 shows a schematic diagram of the effect of performing motion compensation processing on an image in an example of the present application;

FIG. 15 shows a schematic flowchart of detecting a foreground image region based on a dual-single distribution Gaussian background model in an example of the present application;

FIGS. 18A and 18B show schematic diagrams of the principle of determining the motion state representation information of an image in an example of the present application;

FIGS. 20B and 20C show schematic diagrams of the principle of determining the video clip range in which an event occurs according to the pyramid score range in FIG. 20A;

DETAILED DESCRIPTION

Figure 2:
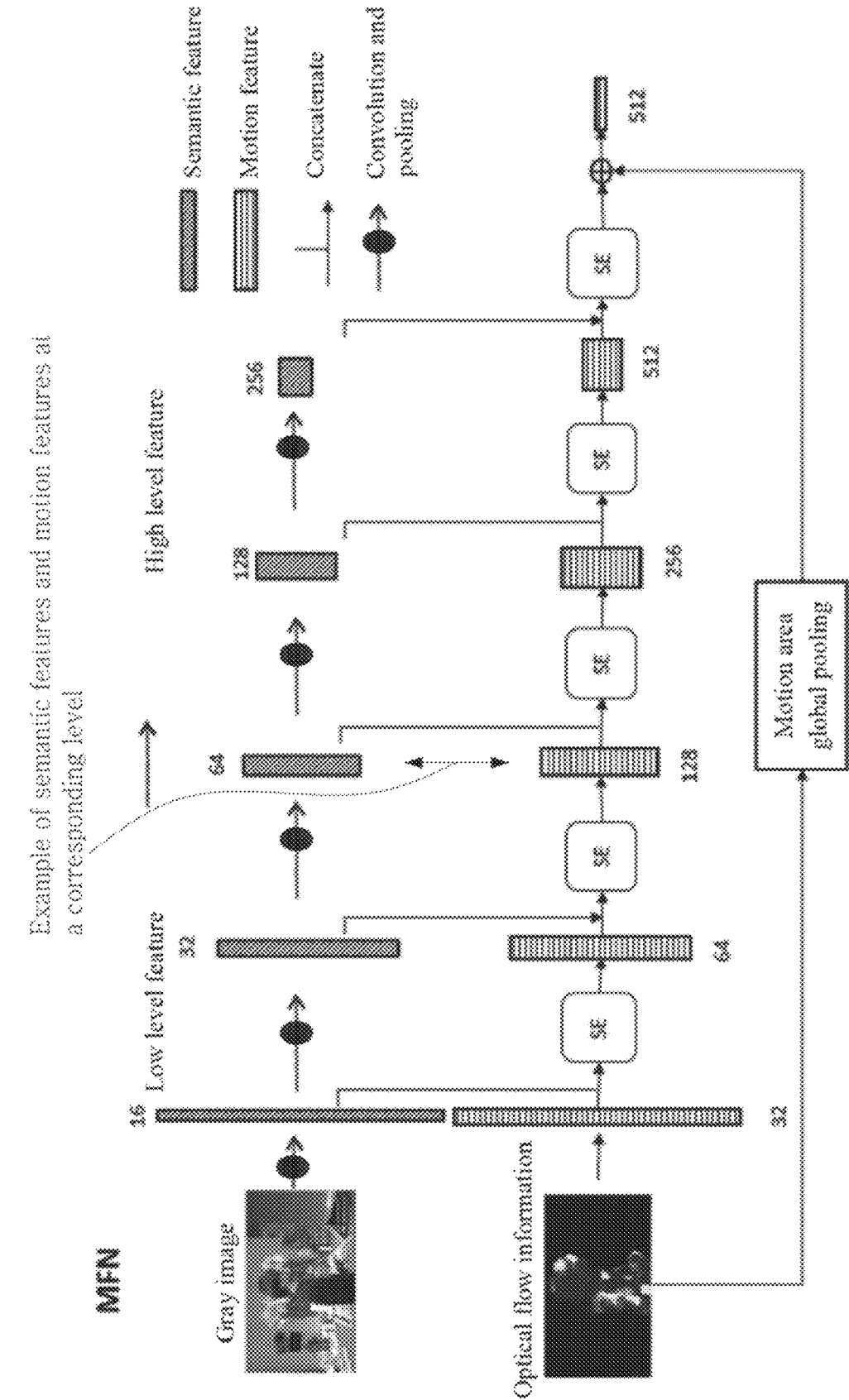
FIG. 2 shows a schematic structural diagram of a neural network for extracting image motion features provided in an optional embodiment of the present application.

The embodiments of the present disclosure are described in detail below, and the examples of the embodiments are illustrated in the drawings, where throughout the drawings, the same or similar reference numbers are used to depict the same or similar elements or elements having the same or similar functions. The embodiments described below with reference to the accompanying drawings are illustrative, and are only used to explain the present disclosure, rather than being construed as limiting the present disclosure.

Those skilled in the art should understand that the singular forms "a", "an", "said" and "the" include plural referents unless the context clearly dictates otherwise. It should be further understood that the expression "including" or "include" used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

In order to better explain and understand the solutions provided in the embodiments of the present application, the following first describes the technologies related to the embodiments of the present application.

The event camera is a biologically-inspired sensor, is a neuromorphic vision sensor, also known as a dynamic vision sensor, and records and uploads video information triggered by events, thereby reducing the storage of redundant information and facilitating viewing of events. Unlike traditional cameras, the neuromorphic vision sensor, which is irrelevant to the concept of "frames", captures dynamic changes in the scene in an event-driven manner. The sensor may measure the intensity change at each pixel (if there is no object motion in the scene, there is no trigger event), and the event stream encodes motion information by using precise intensity changes pixel level by pixel level. When a change occurs in the real scene, the neuromorphic vision sensor will produce some event output. The neuromorphic vision sensor requires very little data storage and few computing resources, and has very low latency (i.e., high-speed photography), which may reach the microsecond level.

Traditional camera video capture generates a series of pictures at a fixed frequency, which may lead to a problem of a lot of redundant information between two adjacent frames. In particular, when the camera and the scene are still or change little, many frames or even all frames in a video are basically unchanged, resulting in too much redundancy in the entire video. The video information can be represented by one or several frame images. Moreover, traditional cameras require excessive memory, have high energy consumption and large delay, which directly leads to very low real-time of many algorithms. Taking deep learning as an example, in order to achieve environmental awareness tasks such as target detection, expensive hardware (such as GPUs) platforms have to be used to provide computing power.

Currently commonly used electronic devices (such as mobile phones, tablets, etc.) with video capturing functions are not equipped with event cameras. Since it needs to consider the appearance design, power consumption, cost, application and other aspects for the electronic device being equipped with new sensors, commonly used electronic devices are not suitable for long-term monitoring, and the output of event cameras is in the form of event streams rather than visual image frames, it is a low possibility of commonly used electronic devices to be equipped with event cameras in the short term.

In order to better meet the needs of practical applications, such as saving storage space, reducing the storage of redundant information, being convenient for video editing and reducing the data amount during subsequent video analysis and interpretation, it is still necessary to perform event detection on the image information captured by the camera in many scenarios. At present, with the rapid development of the hardware and software of electronic device, some tasks in the field of computer vision that event cameras can do may also be achieved through ordinary sensors (that is, ordinary camera sensors commonly used at present, such as cameras on smart phones, etc.), and even the algorithm applied to image frames is more mature. But the inventor of the present application found through research that there are at least the following areas needed to be improved in the existing video processing methods:

(1) During the video recording process, the terminal device will record a lot of redundant invalid information, which increases the storage burden and also adds a lot of invalid data and interference information for subsequent video analysis.

(2) Some of the current deep learning-based methods are mostly designed for action recognition, are achieved usually based on the spatial and temporal features of the video, and often require high-level semantic features to classify actions, which leads to a very large network design and a large amount of annotation data. Semantic features represent basic conceptual components of meaning for some part of an image. Such a network structure is not suitable for real-time tasks on mobile terminals. In addition, some existing neural networks are not ideal for longer videos when detecting the motion state of the images in the video, therefore it has limits on the video duration to be processed.

(3) Many traditional motion detection methods are aimed at still cameras and not suitable for moving cameras, and the detection efficiency thereof is usually low.

(4) In the event detection method relying only on optical flow scores, the threshold for determining whether an event occurs is difficult to select, and the calculation speed of dense optical flow is slow.

(5) Many methods for action localization and motion detection use sliding window methods. However, in existing methods, only a clip of event can be detected within a given time period. In real situations, the occurrence of events may be multiple events or there may be no events. In order to use the sliding window to detect events of different lengths, the window size needs to be constantly adjusted, and a weight control size needs to be set at the same time. This threshold is difficult to match all videos. In addition, some methods will add a lot of redundant calculations in the process of using the sliding window, and in the end, it is necessary to complete the extraction of the final result through maximum value suppression, and the effect is not ideal.

In order to solve at least one of the above technical problems in the existing techniques, embodiments of the present application provide a video processing method, apparatus, electronic device, and readable storage medium that can realize event detection in a video. Based on the method, a video clip in which an event occurs, that is, a video clip where scene changes (caused by a moving target or a moving video capturing device), in the video may be detected.

The purpose of the solution of the present application is to provide an event finder (event detection) system to capture meaningful short videos. The solution may be applied to mobile phones or other electronic devices. In an optional embodiment of the present application, a local optical flow and a lightweight neural network are combined to score the motion possibility of the frame in the video, that is, the possibility of occurrence of event (that is, the motion possibility) in the image is represented by the score of the frame, to explain the meaning of the frame, so that the motion possibility of the frame may be used to select the video clip where the event exists.

The method of the present application is applicable to any scenario that requires the detection of a video clip where scene changes in the video. For example, for an captured video (which may be a video stored in the device, or a video captured in other ways, or a video captured in real time), a video clip in which an event occurs may be detected based on the method provided in the embodiment of the present application, and based on the detection result, only the video clip in which the event occurs may be stored to save storage space. For another example, when other analysis for the video is required, since the video clip in which the event occurs is the clip of main content contained in the video, it is possible to perform corresponding analysis on the detected the video clip in which the event occurs, thereby effectively reducing the subsequent data processing amount. For another example, in the application scenario of video transmission, the video to be transmitted may be detected by the method provided in the embodiments of the present application firstly, and the detected video clip in which the event occurs are transmitted, thereby effectively reducing the amount of data to be transmitted and ensuring the main content of the transmitted video.

In addition, the video processing method provided in the embodiments of the present application may be used in any electronic device, such as smart phones, tablet computers, and other hardware products with video recording functions, as well as devices without video recording functions but having the corresponding data processing capabilities. For example, the method may also be applied to servers (including but not limited to physical servers, cloud servers), in which the captured video may be processed by the method provided in the embodiments of the present application correspondingly, and only the video clip where the event occurs in the video are stored, or the detected video clip where the event occurs are transmitted to other devices.

In order to make clear the purpose, technical solutions, and advantages of the present application, the following descriptions are provided. This application describes various optional implementations of embodiments and technical solutions provided by the embodiments to address the above technical problems. The following embodiments may be combined with each other, and the same or similar concepts or processes may not be repeated in some embodiments. The embodiments of the present application will be described below in conjunction with the drawings.

FIG. 1 shows a schematic flowchart of a video processing method provided in an embodiment of the present application. The method can be executed by any electronic device, such as a video capturing device, a user's terminal device (such as a user's mobile phone, a tablet computer) or a server. As shown in FIG. 1, the method may include the following steps.

Step S110, the electronic device may capture optical flow information of at least one frame image in a video to be processed. For example, the electronic device may capture a pattern of apparent motion of objects, surfaces, and edges in a visual scene caused by the relative motion between an observer and a scene. The visual scene may correspond to a sequence of images. The electronic device may capture a distribution of apparent velocities of movement of brightness pattern in the sequence of images.

Step S120, the electronic device may extract motion features of the at least one frame image based on the at least one frame image and the optical flow information of the at least one frame image.

Step S130, the electronic device may determine a video clip in which an event occurs in the video to be processed, based on the motion features of the at least one frame image.

Step S140, the electronic device may perform corresponding processing on the video to be processed, according to the video clip in which the event occurs. For example, the electronic device may generate a final video clip based on the determined the video clip in which the event occurs. The final video clip is a reduced video clip of the determined video clip and comprises the occurred event.

Here, the sources of the video to be processed are not limited in the embodiments of the present application, for example, it may be a video captured in real time by a video capturing device, a video received from other devices, a video downloaded from the Internet, or a video stored in an electronic device, a video to be transmitted, etc. The video to be processed may be a complete video or a video clip in the video. For example, when processing a video captured by an electronic device in real time, the video to be processed may be a video clip captured at each predefined time interval, such as a video clip captured every 10 seconds as the video to be processed.

In an embodiment of the present application, a video clip in which an event occurs refers to a clip corresponding to frame images where scene information changes in the video. For each frame image in the video, the greater the change in the motion state of the image, that is, the more scene information changes (image content changes) in the image, the greater the probability of an event occurring in the image. Therefore, a video clip in which the event occurs in the video may be determined based on motion features of at least one frame of the video.

As another optional solution of the present application, when it is determined that there is a video clip in which an event occurs in a video to be processed, the video clip in which the event occurs in the video to be processed may be determined based on at least one of brightness information and optical flow information of the video to be processed. The brightness information of an image (usually using a gray value) reflects the brightness change of pixels in the image, and the brightness change may reflect whether the scene in the image changes, that is, whether there is motion. Therefore, the brightness information of the image may be used for determining the video clip in which the event occurs in the video to be processed. The optical flow is an instantaneous velocity of pixel motion of a space moving object on an observation imaging plane. An optical flow method uses the changes in the time domain of the pixels in an image sequence and a correlation between adjacent frames to determine the correspondence between a previous frame and a current frame, and then calculate the motion information of the object between adjacent frames based on the optical flow information, where the motion information between the adjacent frame images may effectively reflect relative information changes between the adjacent frames. Therefore, the video clip in which the event occurs in the video to be processed may be determined based on the optical flow information of the image.

Therefore, the video clip in which the event occurs in the video to be processed may be determined based on one or more pieces of the brightness information and the optical flow information of the frame image. In practical applications, these pieces of information may be used separately or in combination.

The motion features represent the change information of the pixels in the image. Usually, the greater the change is, the larger the motion features value that image has. In an optional solution of the present application, when extracting the motion features of the image, the image and the optical flow information of the image are merged.

Optical flow is widely used to represent motion information. Since the event corresponds to the motion caused by a moving target or a moving video capturing device, the optical flow is a very important features in event detection. However, the optical flow information only represents motion information. If only the optical flow information is considered regardless of the semantic information of the image, the reliability of the motion information will decrease. Some wonderful moments with small motion appearing in the video are not likely to be selected, for example, a score moment in basketball. Therefore, in order to improve the detection accuracy, in the embodiment of the present application, the image motion features are extracted by merging image information (including for example a semantic features of a basketball and a semantic features of a basketball hoop) and optical flow information of the image (for example, the motion of the basketball), so that the two kinds of information can better interact.

After detecting a video clip in the video where the event occurs based on the motion features of at least one frame image, the video may be processed correspondingly according to the video clip in which the event occurs. Here, the processing includes but is not limited to processing the video clip in which the event occurs in the video to be processed, and/or processing the video clip other than the video clip in which the event occurs. Optionally, the processing the video clip in which the event occurs in the video to be processed, and/or the processing video clip other than the video clip in which the event occurs, may include at least one of the following: storing the video clip in which the event occurs; transmitting the video clip in which the event occurs; using different video special effects to play the video clip in which the event occurs and the video clip other than the video clip in which the event occurs; and deleting the video clip in the video to be processed other than the video clip in which the event occurs.

The video processing method provided in the embodiments of the application may perform event detection on videos captured by ordinary cameras, that is, the detection of video clip in which an event occurs in the video is achieved based on concept of frame, so as to better meet requirements for event detection in the video in the practical application scenarios.

Optionally, in practical applications, since the video formats stored and played in electronic devices (such as mobile phones) are usually relatively fixed, ordinary cameras cannot only record correspondingly changed pixels like event cameras. In addition, considering the smoothness of video playback, the smallest unit of event detection should not be an image frame. Therefore, for terminal devices such as mobile phones, the unit of event detection may be a period of time. After detecting a video clip in which an event occurs, only the video stream in the time period when an event occurs during recording of the video is stored.

In addition, considering the data processing capabilities of electronic devices, the video length to be processed once during video processing may be configured according to the actual data processing capabilities of electronic devices. For example, for mobile terminals such as mobile phones, due to the limitations of memory and other factors, a relatively short video length may be configured. If the video to be processed is longer, it may be divided into multiple video clips to be processed based on its length, and the multiple video clips to be processed are processed separately. For example, a time detection is performed every 10 seconds. If the length of the video to be processed is not more than 10 seconds, then the video may be processed directly. If the length of the video to be processed is longer than 10 seconds, the video to be processed may be divided into multiples video clips with length no more than 10 seconds. For personal computers, servers and other terminal devices with strong data processing capabilities, the above-mentioned video length may not be configured, or a relatively long video length may be configured, for example, 30 seconds. Based on the above processing method, it is possible to realize flexible video processing according to actual needs, taking into account the actual data processing capabilities of various electronic devices.

In an optional embodiment of the present application, for any frame image of the at least one frame image, extracting motion features of the frame image based on the frame image and optical flow information of the frame image includes: extracting semantic features of at least one level of the frame image via several cascaded first feature extraction layers, based on the frame image; extracting motion features of at least one level of the frame image via several cascaded second feature extraction layers, based on the optical flow information of the frame image; and wherein at least one second feature extraction layer merges the motion features and semantic features of corresponding level to output.

Here, the specific structures of the first feature extraction layer and the second feature extraction layer are not limited in the embodiment of the present application, and may include, but are not limited to, convolutional networks. It should be noted that in practical applications, the above-mentioned several first feature extraction layers and several second feature extraction layers may include one feature extraction layer, and optionally usually cascaded multiple feature extraction layers, to extract motion feature with better feature expression capabilities and improve the accuracy of subsequent detection.

Optionally, when extracting the motion features of at least one frame image of the video to be processed, the semantic features of at least one level of the image may be extracted via at least one feature extraction layer, and the extracted semantic features and the optical flow information of the image (or the optical flow features extracted from the optical flow information) are merged, and the motion features of the image are obtained based on the merging result. As an optional manner, for any frame image of the at least one frame image of the video to be processed, semantic features of multiple levels of the image are extracted via several cascaded first feature extraction layers based on the frame image, motion features of multiple levels of the image via several cascaded second feature extraction layers based on the optical flow information, wherein the semantic features and motion features of the corresponding level can be merged with each other, and the final motion features of the image is obtained by inputting the merged features to the second feature extraction layer or is obtained based on the merged features, that is, the input of each second feature extraction layer except the first second feature extraction layer may include optical flow features and semantic features, wherein the input of the first second feature extraction layer may be optical flow information, or optical flow information and images. Based on this optional solution, the two types of information may be combined in the feature extraction process to enable them to interact with each other better, so as to obtain motion features with richer semantic information and stronger features expression capabilities and to provide a basis for sequence more accurate and reliable motion features for event detection. Here, the final motion features of the image may be obtained based on the motion features output by the last second feature extraction layer. For example, the final motion features may be the output features of the last second feature extraction layer, or the final motion features may be obtained by extracting features once more based on the output features of the last second feature extraction layer, or the final motion features may be obtained based on the semantic features of the last level and the motion features of the last level.

In the embodiment of the present application, the network for extracting the motion features of the image may be called a motion features network (MFN), wherein the network includes the above-mentioned two feature extraction branches, and one branch is the above-mentioned several cascaded first feature extraction layers for extracting semantic features, which may be called a semantic feature extraction network, and the other branch is the above-mentioned several cascaded second feature extraction layers for extracting motion features, which may be called a motion feature extraction network. Therefore, the MFN may also be called a two branch motion feature extraction network (TMFN).

Optionally, the input of the semantic feature extraction network is an image, and the input of the motion feature extraction network includes optical flow information of the image.

In an optional embodiment of the present application, the number of output channels of the first feature extraction layer is less than the number of output channels of the second feature extraction layer of corresponding level.

For at least one frame image of video, the optical flow information is relatively more important than semantic features in the generation of motion features of the image. The semantic features of the image extracted by the first feature extraction layer are used to assist the second feature extraction layer to better extract the motion features of the image. Therefore, the network structure of the semantic feature extraction network may be relatively lighter, and the number of output channels of the first feature extraction layer can be less than the number of output channels of the second feature extraction layer of corresponding level. Based on this optional solution, the complexity of the neural network may be reduced, the structure of the neural network may be lighter, and the solution provided in the present application may be better deployed on mobile terminal devices.

In an optional embodiment of the present application, the at least one second feature extraction layer merging the motion features and semantic features of the corresponding level to output may include: merging the motion features and semantic features of the corresponding level by the at least one second feature extraction layer to obtain a merged features; determining weight information corresponding to the merged features via a weight determination network; weighting the merged features according to the weight information to obtain a weighted merged features; and outputting the weighted merged features.

The importance of two types of features, that is, semantic features and motion features, is different when determining the video clip in which the event occurs in the video, and the importance of different channels for each feature among the same type of feature is usually also different. Therefore, after the motion features and the semantic features are merged, such as after the motion features and the semantic features are concatenated, weight information corresponding to the merged features may be determined through a weight determination network, and the merged features are weighted according to the weight information to obtain weighted merged features to realize the adaptive adjustment of the features, so that the important features are given greater weights and play greater roles. Here, the specific network structure form of the weight determination network is not limited in this embodiment of the present application.

In an optional embodiment of the present application, the above-mentioned weight information includes first weight information of the motion features and second weight information of the semantic features.

Accordingly, weighting the merged features according to the weight information to obtain the weighted merged features, includes: weighting the merged features according to the first weight information and the second weight information to obtain the weighted merged features.

For the semantic features and/or motion features, the weight of the features of each channel for each type of features may be the same or different, that is, a feature map of each channel of the semantic features/motion features may correspond to the same weight, or correspond to its corresponding weight.

As an optional manner, the weight determination network may use Squeeze and Excitation Network (SENet), which can assign a corresponding weight to each channel according to the number of channels of the features, and perform weighting process on the features based on the weight, to obtain weighted features.

In an optional embodiment of the present application, the method further includes: acquiring a global optical flow feature of the at least one frame image based on the optical flow information of the at least one frame image; and merging the extracted motion features of the at least one frame image with the global optical flow features, to obtain the motion features of the at least one frame image based on the merged features.

In other words, for any frame image in at least one frame image, the motion features of the image may be obtained by merging the motion features of the image with the global optical flow features. Here, the obtaining the motion features of the image based on the merged features may include: using the merged features as the motion features of the image, or performing the feature extraction once more based on the merged features and using the extracted features as the motion features of the frame image.

The final motion features of the enhanced image may be obtained by combining the motion features of the image and the global optical flow features of the image. By increasing the global optical flow features, the distance of motion features between a frame with motion and a frame without motion may be increased. A larger motion feature distance represents a significant difference in the motion possibilities, and the motion possibility reflects the possibility of occurrence of an event in an image. Therefore, the global optical flow feature is very helpful for event detection and may improve the accuracy of detection.

Optionally, for any frame image of the at least one frame image, acquiring the global optical flow feature of the frame image based on the optical flow information of the frame image may include: acquiring the global optical flow feature of the frame image though a pooling layer based on the optical flow information of the frame image.

Pooling may be formed over a portion of the optical flow features, such as a patch. For example, average pooling calculates an average value for each patch of the optical flow features. Max Pooling calculates a maximum value for each patch of the optical flow features. The specific pooling structure of the pooling layer is not limited in the embodiment of the present application, for example, a global pooling structure. Optionally, if the optical flow information of the image is the optical flow information of the frame image obtained based on a motion area of the image and the next frame image of the image (an optional solution in the following), the pooling in this solution may refer to pooling the optical flow information of the motion area of the image. For example, the patch mentioned above may be chosen as the motion area of the image.

In an optional embodiment of the present application, the method may further include: sorting the optical flow information of at least one frame image of the video to be processed, and determining motion state representation information of the at least one frame image based on the sorted optical flow values in a set confidence range; and determining a video clip in which an event occurs in the video to be processed based on the motion state representation information of at least one frame image.

In other words, the detection of the video clip in which an event occurs in the video may be realized directly according to the optical flow information of the image, and this solution may be applied to application scenarios with high real-time requirements. In this optional solution, the optical flow information of the image may be the optical flow of the entire image. Since the optical flow, which may be an average of the optical flow in the confidence range specifically, is the only criterion for determination in this optional solution, in order to ensure that a clip of large action may be detected and remove possible noise interference, the optical flow can be sorted, for example, by calculating the average of the optical flow in 60-95% of the confidence range.

In order to better understand and explain the optional implementation manners provided in the present application, the motion feature network and its principle provided in the present application are further described below in detail with reference to a specific optional embodiment.

As an optional implementation manner, FIG. 2 shows a schematic structural diagram of a motion feature network, that is MFN, provided in an embodiment of the present application. As shown in the FIG. 2, the MFN includes three branches, wherein the upper branch is a semantic feature extraction network, the middle branch is a motion feature extraction network, and the lower branch is a global optical flow feature extraction network. In this example, the weight determination network is an SE network ("Squeeze and Excitation network"). An SE network is configured to obtain an importance of each channel in a neural network. For example, the SE network may obtain the importance of each channel as weight information and produce an output by applying the weight information to the channels.

The number in the figure (above the output of a convolution and pooling operation shown as an arrow) is the number of output channels of the feature extraction layer of the network, that is, the number of output feature maps. Also FIG. 2 lists the number of channels output by a given SE network. In some embodiments, each SE network includes a convolution and pooling operation. It can be seen from the figure that in this example, the number of output channels of the semantic feature extraction layer (i.e., a first feature extraction layer) is less than the number of output channels of the motion feature extraction layer (i.e., a second feature extraction layer) of corresponding level. Taking a feature extraction layer of the first level as an example, the number of output channels of the semantic feature extraction layer is 16, and the number of output channels of the motion feature extraction layer is 32.

For a frame image, the MFN merges a gray image and optical flow information of the frame image to obtain the motion features of the image. Here, for the extraction of semantic features, the gray image is input to the semantic feature extraction network, and the semantic features of each level are extracted through each cascaded feature extraction layer (the feature extraction layer in this example includes convolution and pooling structures). Optionally, low-level semantic features (the shallow-level features shown in the figure) contain more information expressing spatial information of the image, and have a relatively larger size (that is, the size of the feature map), and the number of channels of the corresponding feature extraction layer may be relatively smaller. High-level semantic features (the deep-level features shown in the figure) better express the deep semantic information of the image, and have a relatively smaller size, and the number of corresponding output channels may be relatively large to be able to obtain the semantic information of the image in more dimensions. As shown in FIG. 2, in this example, the number of output channels of each cascaded feature extraction layer increases sequentially.

For the extraction of motion features, the optical flow information of the image (optical flow image) is input to the motion feature extraction network, and the motion features of several levels of the image are extracted sequentially via several cascaded feature extraction layers of the network. Similarly, the shallow-level motion features are extracted first, and then the deep-level motion features are further extracted based on the shallow-level motion features.

Here, in order to make the image features (i.e., semantic information/image information) and optical flow features (i.e., motion information) better interact, these two features are concatenated in the process of motion feature extraction. The optical flow features are relatively more important in the motion features generation, and the gray image is used as auxiliary information to improve the expression ability of the extracted motion features (therefore, the semantic feature extraction network may be relatively simplified), so that the obtained motion features is more reliable.

As shown in FIG. 2, after the first feature extraction layer of the motion feature extraction network extracts motion features of the first level based on optical flow information, it can concatenate the motion features with the semantic features of the first level. The SE network uses concatenated features (i.e., the above-mentioned merged features) as input to obtain the importance of each channel of features, that is, the weight information, and after weighting according to the weight information, the weighted concatenated features are input to the next feature extraction layer. The feature extraction layer extracts the motion features of this level based on the weighted concatenated features. Similarly, the motion features of this level and the semantic features of the corresponding level are concatenated and input to the SE network, and the weighted concatenated features output by the SE network is input to the next feature extraction layer.

For the global optical flow feature extraction network (the global pooling of the motion area shown in the figure), the network in this example uses a global pooling structure. The optical flow information of the image is input the network for feature extraction, and the global optical flow feature is output. The global optical flow feature is merged with the weighted concatenated features output from the last SE network (in this example, the merging uses an addition), and the merged features are extracted through the feature extraction layer once more to obtain the final motion features of image.

It is understandable that during feature merging, the scales of the features to be merged (i.e., feature maps) should be the same, that is, the sizes of the feature maps should be the same, and if they are different, a scale transformation should be performed first.

Figure 3:
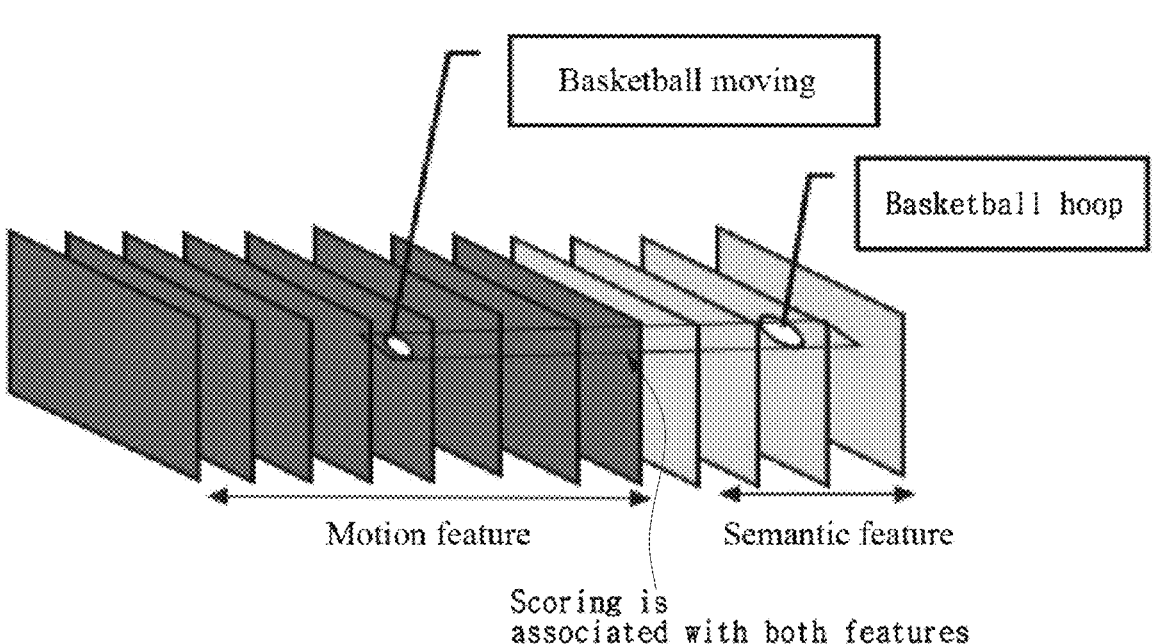
FIG. 3 is a schematic diagram of a merged feature of motion features and semantic features in an example of the present application.

In the MFN shown in FIG. 2, in the image motion feature extraction process, the semantic features and motion features are concatenated at different levels, and features at different levels have different information. For example, features at low-levels contain more spatial distribution information, features at high-levels contain more semantic information. The concatenation of the two types of features at different levels may better enable the two types of information to interact with each other. As an example, FIG. 3 shows a schematic diagram of merging the semantic features and motion features of the image in the video of the application scene of playing basketball. At the scoring moment of basketball, the hot spot in the semantic features (circle in the figure) is caused by the basketball hoop. The hot spot in the motion features is caused by the movement of the basketball. The two features interact with each other in the spatial dimension. For example, the interaction of the moment of scoring when the basketball passes (optical flow of the basketball) into the basketball hoop. The basketball hoop is an important conceptual features in the image and is semantic features. FIG. 3 illustrates bringing into the inference process, by concatenation, the optical flow of the basketball and the semantic features (also see FIG. 5, discussed below). After the two features are concatenated, the feature extraction is performed again, and the motion features of next level can be enhanced by the semantic features.

Figure 4:
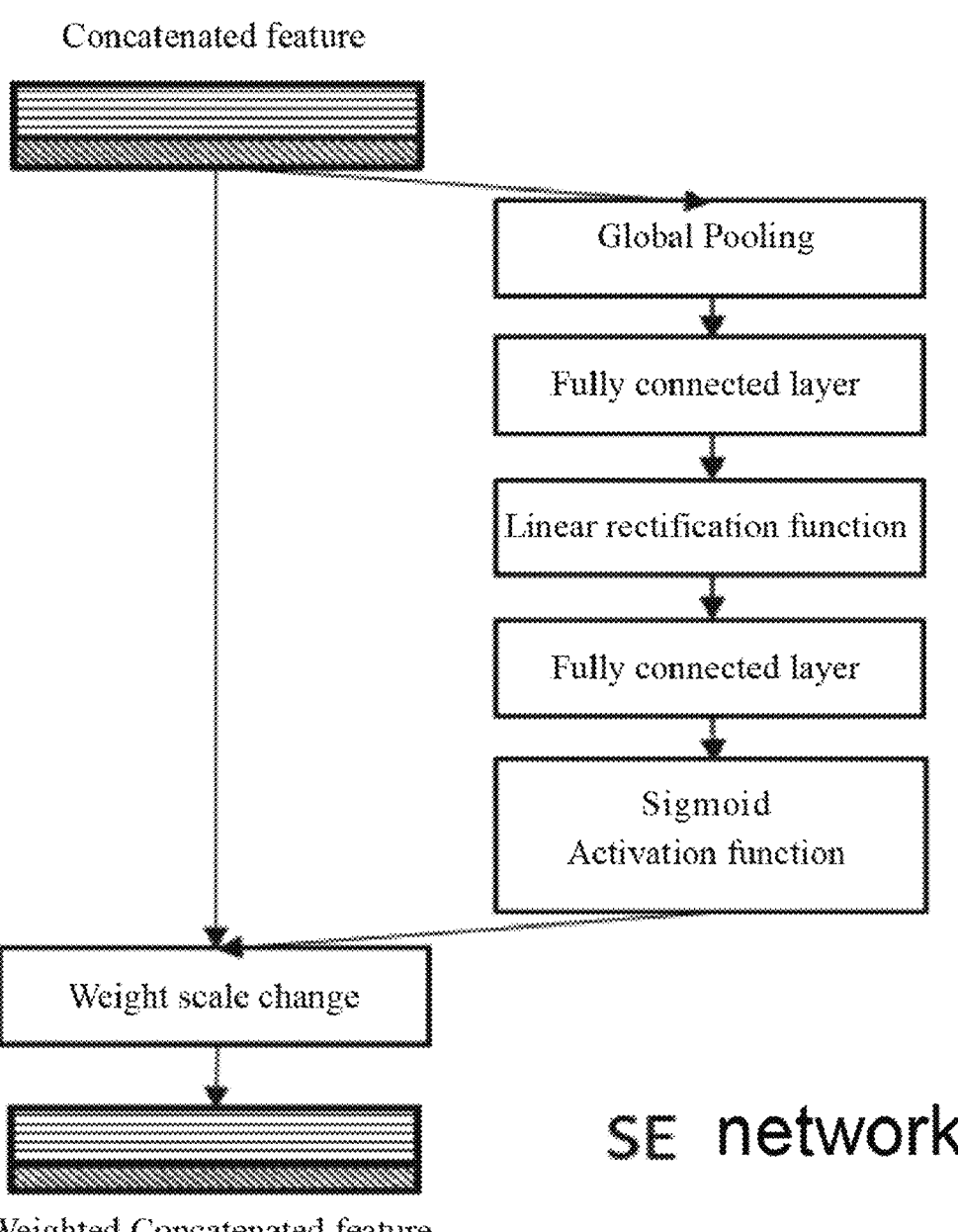
FIG. 4 is a schematic structural diagram of a weight determination network provided in an optional embodiment of the present application.

As an optional solution, FIG. 4 shows a schematic structural diagram of an SE network provided in an embodiment of the present application. As shown in FIG. 4, the input of the SE Network is the concatenation of motion features (features filled with horizontal lines in the figure) and semantic features (features filled with oblique lines in the figure). After the concatenated features are input to the SE network, the concatenated features are processed by a global pooling layer, a fully connected layer, a linear rectification function layer (Relu layer), fully connected layer, and Sigmoid activation function layer which are successively cascaded to obtain the weight of the features map of each channel in the concatenated features, after that, the features map of the corresponding channel is weighted based on the weight of the features map of each channel (the weight scale transformation shown in the figure, referred as Scale) to obtain the weighted concatenated features.

For the semantic features and motion features in the concatenation, the feature map of each channel of the same type features may correspond to the same weight, that is, the feature map of each channel of the semantic features corresponds to one weight, and the feature map of each channel of the motion features corresponds to one weight, or the feature map of each channel of the concatenated features corresponds to its own weight. In some extreme cases, if the weight of the feature map of a channel is 0, it means that the feature map of the channel is useless for the extraction of final motion features of the image. For different application scenarios, the importance of semantic features and motion features for event detection is different, and the importance of features of each channel of the same type of features may also be different. Even in the same application scenario, the importance of semantic features and motion features (or the features of each channel of the same type of features) at different times is also different. Adaptive adjustment of the semantic features and motion features is achieved by the weight determination network.

As an example, FIG. 5 shows a schematic diagram of the effect of weighting the concatenated features of the motion features and the semantic features of the image of the basketball application scene. As shown in FIG. 5, a person is shooting a basketball in the image. In the example, the weights of the feature maps of each channel in the concatenated features before passing through the SE Net are the same, for example, 0.083. After the concatenated features pass through the SE Net, the weights of the feature maps of each channel have changed, for example, 0.05, 0.05, . . . , 0.20, . . . , 0.20, 0.10. Here, the feature map with the larger weight value in the motion features is the feature map corresponding to the hot spot (the basketball in the image (the left white rectangular area in FIG. 5)) in the motion features, and the feature map with the larger weight value in the semantic features is the feature map corresponding to the hot spot (the basketball hoop in the image (the right white rectangular area in FIG. 5)) in the semantic features. Since the event in the image in this example is a shooting event, the basketball and the basketball hoop are important for event detection. Correspondingly, the features of these two objects are given greater weights through the SE Net.

Figure 6:
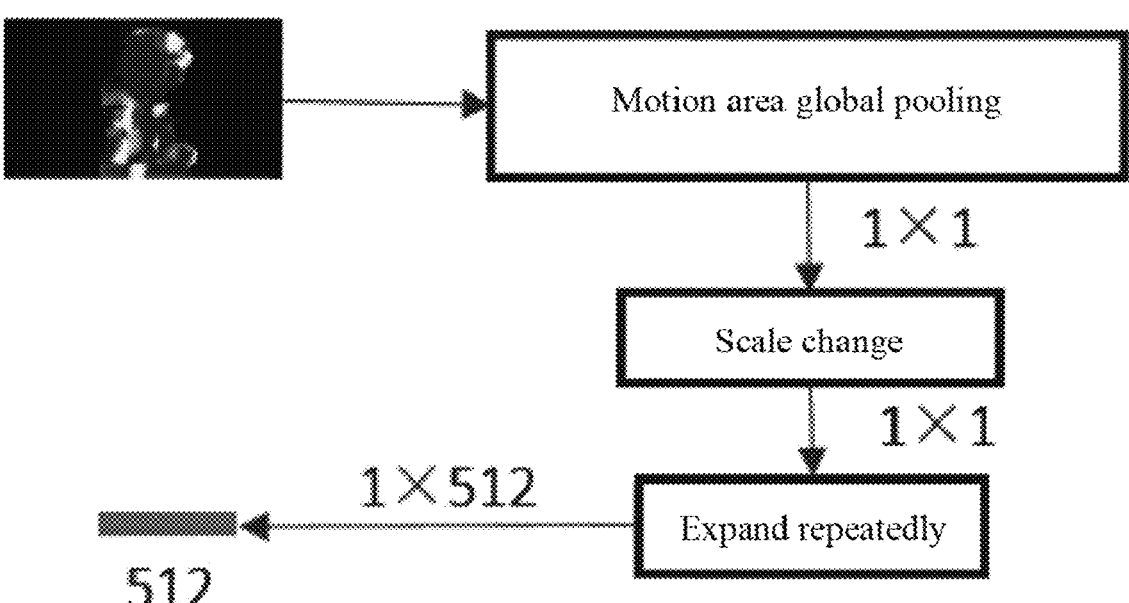
FIG. 6 is a schematic diagram of a global pooling structure in an example of the present application.

As an optional solution, FIG. 6 shows a schematic structural diagram of a global optical flow feature extraction network provided in an embodiment of the present application. In this example, for description, the output channel of the weighted concatenated features mentioned above is 512. As shown in FIG. 6, the network includes a global pooling layer (the motion area global pooling shown in the figure), a scale change layer and a repeated expansion layer which are successively cascaded. The input of the network is the optical flow information of the image. After the optical flow information passing through the global pooling layer, a 1×1 tensor (a scalar), that is, a feature value, is obtained. The feature value is processed by the scale transformation layer into a feature value having the same magnitude as the above-mentioned weighted concatenated features. The scale transformation may also adjust the proportion of the global pooling result in the motion features of the image. Then the feature value is passed through the repeated expansion layer, and is expanded as a 1×512 feature vector (i.e., the global optical flow feature), which contains 512 feature values. All the feature values have the same row vector, and each feature value corresponds to one feature map in the concatenated feature map. When merging the weighted concatenated features with the global optical flow feature, each feature value can be added to each feature value in one feature map.

In an optional embodiment of the present application, the video to be processed is obtained in the following way: selecting video frames from an original video with defined frame rate; determining key frames in the selected video frames by repeatedly performing the following operations: determining scene change information between adjacent frames in the selected video frames, and determining the selected adjacent frames as the key frame based on the scene change information or selecting the video frame from the video frames between the adjacent frames; and using video stream corresponding to the determined key frame as the video to be processed.

In order to provide a smoother picture on terminal devices, especially mobile terminals, such as smart phones, the screen display of the terminal device needs to have a higher refresh rate, such as 90 Hz or 120 Hz, etc. Correspondingly, a video capturing device (such as cameras) needs to use a higher frame rate for video shooting. However, most of the existing algorithms applied to video are usually suitable for 30 frames per second (fps), and directly process videos with high frame rate, therefore processing frame by frame requires multiplied calculation amount and processing time.

In order to reduce the video processing efficiency on the premise of meeting the requirements of high screen refresh rate and high-frame-rate video capturing, an optional embodiment of the present application provides a key frame selection solution that can be adjusted adaptively. This solution selects key frames based on the scene change information of the images in the video, select key frames with relatively large scene change information in the video, and use selected key frames in the original video based on the scene change information as the video to be processed for subsequent processing. This solution may effectively reduce the time for subsequent calculation and processing, greatly improve the processing efficiency of the video, and ensure a good event detection effect, even though events with a long duration can be detected by this solution. Here, the specific representation manner of the scene change information is not limited in the embodiment of the application, as long as the information that can represent the scene change between adjacent frames.

The end condition of the above repeated executed operations may be configured according to application requirements. For example, the end conditions may include the number of selected video frames being greater than the defined number, or the scene change information between adjacent frames in the selected video frames being less than the change information threshold, or the frame rate corresponding to the selected video frames being equal to the frame rate of the original video, etc. The video frame selected at the end is used as the key frame.

The above defined frame rate may be configured according to application requirements and/or experience, for example, 30 fps. Here, the defined frame rate is not greater than the frame rate of the original video.

Optionally, in order to avoid too many selected key frames and the increase of redundant information, when selecting frames, it may be selected by an equal interval (that is, an equal time interval, that is, the selected frames are separated by the same number of frames).

Optionally, the larger the scene change information corresponding to the video, the more key frames may be selected. For different videos, the key frames selected based on the solution have an adaptive frame rate.

In an optional embodiment of the present application, determining the selected adjacent frames as the key frames based on the scene change information, or the selecting the video frame from the video frames between the adjacent frames includes: determining the selected adjacent frames as the key frame, if the scene change information is less than a change information threshold; and selecting the video frame from the video frames between adjacent frames, if the scene change information is not less than the change information threshold.

In other words, for adjacent frames in the selected video frames, if the scene change information corresponding to the adjacent frames is less than the change information threshold, it indicates that the image information between the adjacent frames has small change, and there is no need to add a new frame between the adjacent frames, and then the adjacent frames may be directly determined as the key frames; if the scene change information between the selected adjacent frames is not less than the change information threshold, it indicates that the image information between the adjacent frames has large change and the probability of occurrence of the event is relatively large, and thus more video frames are needed. One or more frames may be selected once more from the video frames between the adjacent frames, and the above operation of determining key frames may be repeated based on the adjacent frames and frames selected between adjacent frames. Optionally, a frame between adjacent frames may be selected at an equal interval. For example, the adjacent frames are the first and fifth frames in the original video, the third frame of the video may be selected once more when the scene change information corresponding to the first frame and the fifth frame is not less than the change information threshold, and then the above operations are repeated for the first, third, and fifth frames.

Optionally, the scene change information may be the number of points meeting a preset condition in the sparse optical flow between the selected adjacent frames.

Here, the preset condition is that the optical flow in the horizontal direction is greater than a preset first threshold, and/or the optical flow in the vertical direction is greater than a preset second threshold.

In other words, the scene change information may be presented by the number of optical flow points with larger optical flow values in the sparse optical flow between adjacent frames. The change information threshold corresponding to the horizontal direction (x direction) and the change information threshold corresponding to the vertical direction (y direction) may be the same or different.

Optionally, the above-mentioned first threshold may be w/s, and the second threshold may be h/s, wherein w and h represent the width and height of the frame respectively, and s is a defined value, which may be defined based on empirical values and/or experiment values, such as 5. Correspondingly, at this time, for any two adjacent frames in the selected video frames, if the scene change information is not less than the change information threshold, the number of optical flow points with optical flow greater than w/s in the x direction in the sparse optical flow between the adjacent frames is not less than the change information threshold, and/or the number of optical flow points with optical flow greater than h/s in the y direction is not less than the change information threshold.

As an optional embodiment of the present application, acquiring the video to be processed may include: acquiring an original video; selecting video frames from an original video with a defined frame rate by an equal time interval; determining key frames in the selected video frames by repeatedly performing the following operations, until scene change information between adjacent frames in the selected video frames is less than a change information threshold, or the frame rate of the selected key frame is equal to the frame rate of the original video, using the video stream corresponding to the determined key frame as the video to be processed: determining scene change information between adjacent frames in the selected video frames; determining the adjacent frames corresponding to the scene change information as the key frame, if the scene change information is less than change information threshold; or selecting a video frame between the adjacent frames corresponding to the scene change information in the original video at an equal interval, if the scene change information is not less than change information threshold, and using the selected video frame and the adjacent frame corresponding to the scene change information as the new selected video frame.

In order to better understand and explain the key frame selection solution provided in the present application, the solution will be further described below with reference to an example shown in FIG. 7.

Figure 7:
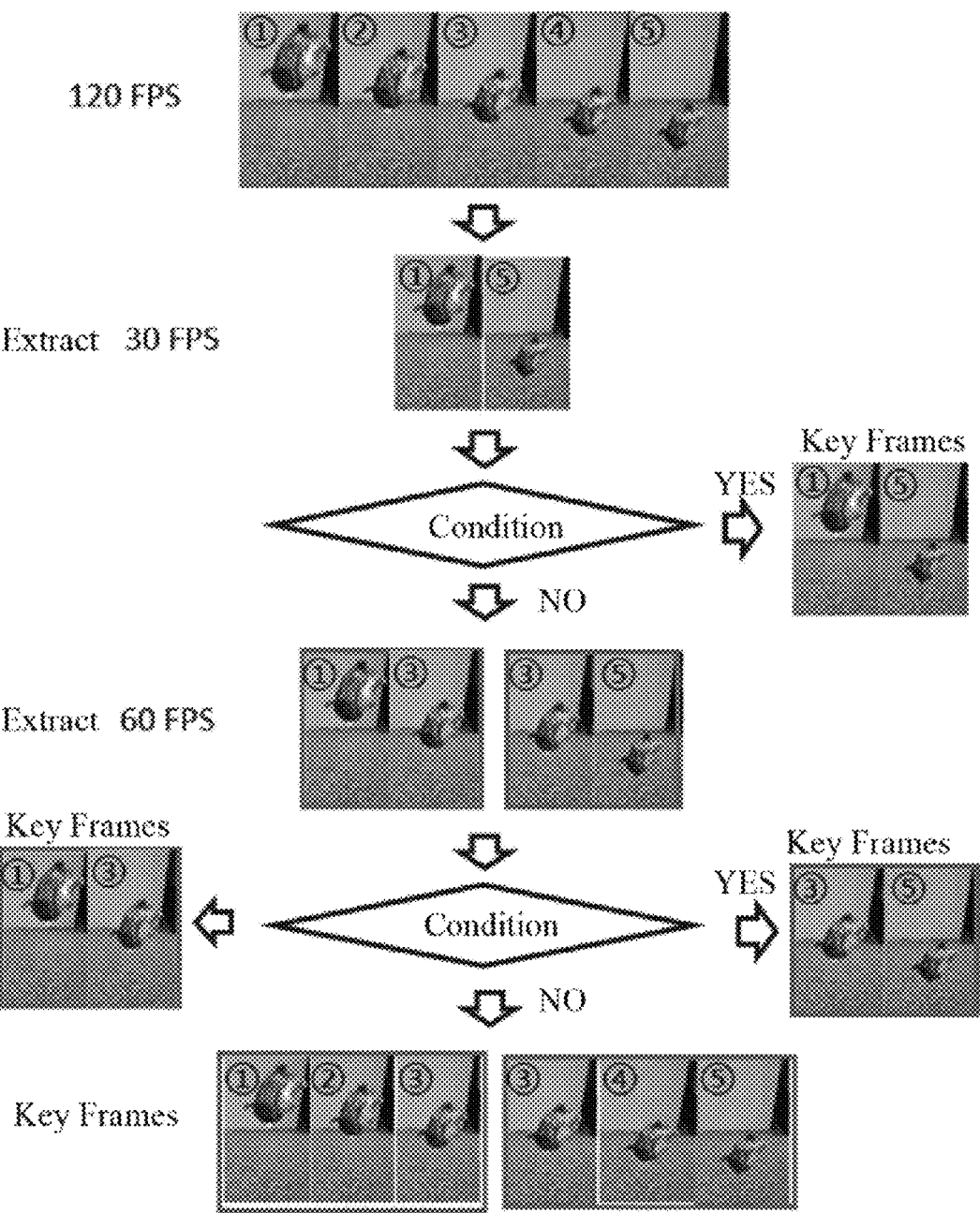
FIG. 7 is a schematic diagram of a principle of video key frame selection in an example of the present application.

As shown in FIG. 7, the acquisition frame rate of the original video in this example is 120 FPS. Here, the original video shown in the figure includes five frame images, that is, the 5 images numbered as ①-⑤ in the figure. It is noted that the image in FIG. 7 is only a schematic image, and the specific content in the image does not affect the description of this example, and the content in the image does not constitute any limitation on the present application.

In conjunction with FIG. 7, when the key frame is extracted, the video frames are selected from the original video by an equal interval at a defined frame rate of 30 FPS (the extracting 30 FPS shown in the figure). The first and fifth frames, that is, image ① and image ⑤, are first extracted at the defined frame rate. Then the sparse optical flow between image ① and image ⑤ is calculated, and the number of optical flow points with optical flow value greater than w/s in the x direction in the sparse optical flow, and the number of optical flow points with an optical flow value greater than h/s in the y direction in the sparse optical flow are counted. If the number of points in both directions above-mentioned are less than the defined number, the first and fifth frames are the final key frames. If the number of points in one direction is greater than or equal to the defined number, it is required to select a frame between the first frame and the fifth frame at an equal interval, that is, the third frame, and the first frame, the third frame and the fifth frame are taken as the new selected video frames (corresponding to the extracting 60 FPS in the figure, and the selected video frames include 3 frames, and the frame rate corresponding to the selected video frames at this time is 60 FPS with respect to the original video). The steps of calculating the sparse optical flow between adjacent frames, counting the number of optical flow points that meet the conditions, and determining whether the number of points is greater than or equal to the defined number are performed repeatedly in the three frames. As shown in the figure, the above processes are performed repeatedly for the first and third frames, and the above processes are performed repeatedly for the third and fifth frames. If the number of points corresponding to the first and third frames in the above two directions is less than the defined number (the conditions of satisfaction, that is, the branch of "YES" shown in the figure), and the number of points corresponding to the third and fifth frames in the above two directions is less than the defined number, the final key frames are the first, third and fifth frames. If the number of points corresponding to the first and third frames in one of the directions is not less than the defined number (the conditions that doesn't satisfy, that is, the branch of "NO" shown in the figure), and the number of points corresponding to the third and fifth frames in the above two directions is less than the defined number, it is required to select another frame between the first frame and the third frame, and the final key frames are the first frame, the second frame, the third frame and the fifth frame. However, if a new frame needs to be added between the first frame and the third frame, and between the third frame and the fifth frame, the final video to be processed is the original video.

In an optional embodiment of the present application, determining the key frames in the selected video frames may include: preprocessing the selected video frames, wherein the preprocessing may include at least one of image resizing (down scaling) processing, image graying processing and image denoising processing; and determining the key frames in the preprocessed video frames.

In other words, after selecting the video frames (including the first selection of the video frames from the original video, and the subsequent selection of the video frames between adjacent frames), the selected video frames may be preprocessed first, and the above-mentioned operation of determining key frames may be performed repeatedly based on the preprocessed frames. The image scaling-down processing may reduce the subsequent data processing amount, the image graying processing may also reduce the data processing amount, the image denoising processing may improve the subsequent image processing effect, for example, the image denoising processing may enable the determined motion area more robust in the method of determining the image motion area described below.

It is understandable that if the selected key frames are used as the video to be processed, that is, the optional solution of key frame selection is adopted, the subsequent processing steps are processing based on the pre-processed key frame images, such as the step of obtaining the optical flow information of each frame image and the step of extracting the motion features of each frame image.

In addition, in practical applications, since key frame selection is an optional implementation step, if the key frame selection solution is not adopted, the above-mentioned pre-processing may also be performed on each frame image of the video to be processed before subsequent processing of the video to be processed, to reduce the subsequent data processing amount. If the key frame selection solution is adopted, the preprocessing process may be the preprocessing on the selected video frames, and it is not necessary to preprocess all the images of the original video.

Here, if the preprocessing includes multiple pre-processing methods, such as the image scaling-down and the image graying, the processing order between the multiple preprocessing methods may be configured according to actual application scenarios and requirements. For example, the processing order may be determined in the premise of minimizing the data processing amount or considering other factors. For example, if the video to be processed is data in the Luma Chroma (YUV) format (the video taken by the camera may be in this format), the gray image directly corresponds to the Y channel image, so the image graying processing may be performed first, and then the image scaling-down is performed to reduce the data processing amount.

In an optional embodiment of the present application, before acquiring optical flow information of at least one frame image in the video to be processed, the method may further include: determining movement type of a video acquiring device for the video to be processed when acquiring the video to be processed; and performing motion compensation on each frame image of the video to be processed, if the movement type is user's unconscious movement.

The solution of the embodiment of the present application is suitable for the following scenes in the process of capturing video to be processed: the capturing object is in motion and/or there is a moving object in the scene while the mobile phone is relatively stationary, that is, a target moving scene. It is also suitable for the scenes in which photographer moves the video capturing device, that is, the user moves the mobile device consciously. While the user's unconscious movement refers to that the user non-autonomously moves the capturing device, such as the user's hand-shaking. In the motion compensation solution provided in the present application, before processing the video to be processed, a motion compensation processing is performed on each frame image in the video to be processed, based on the movement type of the video capturing device when the video is captured, for example if it is the user's unconscious movement, and a video clip in which an event occurs in the video to be processed is determined based on each motion-compensated frame image. Through the motion compensation, the problem of inaccurate interception of the event boundary caused by the user's unconscious movement such as the shaking of the video capturing device may be solved. Specifically, for event cameras, since they are generally stationary during the monitoring process, the events are generally caused by moving objects in the monitoring scene. For ordinary video capturing devices (such as cameras in mobile phones), there are generally two main factors that cause changes in video information: there are moving objects in the capturing scene, and the motion of the capturing device. As for the motion of the capturing device, for scenes such as the user capturing videos through an ordinary video capturing device such as mobile phone, the motion may also be an unconscious movement of the user or other structures that carry the video capturing device, such as the camera movement caused by the human jiggling or shaking. The motion will cause the image to move in space, and this movement will cover up the information of the motion events of the objects in the scene. In other words, the motion of the capturing device may be regular or irregular motions. However, the irregular motion, that is, user's unconscious motion, will affect the detection result.

With respect to the above-mentioned problems, the above-mentioned optional solutions provided in the embodiments of the present application may first determine the movement type of the video capturing device for the video to be processed when acquiring the video, before processing the video to be processed. If the movement type is user's unconscious movement, the motion compensation can be performed on each frame image, and a video clip in which an event occurs in the video to be processed is determined based on each motion-compensated frame image, so as to remove the influence of motion of the capturing device caused by unconscious motion through motion compensation.

Specifically, as an optional manner, the determination of the movement type may be implemented through an Inertial Measurement Unit (IMU) of the video capturing device. IMU is a device that measures the three-axis attitude angle and acceleration of an object. Generally, IMU includes a three-axis gyroscope and a three-axis accelerometer, which may determine whether the video capturing device is in motion by using angular acceleration and motion acceleration in three directions, and whether the motion is regular or irregular. Here, the irregular motion is considered to be the motion of the video capturing device caused by the unconscious movement of people or other structures that carry the video capturing device.

It is understandable that in practical applications, if the movement type of the video capturing device is obtained, the motion compensation solution for each frame image may be performed. For example, during the process of video capturing by a terminal device, the terminal device may obtain its movement type in real time, and determines whether to perform motion compensation based on the movement type. If the movement type of the video capturing device cannot be obtained, the motion compensation solution for each frame image will not be performed.

Figure 8:
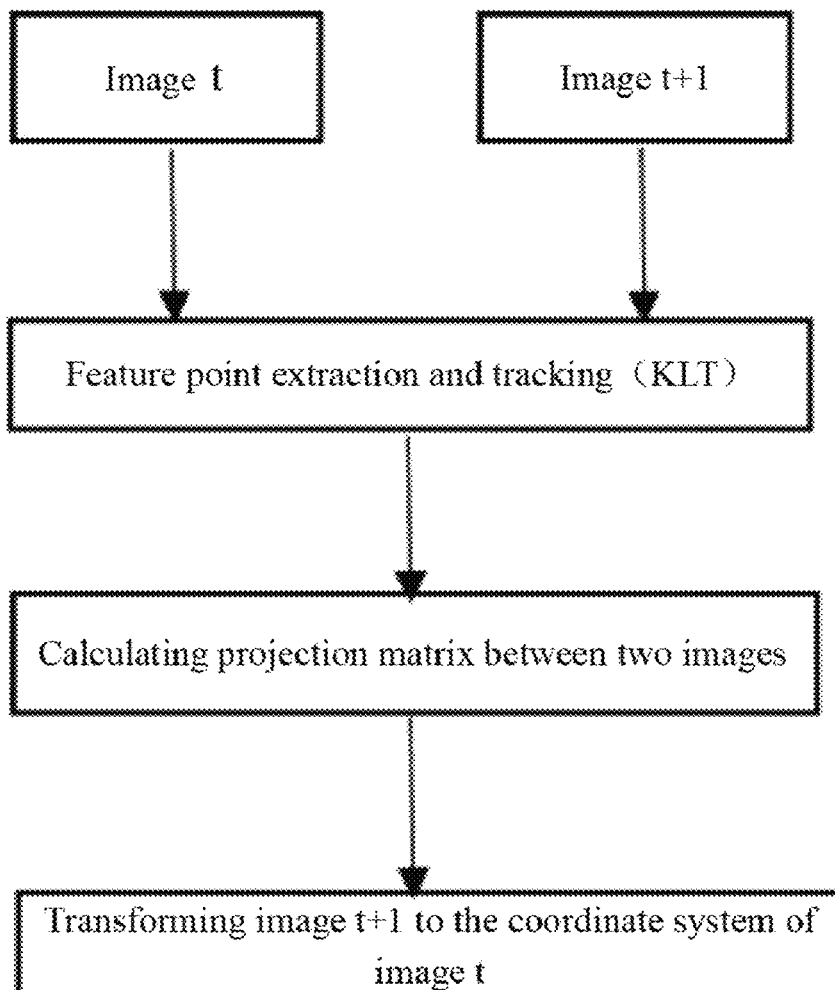
FIG. 8 shows a schematic flowchart of an existing image motion compensation method.

At present, many motion compensation methods are based on sparse optical flow (such as Kanade-Lucas-Tomasi (KLT)) for motion compensation. As an example, FIG. 8 shows a schematic flowchart of an existing image motion compensation method. As shown in FIG. 8, for two adjacent frame images in the video (an image t and an image t+1 shown in the figure, where the image t is the previous frame of the image t+1), the KLT method is used for feature point extraction and tracking. Based on the feature point extraction and tracking results, a homography matrix between the two images is calculated, and then the image t+1 is transformed to the coordinate system of the image t based on the homography matrix, to realize motion compensation for image t+1.

Although the motion compensation may also be achieved by using the above method, since the application of the homography matrix is based on the assumption that the same camera is used to shoot the same plane in different poses, and not all objects have depth in the same plane in the real scene, the coordinate transformation performed through the homography matrix will cause deviation of motion compensation.

Aiming at the above problems existing in the existing technology, in an optional embodiment of the present application, for any frame image of the at least one frame image, the performing motion compensation on the frame image may specifically include: determining depth information of a previous frame image of the frame image; and determining matched pixels of the frame image and the previous frame image of the frame image; determining projection matrix of the previous frame image to the frame image based on the depth information and an image coordinate of each matched pixel in the previous frame image, and an image coordinate of each matched pixel in the frame image; and determining a transformation relationship from the previous frame image to this frame image based on the image coordinate and the depth information of each pixel in the previous frame image and the projection matrix; and re-mapping the frame image to the image coordinate of the previous frame image to obtain the motion-compensated frame image based on the above transformation.

Since the depth of each pixel in the image may be different, when performing motion compensation on each frame image, the depth information of the image will be taken into account, so as to solve the problem of deviation of motion compensation caused by the coordinate transformation through the homography matrix.

Here, the specific method for determining the depth information of each frame image is not limited in the embodiment of the present application. As an optional implementation, for a video capturing device with a telephoto lens and a wide-angle lens, the depth value of the image may be estimated by combining the telephoto lens and the wide-angle lens, and the motion compensation is achieved based on the estimated depth information of the image and the matched pixels between adjacent images. Specifically, taking mobile phones as an example, there are usually telephoto lenses and wide-angle lenses on mobile phones. When performing video capturing, the usually saved and used video frames are video frames captured by the telephoto lenses, but in practical applications, the wide-angle lenses may also perform video capturing synchronically. Therefore, the depth information of the image may be obtained based on the images captured by the wide-angle lenses and the telephoto lenses at the same time t, and the depth information can be incorporated into the motion compensation processing of the image at time t+1 to improve the motion compensation effect of the image.

In addition, in practical applications, in order to better improve the effect of image processing, when performing motion compensation processing on the image, a blurring and denoising processing may also be performed on the image to reduce the influence of noise in the image on the image processing effect. Certainly, in the other optional solutions provided in the present application, the processing may also be performed based on each frame image after blurring and denoising processing. Here, the specific processing method for performing blurring and denoising processing is not limited in the embodiment of the present application, such as Gaussian blurring and median filtering.

Figure 9:
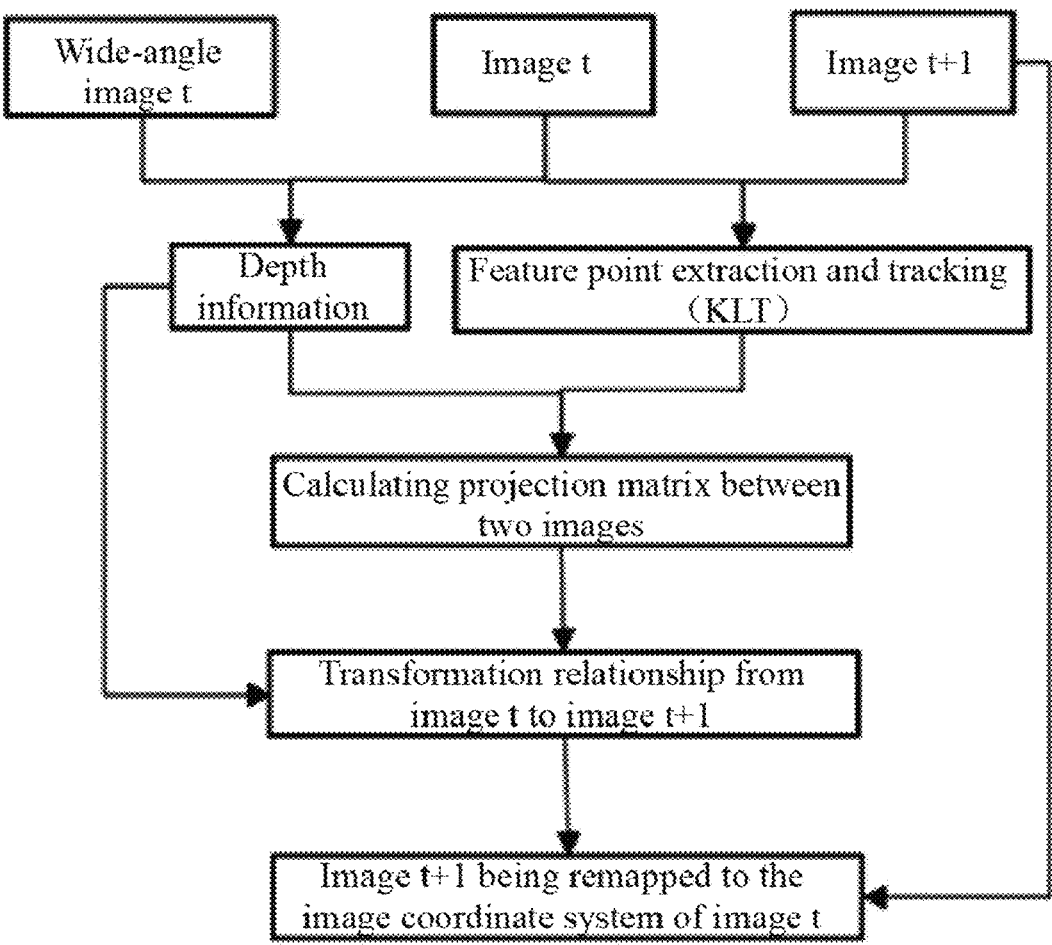
FIG. 9 shows a schematic flowchart of a motion compensation method provided in an embodiment of the present application.

As an example, FIG. 9 shows a schematic flowchart of a motion compensation method provided in the present application. In this example, two adjacent images in a video captured by a camera of a mobile phone are taken as an example for description. An image t+1 shown in the figure is the image captured at time t+1, an image t is the image captured at time t, that is, the image t+1 is the image that needs to be motion-compensated in this example, and the image t is the previous frame image, where the image t+1 and image t are video frames captured by the telephoto lens of the mobile phone, and a wide-angle image t shown in the figure is the video frame at time t captured by the wide-angle lens of the mobile phone. As shown in FIG. 9, the process of performing motion compensation processing on image t+1 in this example may include the following steps.

a. Based on the wide-angle image t and the image t, the depth value (i.e., depth information) of each pixel of the image t is estimated.

b. Based on image t and image t+1, through feature point extraction and tracking, a matched pixel pair in image t and image t+1 is obtained.

It should be noted that the step a and step b may be performed reversely or simultaneously.

Figure 10:
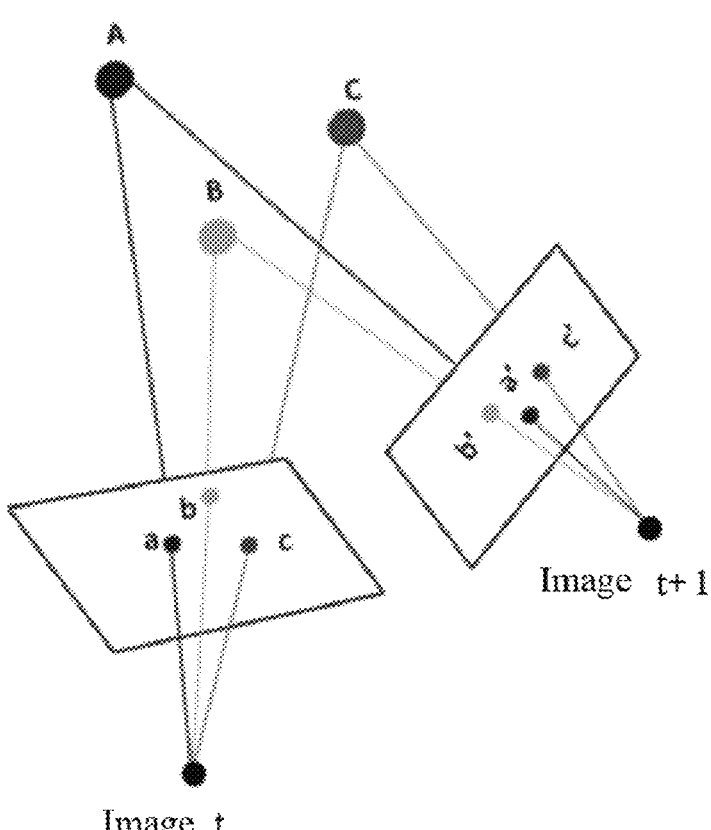
FIG. 10 shows a schematic diagram of matched pixels of two adjacent frame images in an example.

As an example, FIG. 10 shows a schematic diagram of determining the matched pixel pair in the image t and the image t+1. The plane where a, b, and c are located represents the image t, the plane where a', b' and c' are located represents image t+1, the points corresponding to image t and image t+1 represent the center of the telephoto lens (i.e., the coordinate origin of the camera of the telephoto lens). The three pixels a, b, and c in the image t and the three pixels a', b' and c' in the image t+1 are the pixel coordinate pairs that have the same names on the image t and the image t+1 respectively, that is, matched pixels, where a and a' are a pair of matched pixels, b and b' are a pair of matched pixels, c and c' are a pair of matched pixels. Points A, B, and C in the figure are the coordinate points in the world coordinate system corresponding to the three pairs of coordinate points.

c. Projection matrix between the two images is calculated based on the matched pixels and depth information In this step, based on the depth value and image coordinate of each matched pixel in the image t, the three-dimensional coordinate of each matched pixel (that is, the coordinate in the world coordinate system) may be obtained, and projection matrix at time t+1, that is, the projection matrix from image t to image t+1, may be derived according to 3D-2D PnP (3dimensional-2V Perspective-n-Point) method, based on the 3D coordinate of each matched pixel and the image coordinate of each matched pixel in the image t+1.

Specifically, for a certain pixel P on the image, assuming that the coordinates in the world coordinate system and the image coordinate system are expressed as M and m respectively:

$$s\tilde{m}=A[R,t]\tilde{M} \tag{1}$$

Here, s is a scale factor, A is an internal parameter matrix of a camera, [R, t] is collectively referred as an external parameter matrix of a camera, which is expanded as below.

$$s\begin{bmatrix} u \\ v \\ 1 \end{bmatrix} = A[r_1 r_2 r_3 t] \begin{bmatrix} X \\ Y \\ Z \\ 1 \end{bmatrix} \tag{2}$$

Here, u, v are coordinate points of P in the image coordinate system, X, Y, Z represent three-dimensional coordinate points of P in the world coordinate system, $r_1$, $r_2$, and $r_3$ are a 3×3 rotation matrix of the external parameter matrix respectively, t is a 3×1 translation matrix, and [R, t] is projection matrix of the image.

In this step, the world coordinate of each matched pixel may be obtained based on the two-dimensional coordinate and depth value of the matched pixel in the image t in the image coordinate system of the image t, and the projection matrix of the image t+1 may be obtained by using the above formula (2), based on the world coordinate of each matched pixel and the two-dimensional image coordinate of each matched pixel in the image t+1.

For the above formula (2), if the pixels are in the same plane, setting z=0, then:

$$s\begin{bmatrix} u \\ v \\ 1 \end{bmatrix} = A[r_1 r_2 r_3 t] \begin{bmatrix} X \\ Y \\ 0 \\ 1 \end{bmatrix} = A[r_1 r_2 t] \begin{bmatrix} X \\ Y \\ 1 \end{bmatrix} \tag{3}$$

Here, $H=A[r_1 \ r_2 \ t]$, H is a homography matrix, and the above-mentioned formula may be expressed as $s\tilde{m}=H\tilde{M}$.

It can be seen that the difference between the homography matrix and the projection matrix is whether the depth information is taken into consideration.

d. According to the depth information and the above-mentioned projection matrix, the transformation relationship from image t to image t+1 is calculated.

e. Based on the above-mentioned transformation relationship, the image t+1 is remapped to the image coordinate system of the image t.

In practical applications, based on the above-mentioned depth information and projection matrix, if the transformation relationship from image t+1 to image t is directly calculated, it is very likely that some pixels in coordinate system of image t are not projected due to the transformation and the rounding of the projected coordinates and thus have no value. When multiple pixels in the image t+1 correspond to the same pixel in the image t, and when the image t+1 is remapped to the image coordinate system of the image t, some pixels in the remapped image may have no value. In order to solve this problem, the transformation relationship from image t to image t+1 should be calculated first, and then the image t+1 is remapped to the image coordinate system of image t.

Here, the specific implementation of the transformation relationship from the image t to the image t+1 being calculated according to the depth information and the above-mentioned projection matrix, and the image t+1 being remapped to the image coordinate system of the image t based on the transformation relationship from the image t to the image t+1 can be achieved by using existing technology, which will not be detailed here.

The aforementioned motion compensation solution provided in the embodiments of the present application can effectively reduce the influence of unconscious motion on event detection. As an example, FIG. 11 shows a schematic diagram of a motion compensation result. In this example, for the image t and the image t+1, the blurring and denoising processing may be performed on the image t+1 firstly to obtain the processed image at time t+1 (the blurred image t+1 shown in the figure), and then the motion compensation calculation may be performed on the blurred image t+1 based on the image t and the depth information of the image t (not shown in the figure), to obtain the motion-compensated image (the motion compensated image t+1 shown in the figure).

It should be noted that in practical applications, when performing motion compensation processing on image, the blurring and denoising processing may be performed on each frame image of the video firstly, and the image compensation is performed based on each processed frame image. In the example as shown in FIG. 11, the blurring and denoising processing may be performed on the image t, and the denoised and blurred image may be used in the motion compensation processing. For different application scenarios, whether to perform blurring and denoising processing is selected according to needs. If the storage space of the device is limited, the blurring and denoising processing may not be performed or only performed on the next frame image. If the device is with high configuration, the blurring and denoising processing can be performed on each frame image.

From the foregoing description, it can be seen that the video processing method provided in the embodiments of the present application is also applicable to the scenario where the video shooter moves the video capturing device autonomously and consciously, that is, the scenario where a person moves a device. For example, if the user shoots the target object under multiple view angles by moving the mobile phone, at this time, the movement of the capturing device is controlled by the user, not the user's unconscious movement. For this situation, after the user's movement type is determined as the user's conscious movement, for example determining by using IMU data, as an optional solution, the solution provided in any optional embodiment of the present application may be used to process the video, without performing motion compensation, and the video clip in which the event occurs is determined. As another optional solution, the video clip corresponding to the conscious movement of the user may be directly determined as the video clip in which the event occurs.

For another application scenario, if there is both a clip of the user consciously moving and a clip of the user unconsciously moving in the video to be processed, the present application also provides the following optional processing methods.

a. Regardless of including which type of movement, processing steps such as optical flow information acquisition, motion feature extraction, and detection of clips in which an event occurs based on motion features may all performed on the video to determine the clip in which an event occurs. Certainly, if there is a situation where the user moves unconsciously, the motion compensation processing may also be performed on the video before processing.

b. The video is divided into clips according to the set duration, and the movement type for each clip is determined. For clips of unconscious movement, the corresponding processing method with motion compensation is used. For clips of conscious movement, the corresponding processing method is used. If a divided clip also has two movement types, it may be further divided, or a main movement type is determined according to the duration corresponding to the two movement types, and then the processing method corresponding to the main movement type is adopted.

c. The clip corresponding to the conscious movement in the video is directly intercepted as the clip in which the event occurs, and the remaining part of the video is processed by the solution shown in FIG. 1. If the remaining part contains unconscious movement, the motion compensation will be performed firstly.

In an optional embodiment of the present application, the determining a video clip in which an event occurs in the video to be processed may include: acquiring optical flow information of at least one frame image in a video to be processed; extracting motion features of the at least one frame image based on the at least one frame image and the optical flow information of the at least one frame image; determining motion state representation information of the at least one frame image, based on the motion features of the at least one frame image; and determining the video clip in which an event occurs in the video to be processed, based on the motion state representation information of each frame image.

Here, for a frame image, the motion state representation information is used to represent the image scene information or how much the image content has changed. The specific representation method of the motion state representation information is not limited in this embodiment of the application. As an optional manner, the information may be a quantified value, such as a score or probability. For the convenience of description, in the following example description, the motion state representation information will be represented by the image score as an example. The higher the image score is, the more likely the image has motion.

In the following, the methods of determining various information (including optical flow information and image motion state representation information) of the video clip in which the event occurs in the video to be processed, and detecting the event in the video based on those information are illustrated in detail in connection with several different optional manners.

1. Optical Flow Information

Optical flow is an important feature used to analyze time series images. The optical flow reflects the motion of object to a large extent, and the occurrence of event is generally accompanied by the motion of object. Therefore, when detecting a clip in which an event occurs in the video based on the optical flow information of the image, how to quickly and accurately calculate the optical flow of each frame image is a problem that must be solved.

As an optional manner, when determining the optical flow information of the image, in order to achieve super real-time or at least real-time performance on the mobile terminal, a sparse optical flow strategy may be adopted. Specifically, corner points on the current image are calculated firstly, and then the motion of the pixel for each corner point is calculated according to the adjacent frames. However, the sparse optical flow has low accuracy. But more importantly, in the event detection, we mainly focus on the movement of the target subject rather than the motion of the background. If the background is complex and the foreground lacks texture, it is possible that all the corner points fall on the background, therefore the calculated optical flow cannot represent the motion of the target subject in the image at all, and even if part of corner points falls on the foreground, the effect will be greatly influenced under the interference of the background, which is obviously unreasonable.

In order to improve the detection performance, as another optional manner, a dense optical flow can be used. The dense optical flow may achieve higher accuracy while avoiding the problem of no foreground optical flow being obtained. For example, a Farneback algorithm may be used to calculate the dense optical flow algorithm of the image.

Although dense optical flow has higher accuracy than sparse optical flow, it still does not completely solve the problem of background optical flow interference, and the calculation speed of dense optical flow is slower than sparse optical flow, therefore it is difficult to achieve real-time.

Aiming to solve the problems in the above-mentioned two optional manners, an optional manner of determining image flow information is provided in an optional embodiment of the present application. For any frame image in the above at least one frame image, acquiring optical flow information of the frame image may include: determining a motion area of the frame image; and determining dense optical flow of the frame image based on the motion area in the frame image and a next frame image of the frame image.

Optionally, for any frame image, determining the dense optical flow of the frame image based on the motion area in the frame image and a next frame image of the frame image may include any of the following: performing dense optical flow calculation based on the motion area in the frame image and an image area of the next frame image of the frame image corresponding to the motion area, to obtain the dense optical flow of the frame image; or calculating the dense optical flow corresponding to the frame image based on the frame image and the next frame image of the frame image, and using the motion area part of the frame image in the calculated dense optical flow as the dense optical flow of the frame image.

In this solution of the present application, when calculating the dense optical flow of an image, only optical flow in motion area (also called a foreground image area) that can represent the movement of a target subject in the image is calculated, that is, the motion area is used as a mask image of the image, and only the dense optical flow in the mask range is used as the dense optical flow of the image. While retaining the advantages of high precision of dense optical flow, this method not only reduces the calculation amount, but also avoids the influence of background optical flow on the final result and avoids the loss of foreground optical flow.

In the dense optical flow determination solution provided in the embodiments of the present application, for a frame image, when determining the motion area of the frame image, the motion target in the frame image may be detected based on the frame image and at least one frame image after the frame image (such as, the defined number of images adjacent to and after the frame image), the pixels corresponding to the motion target are marked in the frame image as the motion mask of the image, and further a motion area is determined in the frame image and the next frame image of the frame image based on the motion mask, so that the dense optical flow of the frame image corresponding to the motion area is obtained according to the motion area of the frame image and the next frame image. If there are multiple motion targets in the image, there may be multiple motion areas. When there are multiple motion areas, the dense optical flow of the image is calculated based on the corresponding motion area pairs in the two adjacent frame images; or the dense optical flow of the entire image is calculated based on the two adjacent frame images, and the dense optical flow corresponding to each motion area is selected from the dense optical flow of the entire image to obtain the final dense optical flow of the image.

Figure 12A:
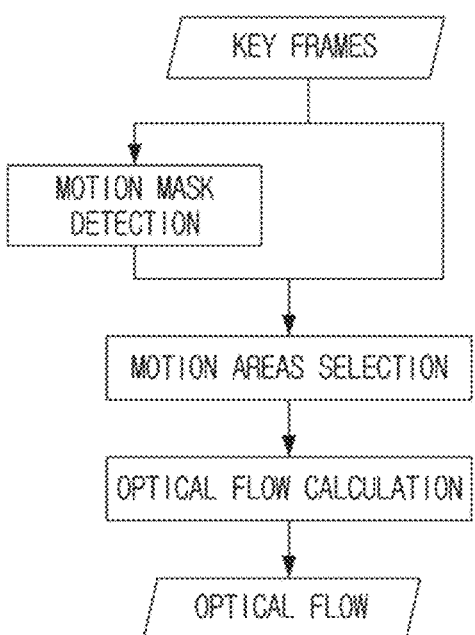
FIGS. 12A and 12B show two schematic flowcharts of determining image optical flow information provided in the present application.
Figure 12B:
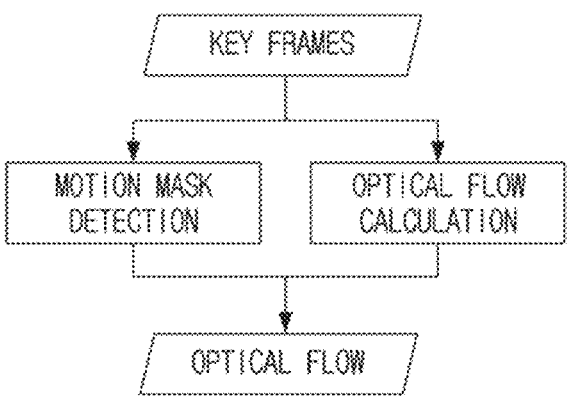

FIGS. 12A and 12B show two schematic flowcharts of calculating the dense optical flow of an image. In this example, the video to be processed is a video stream determined by key frame selection. For one method, as shown in FIG. 12A, for at least one key frame, the motion area of the frame (motion mask detection) is determined firstly, corresponding areas in the frame and in the next frame of the frame are selected based on the motion area (motion area selection), and then the dense optical flow is calculated based on the corresponding areas in the two frames, to obtain the dense optical flow of the frame. For another method, as shown in FIG. 12B, for at least one key frame, the motion area of the frame is determined, and the dense optical flow of the entire image is calculated based on the frame and the next frame of the frame, and then the optical flow corresponding to the motion area in the dense optical flow of the entire image is regarded as the dense optical flow of the frame.

Optionally, in practical applications, it is assumed that a frame image is the image at time t, and a next frame of the frame is the image at time t+1. Since the image at time t+1 is used in both the motion mask detection and the optical flow detection. The motion information of the image at time t+1 has been fully utilized. Therefore, for the video to be processed, when calculating the optical flow information of each frame of the video, the optical flow information may be calculated every other frame. As in the above example, the optical flow information of the image at time t+1 may not be calculated, that is, after the optical flow information of the image at time t is calculated, then the optical flow information of the image at time t+2 is calculated, which further reduces the calculation amount and reduces data processing time. Certainly, the optical flow information of each frame may also be calculated. Here, for the optional solution of calculating optical flow information every other frame, for frames for which optical flow information is not calculated, optionally, the optical flow information thereof may use the optical flow information of the previous frame or the pre-configured optical flow value, such as 0 or other values. Optionally, only each frame image for which the optical flow information is calculated will be processed in the subsequent processing steps.

Optionally, when determining the dense optical flow of the frame image based on the foreground image area (that is, the motion area) in the frame image and the next frame image of the frame image (or the image area corresponding to the foreground image area in the next frame image of the frame image), in order to avoid the loss of the target in the next frame image due to the motion of the target, after the corresponding areas in the two adjacent frames are determined based on the mask (which may be referred to as the mask area), for example, after the mask area in the two adjacent frames is determined based on a minimum circumscribed rectangle of the mask, for the next frame image, a boundary of certain pixels may be added to the determined mask area, that is, pixel expansion is performed on basis of the mask area, such as expanding the boundary around by a width of set pixels to ensure that the target will not be lost in the motion area of the next frame image, and then the dense optical flow of the previous frame image is calculated based on the mask area of the previous frame and the expanded mask area of the next frame. Here, when expanding the pixel boundary, how much boundary to increase may be configured according to empirical values, that is, the width of pixels to be expanded may be pre-configured. It may be expanded in the four directions of the area (the minimum circumscribed rectangle of the mask) during expansion. It may also additionally add a boundary of certain pixels in considering the number of motion pixels in the image.

Optionally, when expanding, it may be expanded horizontally and/or vertically, or the direction of expansion may be determined according to the direction of motion of the object in the image in considering of the inertia of motion of the object (because the motion is continuous with a certain inertia, for example, if the object moves 10 pixels at time t–2, it is more likely that it moves 10 pixels at time t). For example, the direction of expansion may be right if the motion direction of the object is determined to be right according to the dense optical flow at time t–2. Or it may be expanded in both the motion direction and the non-motion direction of the object, but the expansion width in the motion direction and the non-motion direction may be different. For example, for the motion direction, it may be determined according to the distance moved by the moving pixel. For example, the number of expanded pixels is determined according to the distance moved by the pixel in which the motion occurs and a set expansion coefficient. Optionally, the expansion coefficient may be a value no less than 1, to avoid the omission of pixels in which the motion occurs. For example, when the object moves a distance of 10 pixels at time t–2 and the expansion factor is 1.1, the expanded pixel width may be equal to 11 pixels. For the non-motion direction, it may be expanded by a set value. In addition, if the object motion direction is an irregular motion, for example, motion in non-horizontal or vertical direction, such as moves along the diagonal of the image, it will be expanded in both the horizontal and vertical directions.

As an optional solution, the size of the expanded area may be determined based on the optical flow of the previous frame image at time t–2. For any motion area, the number of expanded pixels may be expressed as:

$$\max(\text{expansion factor} \times \text{average optical flow of the motion area}, \text{threshold})$$

Where the expansion coefficient is a set coefficient. If it is expanded in the horizontal direction, the size may be the width of the minimum circumscribed rectangle of the motion area. The average optical flow of the motion area at time t–2 is the mean of the optical flow of the motion area in the next frame image t, and the threshold is a set value, which may be an empirical value and/or an experimental value. If it is expanded in the vertical direction, the size may be the height of the minimum circumscribed rectangle, and the threshold in the horizontal and vertical directions may be different.

Figure 12C:
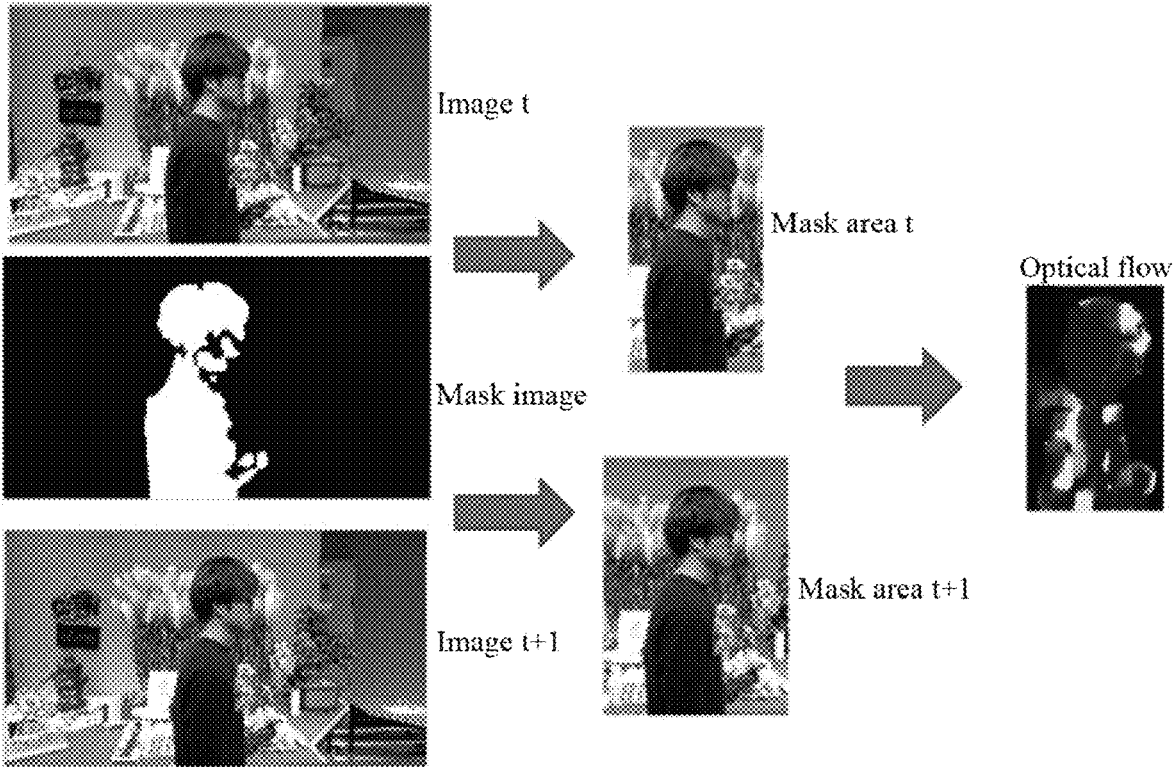
FIG. 12C shows a schematic diagram of a principle of determining image optical flow information in an example of the present application.

As an example, FIG. 12C shows a schematic flowchart of calculating the dense optical flow of an image based on the method provided in an embodiment of the present application. As shown in FIG. 12C, in order to calculate the optical flow of a frame image t captured at time t, a corresponding area may be intercepted on the image t to obtain the mask area t and a corresponding area may be intercepted on the next frame image of image t (the image t+1 shown in the figure) based on the minimum circumscribed rectangle of the mask area in the mask image of the image t, the mask area t+1 is obtained after a certain area is expanded outward based on this area, and the optical flow information of the image t is calculated based on the mask area t and the mask area t+1.

It should be noted that, when calculating the optical flow information of the current frame image based on the mask area of the current frame image and the mask area of the next frame image of the current frame, if an expanded processing method is adopted, the expansion may be performed on both the mask area of the current frame image and the next frame image of the current frame image, that is, the size of the mask area in the two images is the same.

In an optional embodiment of the present application, the determining the video clip in which the event occurs in the video to be processed may include: determining the optical flow information of at least one frame image in the video to be processed; for any frame image of the at least one frame image, sorting the optical flow information of the frame image according to an ascending order of the optical flow value, and determining motion state representation information of the at least one frame image based on the sorted optical flow values in a set confidence range; and determining a video clip in which an event occurs in the video to be processed based on the motion state representation information of at least one frame image.

Figure 13:
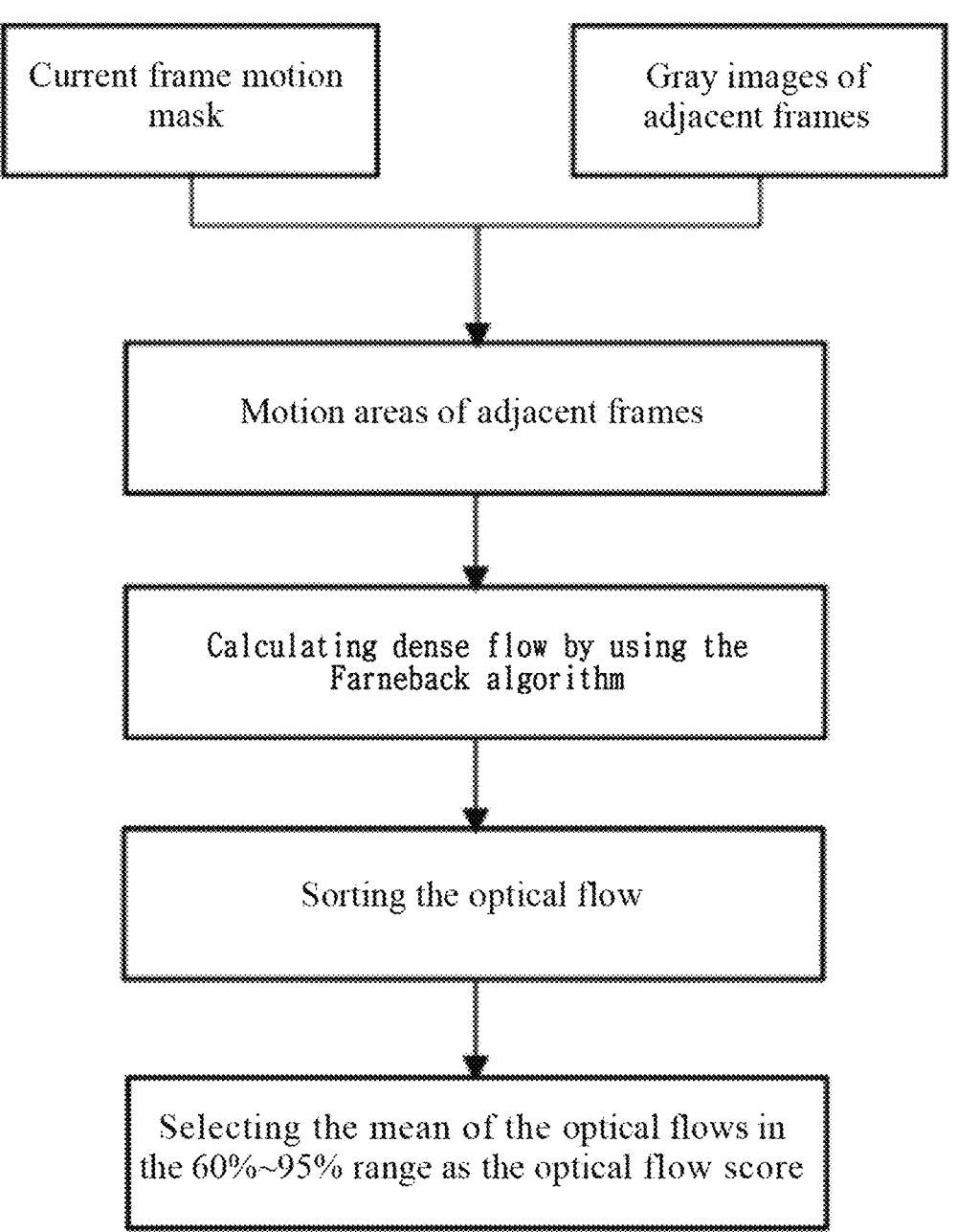
FIG. 13 shows a schematic flowchart of determining an image score based on optical flow information in an example of the present application.

After the optical flow information of the image is determined, as an optional solution, the image score may be determined based on the optical flow information. As an example, FIG. 13 shows a schematic flowchart of determining an image score based on the optical flow information of the image provided in an embodiment of the present application. As shown in FIG. 13, the method may include the following steps.

For a current frame (that is, the previous frame in two adjacent frames), based on the determined motion mask (that is, the motion area) of the current frame, the motion areas in the gray images of the two adjacent images (that is, the above-mentioned mask area) are obtained, the mask area in the two frames is calculated, the dense optical flow of the previous frame is calculated by using the Farneback optical flow algorithm to obtain an optical flow matrix. Here, the size of the optical flow matrix is the same as the mask area of the previous frame image, and each element in the matrix has two values, which respectively represent the amount of motion (offset or movement value) of the corresponding pixel in the x direction and the y direction.

Since the optical flow is composed of the movement values in the two directions, that is, x direction and y direction, and the event detection only cares about whether there is motion, not the direction of the motion, so for each pixel, the sum of the absolute value of the optical flow value f_x in the x direction and the absolute value of the optical flow value f_y in the y direction is used as the optical flow value fat this pixel, that is, $f=|f\_x|+|f\_y|$. When determining the image score based on optical flow information, in order to ensure that a large action clip can be detected and to remove possible noise interference, the optical flow value of each pixel is sorted from small to large, and the averaging is calculated by selecting the confidence range (60-95% of the range).

This method is used to determine the image score, which has a fast computing speed and does not depend on any additional data. However, this method only uses the statistical information of the optical flow, and the optical flow reflects the motion relationship between the two frame images and cannot consider the information of the previous images to score the motion results.

2. Motion Area, Also May be Referred as a Foreground Image Area, that is, the Above-Mentioned Mask Area The embodiment of the present application also provides a solution for determining the foreground image area (that is, the motion area) in the image. When calculating the optical flow information of the image, the method of determining the foreground image area provided in this solution may be used. Certainly, in practical applications, the existing method of determining the foreground image area may also be used.

Since the event detection is to detect a video clip in which the motion exists in the video, the present application may use a brightness change $I^{t+1}(x, y)-I^t(x, y))$ of the pixel (x, y) corresponding to the image frame at adjacent times (t, t+1) to determine whether an event occurs at the pixel, wherein $I^{t+1}(x, y)$ represents the brightness information of the pixel at the (x, y) coordinate in the image frame at time t+1, and I'(x, y) represents the brightness information of the pixel at the (x, y) coordinate in the image frame at time t.

Due to the video capturing device (such as the user's mobile phone) unable of maintaining absolute stillness and the automatic adjustment of the aperture during the video recording process, the reliability of the result of the motion discrimination of the pixel by using only the corresponding pixels of the two frame images at adjacent moments is low. To solve this problem, in an optional embodiment of the present application, for any one frame image of the above-mentioned at least one frame image, determining the motion area of the frame image may specifically include: determining the motion area in the frame image based on the brightness information of the frame image and the brightness information of a defined number of frame images after the frame image.

Here, the specific numerical value of the above-mentioned defined number of frame images is not limited in the embodiment of the present application, and may be configured according to actual needs. For example, it may be set as 4, the motion area of the first frame image in five frame images may be determined for every consecutive five frame images.

The solution provided in the embodiment of the present application may merge image information at more times when determining the motion area of the image, thereby improving the accuracy of the determined motion area.

Optionally, for any frame image in above-mentioned at least one frame image, the determining the motion area of the frame image based on brightness information of the frame image and brightness information of the defined number of frame images after the frame image includes: dividing the frame image and the defined number of frame images after the frame image into several image blocks; and determining the motion area of the frame image based on brightness information of each image block at the same position in the frame image and the defined number of frame images after the frame image.

Meanwhile, the neighborhood information of the pixel (x, y) may be added to build a Gaussian background model for the block of the pixel (x, y), that is, the Gaussian background model may be built in units of image blocks. The addition of more information enhances the robustness of the model and reduces the calculation amount (it is not required to build a Gaussian background model for each pixel), and increase the tolerance for brightness deviations between images due to a slight offset between the images (error of motion compensation) and automatic adjustment of International Standardization Organization (ISO) at the same time.

As an optional manner, for an image block in a frame image, the determining the motion area of the frame image based on the brightness information of image block at the same position in the frame image and the defined number of frame images after the frame image includes: for at least one divided image block, determining a brightness mean and a brightness variance of a Gaussian background model corresponding to the image block through the Gaussian background model, based on the brightness information of the image block in the frame image and the brightness information of the defined number of frame images after the frame image; and determining whether each pixel in the frame image is a motion pixel in the frame image or whether the image block is the motion area of the frame image, based on brightness information of each pixel of the image block in the frame image and the brightness mean and the brightness variance of the Gaussian background model corresponding to the image block.

Background modeling is also called background estimation, and its main purpose is to transform a problem of the motion target detection for serial of images into a two-classification problem based on the current background estimation. All pixels are divided into two classes, that is, background and motion foreground, and then classified result is post-processed to obtain the final detection result. In the single distribution Gaussian background model, for a background image, the distribution of the brightness of a specific pixel or image block (usually the gray value of the pixel or the gray mean of the image block) satisfies the Gaussian distribution, that is, for the background image B, a brightness mean value of each image block (x, y) (such as a rectangular box containing 3×3 pixels) satisfies B(x, y)~N(μ, d) (that is, B(x, y) satisfies a Gaussian distribution with the mean of μ and the variance of d):

$$P(B(x, y)) = \frac{1}{\sqrt{2\pi}\,d} e^{-\frac{(B(x,y)-\mu)^2}{2d^2}} \tag{4}$$

Here, B(x, y) represents a brightness value of a pixel with a coordinate point (x, y) or an brightness mean of pixels in the image block (x, y), P(B(x, y)) represents a Gaussian distribution probability of B(x, y), μ represents an brightness mean of Gaussian distribution at the image block (x, y) where the coordinate point (x, y) is located or the image block (x, y) in the background image B, and d is a brightness variance of Gaussian distribution at the image block (x, y).

When detecting the foreground or background area, the mean u and variance d of each image block at the same position in the video sequence image over a period of time may be calculated as a background model. For an arbitrary image G containing the foreground, for the calculating of a brightness value of the pixel (x, y) in the corresponding pixel block or the brightness mean of pixels in the image block (x, y) on the image, if:

$$\frac{1}{\sqrt{2\pi}\,d} e^{-\frac{(G(x,y)-\mu)^2}{2d^2}} > T \tag{5}$$

Here, T is a constant threshold, it is considered that this point is a background point (it may also be considered that the corresponding image block is a background image block), otherwise it is considered to be a foreground point (it may also be considered that the corresponding image block is a foreground image block).

Here, G(x, y) in the above formula represents the brightness value of the pixel of the coordinate point (x, y) in the image G or the brightness mean of the pixels in the image block (x, y), and μ and d respectively represent the brightness mean and brightness variance of the Gaussian background model corresponding to the frame image at the current moment in the video sequence image.

For the solution provided in the embodiment of the present application, for a frame image, when the determining the motion area of the frame image by the Gaussian background model based on the brightness information of the image block at the same position in the frame image and the defined number of frame images after the frame image, it may determine whether the area corresponding to the image block is a motion area (that is, whether all the pixels in the corresponding area of the image block are foreground points), or whether each pixel in the corresponding area of the image block is a motion pixel (also called foreground point/foreground pixel), by using the brightness information of image block at the same position in the frame image and the defined number of frame images after the frame image. Specifically, taking the defined number of frame images being 4 as an example, the motion area of the current frame may be determined based on the current frame image and the 4 frame images after the current frame. At this time, for an image block, the gray mean (that is, the brightness mean) and the gray variance (the brightness variance) of the Gaussian background model of the image block in the current frame may be determined based on the gray value of each pixel in the image block in the five frame images.

For example, for the above five frame images, it is assumed that the image at time t is the current frame image, for time t, μ is the brightness mean of the image block (x, y) in the image at time t, and for time t+1, μ is the brightness mean corresponding to the two image blocks (x, y) in the image at time t and the image at time t+1, and so on, for the image at the last moment, the mean μ is the brightness mean of corresponding image blocks in the five frame images. Assuming that the size of the image block (x, y) is 3×3 pixels, when determining whether the image block (x, y) in the image at time t is a foreground image area, or determining whether each pixel in the image block is a foreground pixel, the brightness mean and brightness variance of the Gaussian background model may use the mean and variance of the image block corresponding to the fifth frame image in the above five frame images. Specifically, if the brightness value G(x, y) of any pixel (x, y) in the image block at time t or the brightness mean G(x, y) of the pixels in the image block (x, y) satisfies:

$$\frac{1}{\sqrt{2\pi}\,d}e^{-\frac{(G(x,y)-\mu)^2}{2d^2}} > T \tag{5}$$

Then the pixel (x, y) may be considered to be the background point in the image at time t, or the image block (x, y) in the image at time t may be considered to be the background image block, that is the background image area, otherwise it is the foreground point or the foreground image area.

In practical applications, in order to meet the needs of different scenarios, the required image processing granularity may be selected according to the needs. For example, for a coarse-grained processing method, the image block is treated as unit to be judged, if it is greater than Tin the above formula, the image block belongs to background block and the pixels in the image block can be considered as background pixels (background block), for a fine-grained processing method, pixel in the image block is treated as unit to be judged, if it is greater than T, each pixel in the image block may be considered as a background point. Here, when a coarse-grained processing method is used, for an image block, the above G(x, y) represents the brightness mean of pixels in the image block. When a fine-grained processing method is used, G(x, y) represents the brightness value of each pixel in the image block.

Here, the specific model adopted by the above-mentioned Gaussian background model is not limited in the embodiment of the application. For example, a single distribution Gaussian background model may be used, or a dual-single distribution Gaussian model may also be used. These two models are taken as examples for further description below.

A. Single Distribution Gaussian Background Model (May be Referred to as Single Gaussian Model, Single Gaussian Background Model, Etc.)

For video sequence images (such as the current frame image and the 4 frame images after the current frame image), the input image is divided into blocks firstly, for example, blocks of N×N with same size, and the Gaussian model of each block is calculated, wherein the Gaussian model is determined by the mean and variance. The key point of establishing a Gaussian model is to update the mean and variance of the model based on time.

For an image block i (referred to as block i), the gray value (that is, the brightness value) of pixel j at time t (i.e., the frame image at time t) is $$I_j^{(t)}, \text{ and } G_i^{(t)}$$

represents all pixels of block i at time t, and the number of pixels in this block may be expressed as $$|G_i^{(t)}|.$$

The gray mean and variance of block i at time t are denoted as $$M_i^{(t)} \text{ and } V_i^{(t)}$$

respectively. The average, variance and age of the Gaussian model of block i at time t are $$\mu_i^{(t)}, \sigma_i^{(t)}, \alpha_i^{(t)},$$

then the gray average and variance of the image block at time t may be expressed as:

$$M_i^{(t)} = \frac{1}{|G_i|}\sum_{j\in G_i} I_j^{(t)} V_i^{(t)} = \max_{j\in G_i}\left(\mu_i^{(t)} - I_j^{(t)}\right)^2 \tag{6}$$

The Gaussian model average update, variance update, and age update of the image block at time t may be expressed as:

$$\mu_i^{(t)} = \frac{\alpha_i^{(t-1)}}{\alpha_i^{(t-1)}+1}\mu_i^{(t-1)} + \frac{1}{\alpha_i^{(t-1)}+1}M_i^{(t)} \tag{7}$$

$$\sigma_i^{(t)} = \frac{\alpha_i^{(t-1)}}{\alpha_i^{(t-1)}+1}\sigma_i^{(t-1)} + \frac{1}{\alpha_i^{(t-1)}+1}V_i^{(t)}$$

$$\alpha_i^{(t)} = \alpha_i^{(t-1)} + 1$$

It can be seen that for an image block at the same position in a consecutive multiple frame images, the gray average of the Gaussian model corresponding to the image block of the current frame image is determined based on the gray mean of Gaussian model corresponding to the image block of the previous frame images and the gray mean of the image block of the current frame image. Similarly, the gray variance is determined based on the same principle.

Based on the above-mentioned single Gaussian distribution model, for each image block at the same position in consecutive multiple frame images, the gray mean and gray variance corresponding to the image block in the last frame image may be taken as the initial gray mean and gray variance of the Gaussian model corresponding to the image block.

Figure 14A:
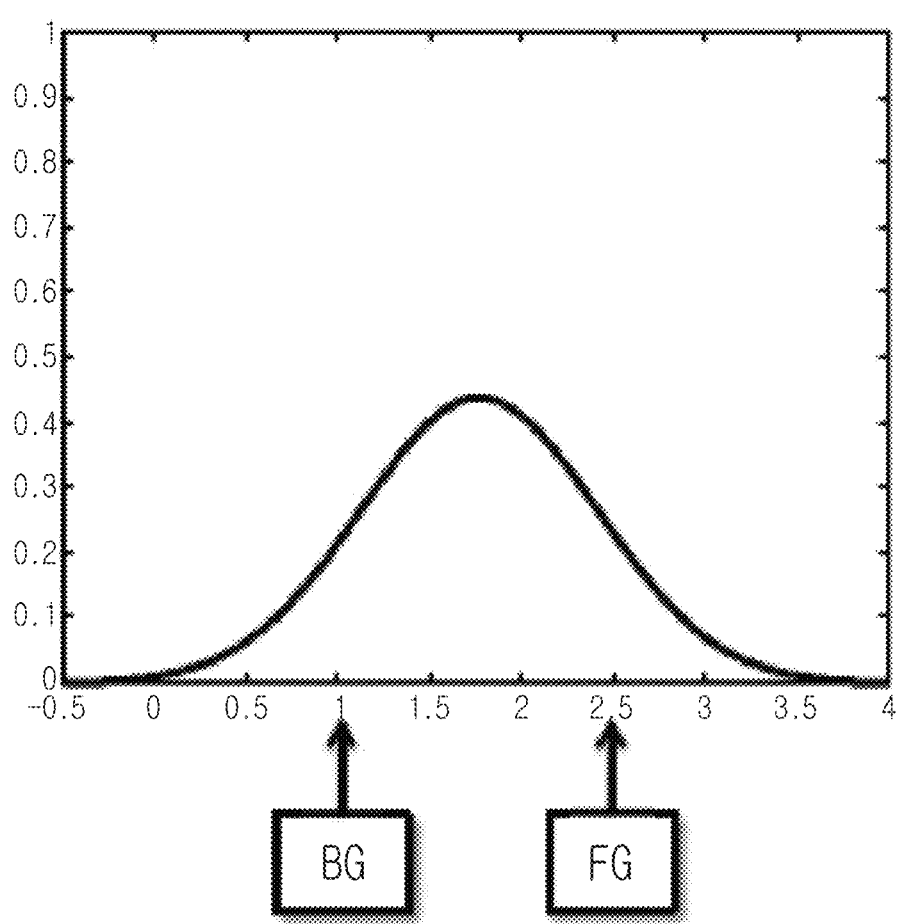
FIG. 14A shows a schematic diagram of probability distribution of a single distribution Gaussian background model.

B. Dual-Single Distribution Gaussian Background Model (Also Called Dual-Single Gaussian Model):

For a single distribution Gaussian model, since the foreground information and background information are both used for the establishment of the Gaussian model, the Gaussian model's mean is centered and the variance is too large, which does not facilitate the determination of the foreground. The probability distribution diagram of the single Gaussian model is shown in FIG. 14A. The abscissa in the diagram represents the gray value in the image, and the ordinate represents the distribution probability corresponding to the gray value. It can be seen from this diagram that when determining whether a pixel or image block is a foreground point based on the above-mentioned threshold T, the probability of the foreground (FG shown in the figure) and background (BG shown in the figure) is same on the Gaussian model.

In order to solve this problem of the distribution Gaussian model, two single distribution Gaussian models may be used, that is the dual-single Gaussian model, and one is a Gaussian model representing the image block (apparent), which is an existing Gaussian model currently used, and one is a candidate Gaussian model (candidate).

Based on the dual-single Gaussian model, the above-mentioned image block i is still taken as an example for description. The conditions for the image block i to be included in the existing Gaussian model, that is, apparent, are:

$$\left(M_i^{(t)} - \mu_{A,i}^{(t)}\right)^2 < \theta_s \sigma_{A,i}^{(t)} \tag{8}$$

Here, $\theta_s$ is a predefined threshold coefficient, $$\mu_{A,i}^{(t)}, \sigma_{A,i}^{(t)}$$

represent the gray average and variance of the existing Gaussian model of block i at time t respectively. If this condition is met, the existing Gaussian model is updated according to steps of the single Gaussian model.

Conditions for the image block i to be included into the candidate Gaussian model are as below:

$$\left(M_i^{(t)} - \mu_{C,i}^{(t)}\right)^2 < \theta_s \sigma_{C,i}^{(t)} \tag{9}$$

Similarly, $$\mu_{C,i}^{(t)} \text{ and } \sigma_{C,i}^{(t)}$$

represent the gray average and variance of the candidate Gaussian model of block i at time t respectively. If this condition is met, the candidate Gaussian model is undated according to steps of the single Gaussian model.

A condition for the candidate Gaussian model to replace the existing Gaussian model:

$$\alpha_{C,i}^{(t)} > \alpha_{A,i}^{(t)} \tag{10}$$

$$\alpha_{A,i}^{(t)}, \alpha_{C,i}^{(t)}$$

represent the age of the existing Gaussian model and the candidate Gaussian model respectively, and may also be understood as the times that the model has been updated.

Figure 14B:
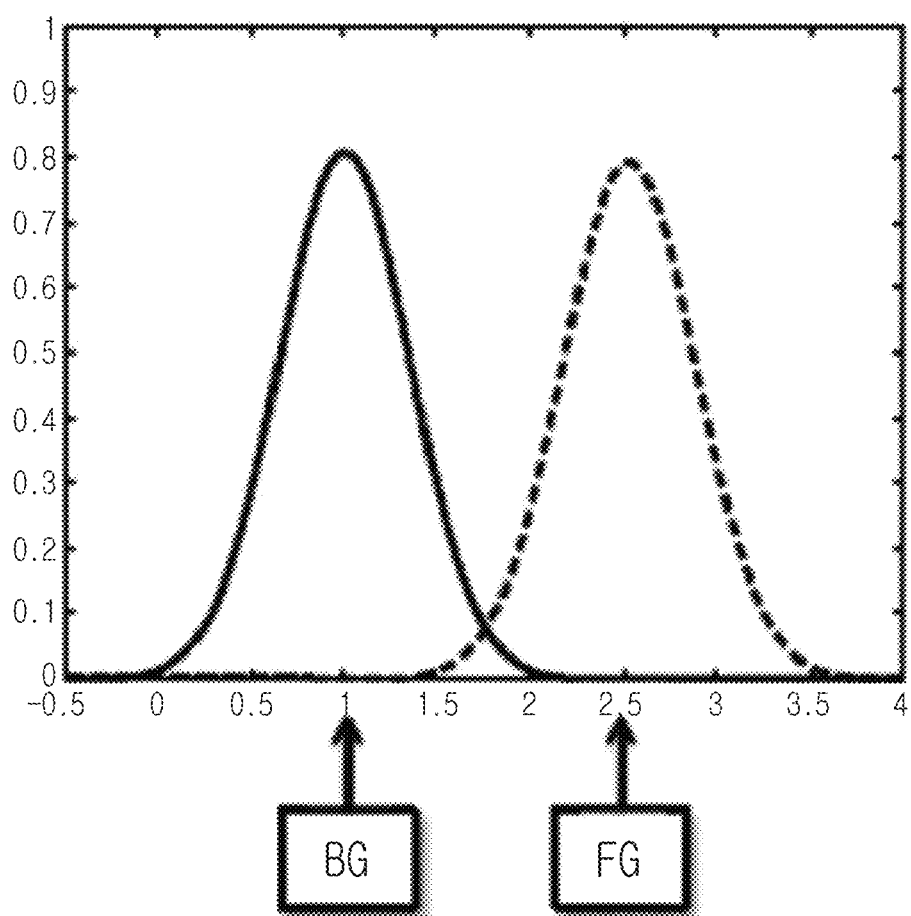
FIG. 14B shows a schematic diagram of probability distribution of a dual-single distribution Gaussian background model.

In other words, only when the candidate Gaussian model is older than the existing Gaussian model, the candidate model will replace the existing model, that is, the more the number that the image block i belongs to the model along the time sequence, the greater the possibility of the background. FIG. 14B shows the probability distribution graph of the dual-single Gaussian model. The solid line in the figure corresponds to the existing Gaussian model, and the dashed line corresponds to the candidate Gaussian model. By comparing FIG. 14A and FIG. 14B, it can be seen that there is a background pixel with a gray value of 1 and a foreground pixel with a gray value of 2.5. For the existing Gaussian model, the background pixel with the gray value of 1 will be determined as a background point, and the foreground pixel with the gray value of 2.5 will be determined as a foreground point, to effectively solve the problem of the single distribution Gaussian background mode.

Figure 15:
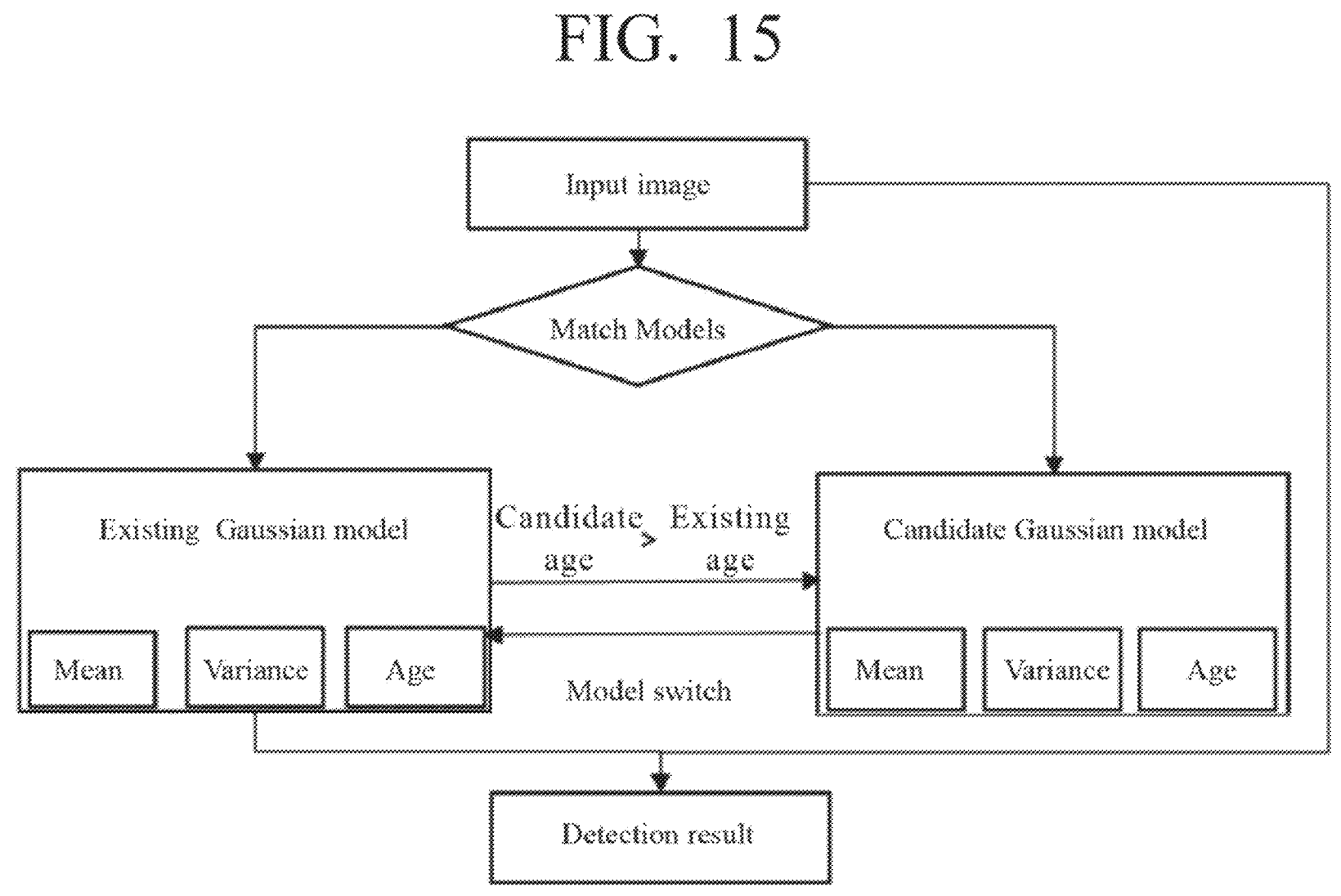

As an example, FIG. 15 shows a schematic flowchart of a motion area detection based on a dual-single Gaussian model provided in an embodiment of the present application. Here, during initialization, both the existing Gaussian model and the candidate Gaussian model of the dual-single Gaussian model have an initial mean and variance. As shown in FIG. 15, for a frame image (the input image shown in the figure), the detection process may include:

For the input image, a model matching is performed based on the above-described condition for being divided into the existing Gaussian model or being divided into the candidate Gaussian model (the potential Gaussian model shown in the figure). After which Gaussian Model is determined, the corresponding model parameters are updated like mean, variance and model age based on the image brightness information. Then, the probability value of Gaussian distribution corresponding to the pixel and image block of the image is determined based on the brightness information of the image and the updated mean and variance, whether the pixel or image block is the foreground or the background may be determined based on the probability value and the above-mentioned threshold T.

As an example, the five consecutive image sequence described above is taken as an example for description. In combination with the flowchart shown in FIG. 15, the method of determining the foreground image area of the first frame of the five frames based on the five frame images is further explained. Specifically, for an image block a at the same position in the five frames images, a model which the image block a in the first frame image belongs to is determined, if it is the existing Gaussian model, then the mean, variance, and age of the existing Gaussian model is updated according to the update steps of single Gaussian model. For the image block a in the second frame image, which model the image block a in the second frame image belongs to is determined firstly. If the image block a in the second frame image belongs to the existing Gaussian model, the mean, variance, and age of the existing Gaussian model is updated continuously, and if the image block a in the second frame image belongs to the candidate Gaussian model, the mean, variance, and age of the candidate Gaussian model is updated. Certainly, in the process of updating, it is required to determine whether to switch the existing Gaussian model and the candidate Gaussian model (model switch shown in the figure) based on the age of the existing Gaussian model (the existing age shown in the figure) and the age of the existing Gaussian model (the potential age shown in the figure). The above method is repeated, until the mean and variance of the Gaussian model corresponding to image block a in the fifth frame image are obtained, and the mean and variance are taken as the mean and variance of the final Gaussian model corresponding to the first frame image, to determine whether the image block a in the first frame image is a foreground area, or to determine whether each pixel in the image block a in the first frame image is a foreground pixel.

In practical applications, after obtaining the mask image (that is, the foreground image area) of the image, processing methods such as image corrosion and expansion may also be used to eliminate the detected noise and obtain a more accurate mask image.

Figure 16:
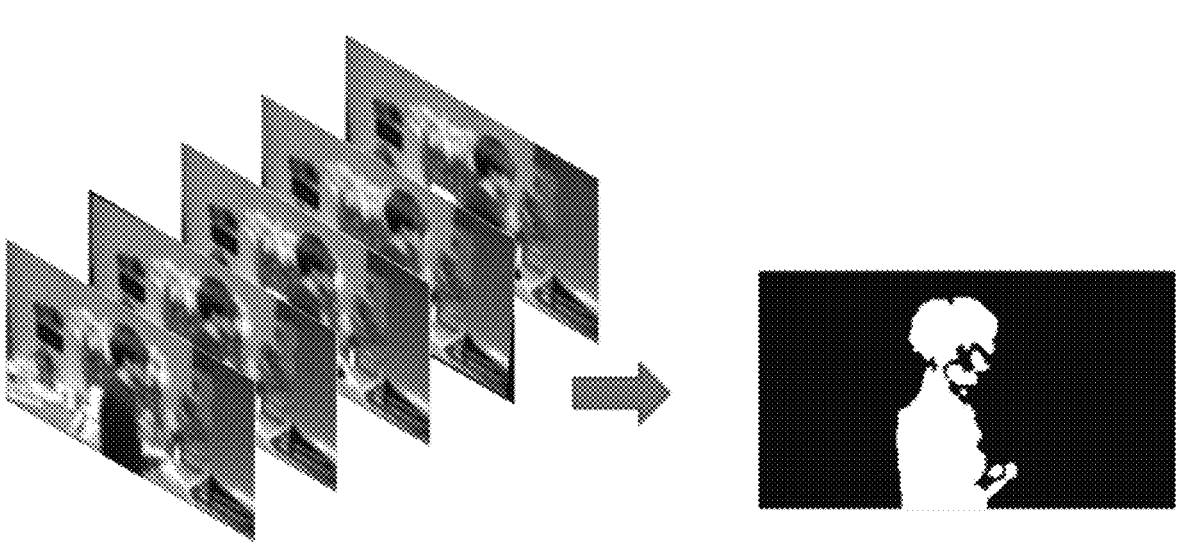
FIG. 16 shows a schematic diagram of a mask image of an image in an example of the present application.

FIG. 16 shows a schematic diagram of the effect of determining the mask image in the image based on the solution provided in the embodiment of the application. As shown in the figure, in the schematic diagram, the mask image of the first frame image (the image on the right side of the arrow in the figure) is obtained by using five consecutive adjacent images through the motion mask detection, wherein a white area in the mask image is the mask area.

For a frame image in the video, after determining the foreground image area of the frame image, the optical flow information of the image can be calculated based on this area part of the frame image, and a score of the image may be determined based on the optical flow information.

It can be seen that when calculating the optical flow of an image based on the image foreground area, if the image foreground area is obtained by the above-mentioned method of determining the image foreground image area provided in the embodiment of the present application, the optical flow information calculated at this time may reduce the influence of brightness deviations between images due to a slight offset between the images (errors of motion compensation) and automatic adjustment of ISO on the final detection results. Certainly, it can be seen from the foregoing description that the existing method of determining the foreground image area may also be used when calculating the optical flow.

After the optical flow information of the image is determined, the motion state representation information of the image may be determined according to the image and the optical flow information of the image, so that a video clip in which an event occurs in the video to be processed is determined based on the motion state representation information. The following describes the several optional manners of determining the motion state representation information of the image provided in the present application.

In an optional embodiment of the present application, for a frame image, determining the motion state representation information of the frame image based on at least one of the brightness information and optical flow information of the frame image includes at least one of the following: determining first motion state representation information of the frame image based on the optical flow information of the frame image; and extracting image features of the frame image based on the brightness information of the frame image and the optical flow information of the frame image, and obtaining the second motion state representation information of the frame image based on the extracted image features.

For the convenience of description, the motion state representation information will be described in terms of image score below. Accordingly, the first motion state representation information is the first image score, and the second motion state representation information is the second image score.

Here, the specific method of determining the first image score based on the optical flow information may refer to the description of the optical flow information above. In other words, the optical flow value of each pixel may be obtained based on $f=|f\_x|+|f\_y|$, the optical flow values of the pixels may be sorted from small to large, and the optical flow values in the confidence range are selected to be averaged, as the result of scoring the frame motion possibility, that is, the first image score.

The method for determining the second image score is implemented by using a deep learning method. With the rapid development of deep learning technology, various neural networks are increasingly used to solve practical problems. For example, the widely used convolutional neural network and recurrent neural network are suitable for image tasks and speech tasks, respectively. In the process of implementing deep learning method, time and computation consuming has become a very important obstacle, especially when mobile devices are deployed with video processing method that requires a lot of calculations. To improve the current deep learning methods, as an optional solution, the present application may make full use of the above-mentioned traditional methods to quickly extract the optical flow information of the image, and then combine the excellent feature representation capabilities of deep learning to calculate score for each frame image. Here, when the neural network is used to determine the second image score, the specific network structure of the neural network used is not limited in this embodiment of the application, and may be selected according to actual needs.

Here, the neural network model may include a first network for extracting image features and a second network for determining the motion state representation information of the image. Correspondingly, for a frame image, the above-mentioned obtaining the second motion state representation information of the frame image through the neural network model based on the brightness information of a frame image and the optical flow information of the frame image, includes: obtaining image features of the frame image through a first network based on the brightness information of the frame image and the optical flow information of the image; and obtaining the motion state representation information of the frame image through a second network based on the image features of the frame image.

Here, the specific network structure forms of the first network and the second network described above are not limited in the embodiment of the present application, and may be configured according to actual application requirements. The first network may be called a single branch motion feature extraction network (SMFN). The input of the network includes brightness information and optical flow information of the image, and the output of the network are the image features. The second network may be called a Time Series Motion Possibility (TSMP) network, and the image features of each frame image of the video to be processed is input to the network to obtain the score of each frame image.

As an optional solution, the first network mentioned-above may include at least one layer of deep separable convolution modules.

Optionally, the second network mentioned-above may be a neural network based on Long short-term memory (LSTM).

Specifically, when the brightness information and optical flow information are used to determine the second image score of the image, the single-channel gray image and the dual-channel optical flow (motion images in the X direction and the Y direction of the optical flow) of the image may form a three-channel input. Here, if the optical flow is the optical flow obtained based on the mask area (that is, the optical flow may include the information of mask implicitly), since only the optical flow of the foreground part is calculated at this time, the rest of the optical flow channel may be filled with a value of 0, to ensure that the sizes of the optical flow image and the gray image are the same. This method has an additional advantage, that is, the position of the foreground area is implicitly sent to the neural network model, so that the model can better learn the image information of the foreground area and improve the subsequent detection effect.

As an optional solution, in the design of the convolutional network, the optional solution of the present application adopts a deep separable convolution. The deep separable convolution module may split an ordinary convolution into a depthwise convolution and a pointwise convolution, thus the calculation amount may be greatly reduced through the deep separable convolution module when extracting image features.

Specifically, the calculation of traditional convolution is to multiply each convolution kernel and each feature map bitwise and then add them, and the calculation amount is $D_{F1} \times D_{F2} \times D_K \times D_K \times M \times N$, $D_{F1}$ and $D_{F2}$ represent an input feature map size, specifically the width and height of the feature map, $D_K$ is a size of the convolution kernel, M is the number of input channels, and N is the number of output channels. For a deep separable convolution, the bitwise multiplication calculation is calculated firstly according to the input channel, and the number of channels does not change at this time; then the traditional convolution calculation is performed on the result obtained in the first step by using a 1×1 convolution kernel, and the number of channels may be changed as needed at this time. By using the deep separable convolution, the calculation amount is $D_K \times D_K \times M \times D_{F1} \times D_{F2} + 1 \times 1 \times M \times N \times D_K \times D_K$, which reduces the calculation amount greatly compared with ordinary convolution.

Through the deep separable convolution, the calculation amount will be reduced by $$\frac{1}{N} + \frac{1}{D_K^2}.$$

When $D_K=3$, the deep separable convolution is 8 to 9 times less computation amount than the traditional convolution.

Therefore, in practical applications, a multi-layer convolutional network may be designed by stacking the above-mentioned deep separable convolution structures, to realize feature extraction of the input image and then obtain the image score based on the extracted features.

As an example, assuming the size of a frame image after preprocessing of the video to be processed is 160×160. When performing feature extraction, the initial input size of the convolution structure is 160×160×3, wherein 160×160 is the image size, and 3 is the number of input channels, that is the gray image and the optical flow image in two directions. As an optional structure, the feature extraction of the input image may be achieved through the convolution structure shown in Table 1:

TABLE 1

| Type/convolution step size | Convolution/pooling parameters | Input feature map size |
|---|---|---|
| Conv/S2 | 3 × 3 × 3 × 32 | 160 × 160 × 3 |
| Conv dw/S1 | 3 × 3 × 32 dw | 80 × 80 × 32 |
| Conv/S1 | 1 × 1 × 32 × 64 | 80 × 80 × 32 |
| Conv dw/S2 | 3 × 3 × 64 dw | 80 × 80 × 64 |
| Conv/S1 | 1 × 1 × 64 × 128 | 40 × 40 × 64 |
| Conv dw/S1 | 3 × 3 × 128 dw | 40 × 40 × 128 |
| Conv/S1 | 1 × 1 × 128 × 128 | 40 × 40 × 128 |
| Conv dw/S2 | 3 × 3 × 128 dw | 40 × 40 × 128 |
| Conv/S1 | 1 × 1 × 128 × 256 | 20 × 20 × 128 |
| Conv dw/S1 | 3 × 3 × 256 dw | 20 × 20 × 256 |
| Conv/S1 | 1 × 1 × 256 × 256 | 20 × 20 × 256 |
| Conv dw/S2 | 3 × 3 × 256 dw | 20 × 20 × 256 |
| Conv/S1 | 1 × 1 × 256 × 512 | 10 × 10 × 256 |
| 3×    Conv dw/S1 | 3 × 3 × 512 dw | 10 × 10 × 512 |
|        Conv/S1 | 1 × 1 × 512 × 512 | 10 × 10 × 512 |
| Conv dw/S2 | 3 × 3 × 512 dw | 10 × 10 × 512 |
| Conv/S1 | 1 × 1 × 512 × 512 | 5 × 5 × 512 |
| Avg Pool/ | Pool 5 × 5 | 5 × 5 × 512 |
| Final feature size | 1 × 1 × 512 | |

Specifically, the parameters shown in the first column of Table 1 are the structure type and convolution step size of the convolutional network. Here, Conv represents an ordinary convolution, for example, Conv is a pointwise convolution when the size of convolution kernel is 1×1, Conv dw represents a depthwise convolution, S1 and S2 represent a convolution step size of 1 or 2 respectively, Avg Pool represents average pooling, and 3× in the first column represents three identical structures cascaded in sequence. The parameters shown in the second column of Table 1 are convolution parameters or pooling parameters. For Conv, the first two data of convolution parameters represent a size of the convolution kernel, the third data represents the number of input channels, and the fourth data represents the number of output channels. For example, for the convolution structure of 3×3×3×32, the size of the convolution kernel is 3×3, the number of input channels is 3, and the number of output channels is 32; for Conv dw, the first two data of convolution parameters represent a size of the convolution kernel, and the third data represents the number of input channels. For Avg Pool, it represents the number of element points corresponding to one pooling when performing average pooling using the pooling parameter of 5×5. The parameters shown in the third column of Table 1 are the input feature map sizes of each layer structure. Here, the above convolutional structures shown in Table 1 are cascaded in sequence in the order from top to bottom in the Table 1. For an image with an initial input size of 160×160×3, after the feature extraction is completed through the above structure, a feature map of 1×1×512 may be obtained, that is, a 512-dimensional column vector.

For each frame image in the video, after the image features of each image are obtained, the corresponding image score of each frame image may be obtained based on the features. Here, the specific network structure of the neural network model for predicting image score based on the extracted features is not limited in the embodiment of the present application.

Figure 17:
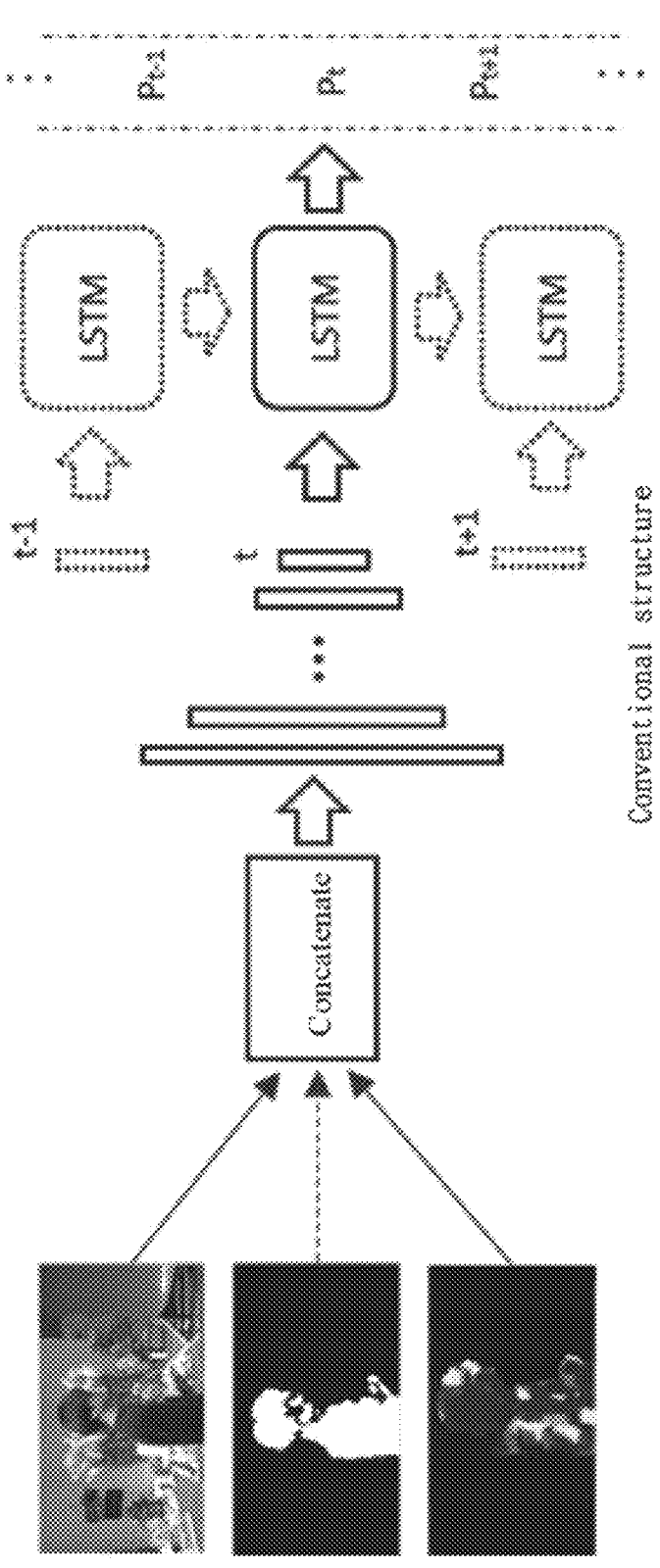
FIG. 17 shows a schematic diagram of the principle of obtaining an image score through a neural network model in an example of the present application.

As an example, FIG. 17 shows a schematic structural diagram of a neural network model for each frame image score provided in an embodiment of the present application. As shown in the figure, the neural network model may include a convolution structure (that is, the first network) for the image feature extraction, which may specifically adopt a deep separable convolution structure. A TSMP network is connected after the convolution structure, such as a score prediction structure based on the LSTM network. As an example, as shown in the figure, the prediction structure may include an LSTM network, a fully connected layer, and an output layer that are cascaded in sequence. Here, the output layer may use a sigmoid activation function, and the output of the output layer may be used as the image score.

Specifically, for a frame image (in this example, the image at time t is taken as an example), the gray image of the frame image (the first image from top to bottom on the left) and the optical flow image (the third image on the left) are concatenated. The optical flow image is merged with mask information in this example, that is, the optical flow image is obtained based on the mask area (the second image on the left is the mask image). After concatenating, the result is used as input information and input into the convolution structure. The feature map of the frame image is extracted by the network, which is based on the deep separable convolution structure, for example, t shown in the figure (the dotted lines t−1 and t+1 in the figure represent feature maps corresponding to the previous frame image and the next frame image respectively, and the image processing method at time t is also applicable to other frame images). For a frame image, taking the 512-dimensional features obtained above as an example, these features may be input into the LSTM network, and the LSTM with a layer containing 512 hidden nodes processes the above series of CNN features to obtain the output of 512-dimensional features. Here, the output of 512-dimensional features may be input into a fully connected layer structure containing 512 hidden nodes, and processed by the fully connected layer again to output a value. Finally, this value is input into a sigmoid activation function to obtain the probability of whether the image has an event, that is, the score of the frame image, for example, $P_t$ represents the probability of the frame image, which is the score of the frame image. Similarly, when processing the images at time t−1 or time t+1, the score $P_{t−1}$ of the image at time t−1 and the score $P_{t+1}$ of the image at time t+1 may be obtained. The score of each frame image of the video to be processed may be obtained based on the model output by using the method in this example.

It is clear to those skilled in the art that when a neural network model is used to predict image scores, the neural network model needs to be trained in advance based on training samples, and the trained model is used for predicting image score. Here, during training, the training samples may include various sample videos, and each frame image of the sample video corresponds to a labeling score. Optionally, the labeling result may contain 1 or 0. If there is an event in a frame image, the labeling result may be 1, and if there is no event in a frame image, the labeling result may be 0. When the model is trained based on each sample video, the model outputs the prediction score corresponding to each frame image of the sample video. As the above-mentioned neural network model based on LSTM, for each sample video, the model outputs the prediction probability value of each frame image in the video, and the probability value can be used as the prediction score. Based on the prediction score and labeling result of each frame image of each sample video, the model is continuously trained until the loss function of the model converges, so that the prediction result of the model is close to the labeling result. As an optional manner, the loss function may use two-classification cross entropy as the loss function, and its formula may be expressed as:

$$\text{loss}\,(o,\ t) = -1/n \sum_i (t[i] * \log(o[i]) + (1 - t[i]) * \log(1 - o[i])) \quad (11)$$

Here, n represents the number of sample images, t[i] represents a labeling result of sample image i, and o[i] represents a prediction score corresponding to the image i.

After the image score of each frame image of the video to be processed is determined, a video clip in which the event occurs in the video to be processed may be determined based on the image score of each frame image. Here, when the image score includes the first image score and the second image score, the final image score may be obtained based on the two scores of each frame image, for example, the first image score and the second image score may be weighted and summed to obtain the final score.

In an optional embodiments of the present application, for any frame image of the at least one frame image, the determining the motion state representation information of the frame image includes: determining the motion state representation information of the frame image through a neural network based on the motion features of the frame image.

Optionally, the motion state representation information may be represented by image score. The neural network used to determine the motion state representation information of an image may be called a Time Series Motion Possibility (TSMP) network. Here, the specific network structure of the network is not limited in this embodiment of the application, for example, it may be an LSTM-based network. The motion features of each frame image (the output features of the MF network) in at least one frame image are input into TSMP to obtain the score of each frame image.

Figure 18A:
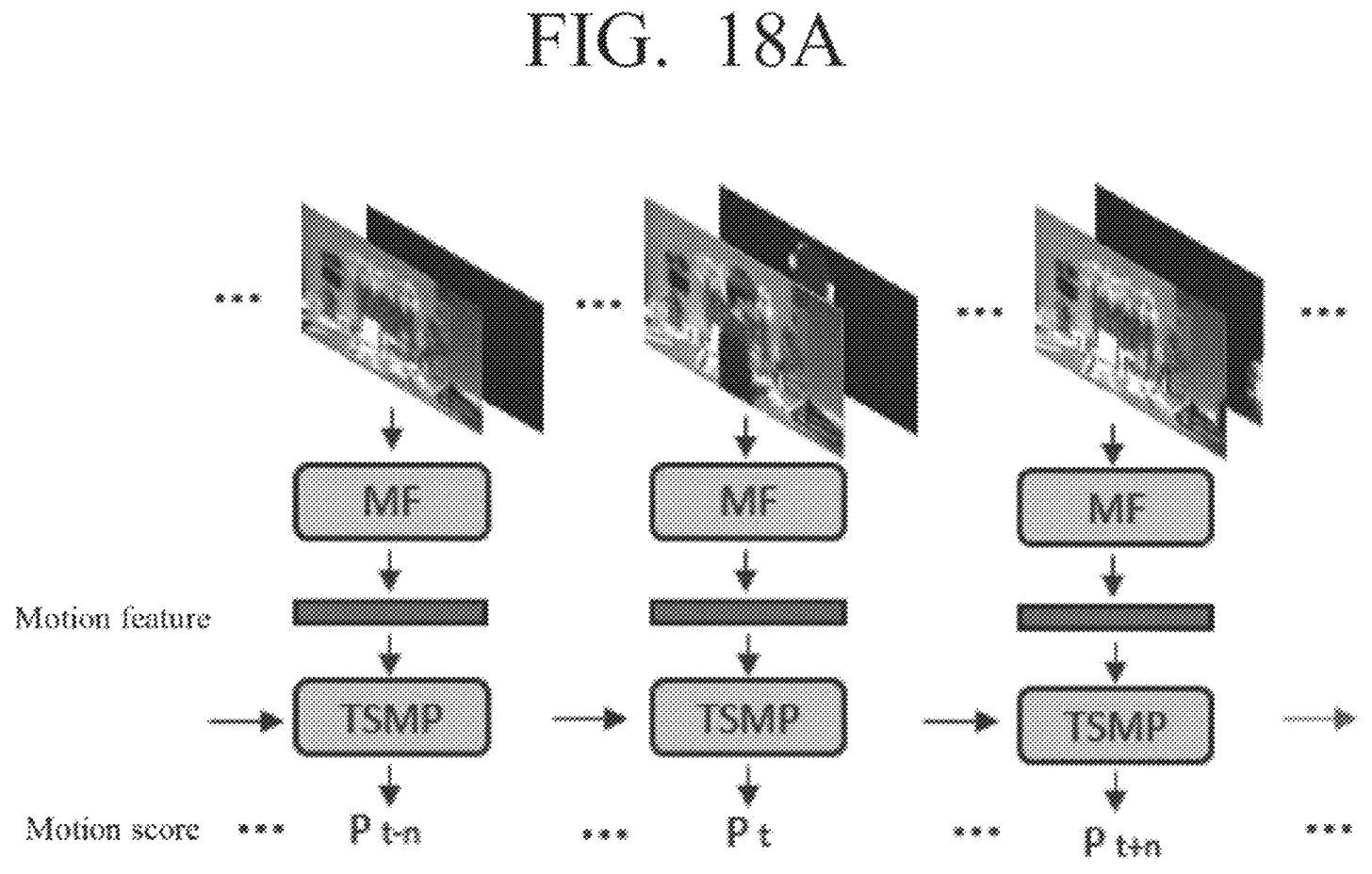
Figure 18B:
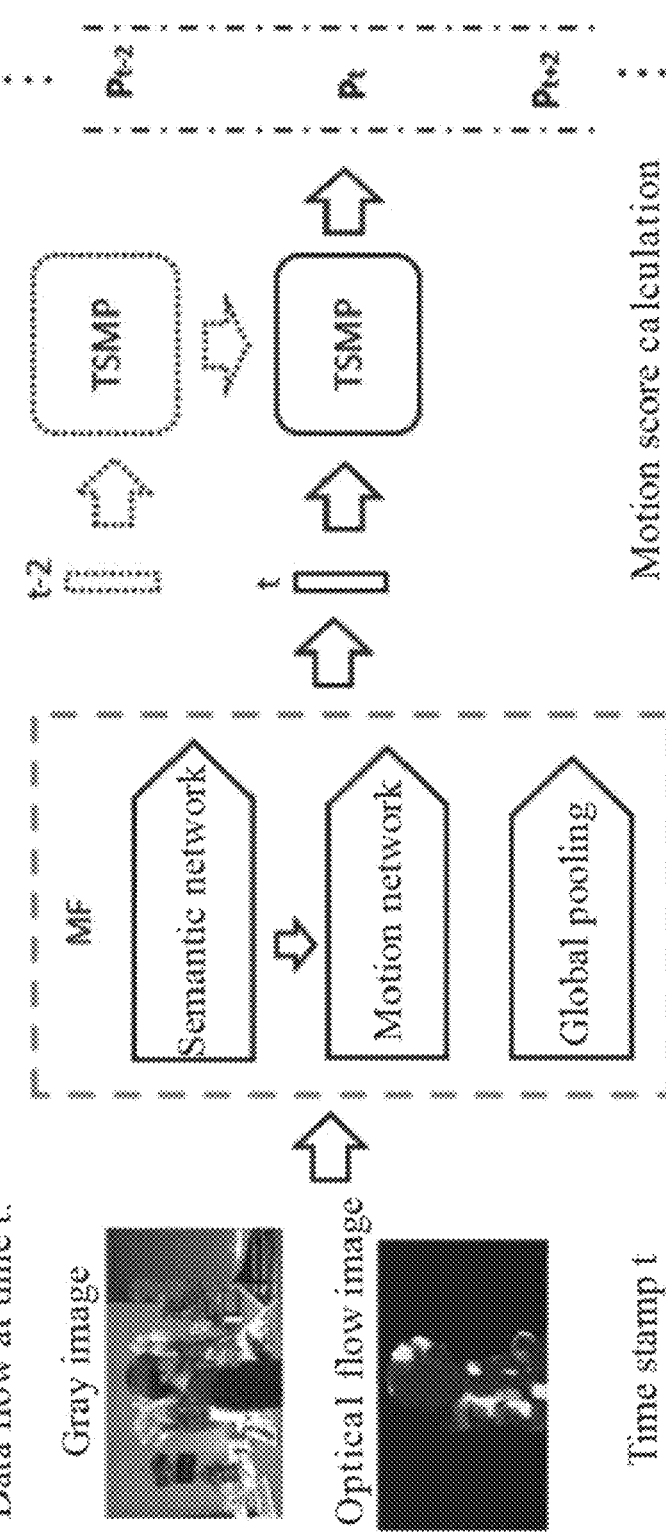

As an optional manner, FIGS. 18A and 18B show schematic diagrams of the principle of determining image score through a neural network provided in the present application. In this example, the images are gray images. As shown in FIGS. 18A and 18B, for a frame image, the input of the MF network includes the gray image and optical flow image (optical flow information) of the image, and the motion features of the image are extracted through the MF network. Specifically, the MF network includes a semantic feature extraction network (semantic network, may also be called spatial network), a motion feature extraction network (motion network) and a global pooling feature extraction network (global pooling). The input of the semantic network is a gray image, and the semantic features of the image (spatial features) are extracted. The input of the motion network includes optical flow images and semantic features, and the motion features of the image are extracted. In the process of feature extraction, the semantic features and motion features are concatenated to fully interact two kinds of information, so as to obtain better motion features. The input of global pooling is the optical flow image of the image, or the optical flow information of the motion area of the image, or the optical flow value which is in the set confidence range after sorting the optical flow values in the optical flow information of the motion area according to the order from small to large, if the optical flow whose optical flow value is in the range of 60%~90% after sorting, then the global optical flow features are obtained through global pooling. The MF network merges the motion features extracted by the motion feature extraction and the global optical flow feature to obtain the final motion features of the image. The image motion features extracted by the MF network are input to the TSMP network to obtain the image score (motion score calculation). As shown in FIG. 18A, $P_t$ represents the score of the image at time t, $P_{t-n}$ represents the score of the image at time t-n, and $P_{t+n}$ is the score of the image at time t+n. As shown in FIG. 18B, $P_{t-2}$ is the score of the image at time t-2, $P_{t+2}$ is the score of the image at time t+2, and the ellipsis represents the process of obtaining the scores of other frame images by using the same processing method. In FIG. 18B, the image at time t (time stamp t shown in the figure) is taken as an example for description.

It can be seen from the description of each optional embodiment of the present application, the present application provides a variety of optional manners for determining the motion state representation information of an image. The principle of each method includes extracting image features/motion features of the image, and determining the motion state representation information of the image based on the extracted features, which may be implemented through the neural network specifically. Here, for one method (as the example shown in FIG. 17), the image and the optical flow information of the image may be input into the SMFN to obtain the image features, and the TSMP network obtains the image score based on the features. For another method (as the examples shown in FIG. 18A and FIG. 18B), the image and its optical flow information may be input into the TMFN, the semantic features are extracted through one branch of TMFN, and the motion features are extracted through the other branch of TMFN, and the TSMP network obtains the image score based on the motion features extracted by TMFN. Here, the specific network structures of the TSMP network in different solutions may be the same or different.

In optional embodiments of the present application, the determining the video clip in which the event occurs in the video to be processed based on the motion state representation information of at least one frame image may include: performing range merging on the motion state representation information of the at least one frame image at least once to obtain a pyramid candidate event range including at least two levels; determining the motion state representation information of each candidate event range based on the motion state representation information of each frame image corresponding to each candidate event range; and determining the video clip in which the event occurs in the video to be processed based on the motion state representation information of each candidate event range.

When determining the motion state representation information of an image, processing methods such as motion compensation and modeling using two single Gaussian models with image blocks as the unit may be used. However, it is unavoidable that there will still be some noise, errors and interference from irrelevant background factors. In addition, in actual scenes, there may be multiple events in the video to be processed (such as a 10-second video). In order to support multiple events, integrate timing information, suppress noise, etc., the solution of this embodiment of the present application may perform pyramid sampling on the motion state representation information of each image, that is, performing multi-level merging of the motion representation state of each image to obtain a multi-level candidate event range in a shape of pyramid, that is, a pyramid candidate event range. When merging, a range of an upper level is obtained by merging a range of the lower level by the defined step size of the range.

Similarly, for the convenience of description, the motion state representation information will be illustrated as the image score below. Correspondingly, the pyramid candidate event range is recorded as a pyramid score range, where a candidate event range is recorded as a score range, and a target candidate range (will be described below) is recorded as a target score range, and the motion state representation information of the candidate event range is a range score. Here, for a range, the range score may be calculated based on the scores of images included in the range. If the scores of images included in the range are averaged, the average is the range score.

Figure 19:
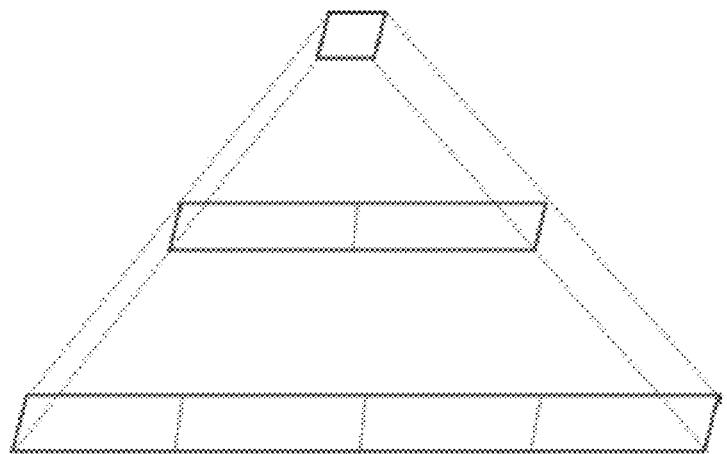
FIG. 19 shows a schematic diagram of a pyramid score range in an example of the present application.

As a schematic example, as shown in FIG. 19, this example shows a three-layer pyramid. Assuming that the bottommost layer of the pyramid, that is, a first layer, contains 4 image scores, which correspond to the motion state representation information of 4 frame images. If a defined step size is 2 when merging, a second layer is obtained by merging every two image scores of the first layer to obtain two ranges, wherein the score of the first range of the second layer may be an average of the scores of the first two images of the first layer, and the score of the second range of the second layer may be an average of the scores of the last two images of the first layer, and so on.

Specifically, when performing pyramid sampling, for the first layer of the pyramid, that is, a first level, which may be the score of each frame image, each range may correspond to a score, and for each subsequent level, the ranges of the previous level may be merged according to the defined step size (equal to a set multiple) based on the previous level, and pyramid ranges with multiple levels may be obtained based on this merging method.

As an example, assuming that the video to be processed contains a total of 300 frame images, the 300 frame images may be merged according to a defined step size to obtain a pyramid video clip with a defined number of layers. For example, if the step size is 2, the score ranges of the first layer are 300 ranges, wherein each range corresponds to the score of one frame image, and the score ranges of the second layer are 150 ranges, wherein each range corresponds to two frame images. For example, the first range of the second layer corresponds to the scores of the first and second frame images of the 300 frame images, and the second range corresponds to the scores of the third and fourth frame images. For the third layer, a merging is performed based on the second layer to obtain 75 ranges, and each range corresponds to 4 frame images, and so on, so as to obtain the score ranges for a set layer.

After obtaining the score range of each level, whether the video clip range corresponding to each score range is a range in which an event occurs may be determined based on the score of each range. Here, since each score range is obtained through range merging, and a high-level range corresponds to at least two ranges of a lower level, when determining whether the video clip range corresponding to each score range is a range in which an event occurs, a method of granularity from coarse to fine may be used. The range in which an event occurs in the ranges of the current level is determined first, and then a range corresponding to the range in which an event occurs in a next level may be determined.

Ranges in different levels correspond to different scale information. The high level range corresponds to the global information of the video, which may reduce the influence of motion possibility noise/error, and automatically merge adjacent areas with a small interval. The ranges in low level correspond to the local information of the video and have more detailed information, which is helpful to the selection of the precise boundary of the event. The determination method from high-level to low-level, coarse-to-fine may reduce the calculation amount, and make the detected events more robust to noise and the boundaries of the event ranges more accurate.

Optionally, the determining the video clip in which the event occurs in the video to be processed based on the motion state representation information of each candidate event range includes: for the candidate event range of each level, determining a target candidate range of a current level; determining a video clip range in which the event occurs in video clip ranges corresponding to each target candidate range of the current level, based on the motion state representation information of each target candidate range of the current level; and determining the video clip range in which the event occurs determined in the lowest level as the video clip in which the event occurs in the video to be processed.

Optionally, for the candidate event range of each level, determining the target candidate range of the current level include: for the highest level, determining the candidate event range of the current level as the target candidate range; and for levels other than the highest level, determining the candidate event range in the current level corresponding to the video clip range in which the event occurs in a higher level, as the target candidate range.

After obtaining the score range of each level, whether the video clip range corresponding to each score range of each level is a range in which an event occurs may be detected in accordance with the order from the high level to the low level successively. Here, for current level, only each score range corresponding to the detected score range in which the event occurs in the higher level will be detected. For example, the highest level is the fourth level, which contains 4 score ranges, and the video clip ranges corresponding to the first and third score ranges are the video clip range in which an event occurs, and the video clip ranges corresponding to the second and fourth score ranges are video clip ranges in which no event occurs. When detecting the score range of the third level, the ranges corresponding to the first and third score ranges of the fourth level of the third level will be detected. For example, each score range of the fourth level corresponds to the two score ranges of the third level, it is possible to perform event detection on only the video clip range corresponding to the first and second score ranges and the fifth and sixth score ranges of the third level.

Based on the solution provided in the embodiments of the present application, a strategy of coarse to fine may be adopted. Based on the result of the higher level of the pyramid (it may also be expanded by a certain range, which will be described in detail later) as the initial value of event detection of the lower level, on the basis of effectively improving the detection efficiency, when the video to be processed has multiple video clips corresponding to the multiple events, the solution can detect multiple video clips where the event occurs, and the solution better meets actual application requirements.

In an optional embodiment of the present application, the method may further include: for the highest level in the candidate event range, merging adjacent target candidate ranges, if the video clip range in which the event occurs in video clip ranges corresponding to each target candidate range of the current level contains the adjacent ranges; and/or for levels other than the highest level, merging adjacent target candidate ranges, if the target candidate range of the current level contains adjacent ranges; and/or expanding the target candidate ranges of the current level to the adjacent candidate ranges.

In practical applications, for each event, its occurrence time may be long or short. Correspondingly, when detecting each video clip in which the event occurs, the video clip may be a long video clip or a short video clip. In this case, in the solution of the embodiment of the present application, if multiple (including) score ranges are detected as ranges in which an event occurs, it may be considered that the multiple score ranges are likely to correspond to the same event. Therefore, a range merging may be performed, and a detection may be performed based on the merged ranges. As described above, in the example of the highest level as the fourth level, which contains 4 score ranges, if it is determined that the video clip ranges corresponding to the first, second, and fourth score ranges of this level are the video clip range in which an event occurs, the first and second score ranges may be considered as ranges corresponding to the same event. These two score ranges may be merged into one range. The first four score ranges of the third level corresponding to merged range and two ranges of the third level corresponding to the fourth score range are the target candidate ranges of the third level. For the third level, if the above-mentioned four target candidate ranges of the third level corresponding to the merged range are adjacent ranges, the four ranges may be merged, and an event detection may be performed on the merged range and two ranges of the third level corresponding to the fourth score range of the fourth level.

It is understandable that when the event detection is performed on the merged range, the motion state representation information of the merged range may be determined based on the motion state representation information of each target candidate range contained in the merged range, and then whether an event occurs in the video clip range corresponding to the merged range is determined based on the motion state representation information of the merged range.

For the expansion of the event range, in practical applications, to avoid the missing of frame in the event range detection, when performing event detection on the video clip corresponding to each score range of each level, the range expansion may be performed on the score range of the level. For example, assuming the highest level is the fourth level, which contains 4 score ranges, if it is determined that the video clip range corresponding to the second score range of this level is a video clip range in which an event occurs, the third and fourth score ranges of the third level are the target score ranges of the third level. When detecting the third and fourth score ranges of the third level, they may be expanded. Specifically, such as expanding forward and backward by one range, that is, expanding the third and fourth score ranges as the second to fifth score ranges, and the event detection is performed on the video clip range corresponding to the third layer based on the range scores of the expanded 5 score ranges.

Here, when performing range expansion, the specific expansion of several ranges may be configured according to actual needs, and may also be related to the sampling step size of the above pyramid sampling, that is, it may be determined according to the set step size during merging. Generally, if the larger the set step size, the more the expanded ranges.

For each target candidate range, when determining whether the video clip range corresponding to the target candidate range is the video clip range in which the event occurs, it may be specifically to compare the range score corresponding to the target candidate range with a pre-defined threshold. If the range score is greater than or equal to the threshold, it is considered that there is an event in the corresponding video clip range, otherwise it is considered that there is no event.

Figure 20A:
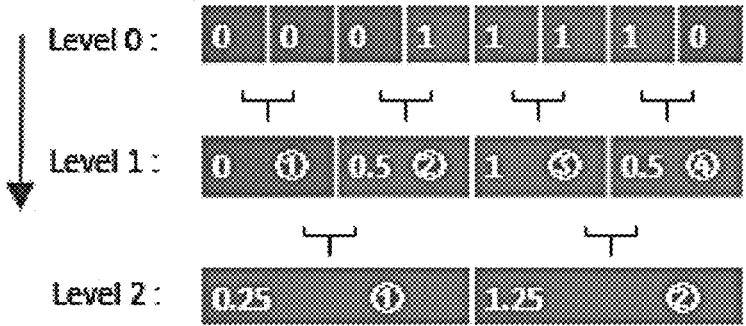
FIG. 20A shows a schematic diagram of a pyramid score range in an example of the present application.
Figure 20B:
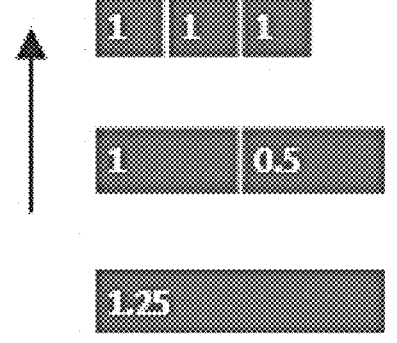

As an example, FIG. 20A to FIG. 20C show schematic diagrams of a principle of detecting a video clip range in which an event occurs according to an optional embodiment of the present application. As shown in FIG. 20A, level 0 is the first level, a range (a rectangle in the figure, that is, the candidate event range) of this level corresponds to a frame image, a range of level 1 is obtained by merging the two ranges of level 0, and level 2 is obtained by merging the two ranges of the corresponding level 1. In this example, the number displayed in the range represents the range score. In this example, the score of each range in level 1 is an average of the scores (schematic scores) of the corresponding two ranges in the level 0, the score of each range of level 2 is an average of the scores of the corresponding two ranges in level 1. Optionally, the score threshold for determining whether an event occurs is: the image score mean×0.8 (predefined coefficient), wherein the image score mean is $\frac{4}{8}$=0.5.

In the candidate event range for each level, the event detection is performed from the high level to the low level. When the event range is not expanded, as shown in FIG. 20A and FIG. 20B, each range of level 2 is a target candidate range. The score of range ① of level 2 is 0.25, which is less than the threshold, and no event occurs in the corresponding video clip range. The score of range ② of level 2 is 1.25, which is greater than the threshold, and an event occurs in the corresponding video clip range. Therefore, the two ranges of level 1 (the ranges ③ and ④ of level 1) corresponding to the range ② of level 2 are the target candidate ranges of level 1. Similarly, the scores of ranges ③ and ④ of level 1 are 1 and 0.5 respectively, which are both greater than the threshold. The four ranges of level 0 corresponding to these two ranges are the target candidate ranges of level 0. Three of the four ranges of level 0 have scores greater than the threshold. Therefore, in this example, the video clip in the video to be processed corresponding to the fifth to seventh frame images of level 0 is the video clip in which the event occurs.

It should be noted that, in practical applications, as an optional solution, when determining the video clip range where the event occurs, if the video clip range is determined directly based on the motion state representation information of the target candidate range of each level, the above-mentioned threshold determination method may be used for each level. In other words, if the score of the range is greater than or equal to the threshold, an event occurs, otherwise, no event occurs. The threshold corresponding to each level may be the same or different. As another optional manner, in the solution of determining the video clip range by using a sliding window method provided in the present application below, the above-mentioned threshold determination method may be used only for the highest level, and for the levels other than the highest level, the sliding window-based method described below may be used to determine the video clip range where it is determined that the event occurs in each level (described in detail later).

When expanding the event range, as shown in FIG. 20A and FIG. 20B. In this example, the adjacent ranges on each side of the range is expanded by one range. Similarly, the ranges ③ and ④ of level 1 corresponding to the range ② of level 2 are the target candidate ranges of level 1, and the target candidate ranges are expanded. In this example, the range ③ of level 1 is expanded to the left by one range, that is, the target candidate ranges are expanded to include ranges ②, ③, and ④, and the range scores of these three ranges are greater than the threshold. The six ranges of level 0 corresponding to these three ranges are the target candidate ranges of level 0, the scores of four ranges of these six target candidate ranges are greater than the threshold, and an event occurs in the corresponding video clip. Therefore, the video clip in the video to be processed corresponding to the fourth to seventh frame images is the video clip where an event occurs.

By comparing FIG. 20B and FIG. 20C, it can be seen that the range ② of level 1 will also be detected after expanding the event range, so as to avoid event missing.

It is understandable that, in practical applications, if the final images used for event detection are processed images of the original video, for example, the video to be processed is a video stream containing key frames obtained by selecting the key frames from the original video, or the optical flow information of the image is calculated every one or more frames when calculating the optical flow information of the image, the final video clip range in which an event occurs should be video clip ranges in the original video corresponding to the determined target candidate range in which an event occurs.

In an optional embodiment of the present application, the determining the video clip in which the event occurs in the video to be processed based on the motion state representation information of the at least one frame image may specifically include: detecting the video to be processed using at least two set sizes of sliding window, and determining initial motion state representation information of each window in each size of sliding window based on the motion state representation information of each frame image corresponding to each window in each size of sliding window; for each size of sliding window, determining final motion state representation information corresponding to the size of the sliding window, based on the initial motion state representation information of each window in the size of the sliding window; and determining the video clip in which the event occurs in the video to be processed, based on the final motion state representation information corresponding to each size of the sliding window.

In an optional embodiment of the present application, for a size of sliding window, the determining final motion state representation information corresponding to the size of the sliding window, based on the motion state representation information of each window in the size of the sliding window include: determining the motion state representation information of the video to be processed, and determining final motion state representation information based on the initial motion state representation information of each window in each size of sliding window and the motion state representation information of the video to be processed; determining the final motion state representation information corresponding to the size of the sliding window based on the final motion state representation information of each window; and/or determining the final motion state representation information corresponding to the size of the sliding window, based on the initial motion state representation information of each window in the size of the sliding window and whether each frame image corresponding to each window contains a designated image.

First of all, it is noted that the above-mentioned method for detecting the video to be processed using sliding windows with at least two set sizes provided in the embodiments of the present application may be applied to the entire video to be processed or applied to the above-mentioned video clip range corresponding to each score range, that is, the video clip corresponding to each score range may be processed as a video to be processed, wherein the score range is the target score range of levels other than the highest level. If the highest level is the fourth level and a score range of the fourth level corresponds to two score ranges of the third level, assuming that the first score range of the fourth level is determined as the range in which an event occurs, the first and second score ranges of the third level are a target score range. At this time, a target candidate range is a range that needs to be detected based on a sliding window. Each score range contained in the target score ranges is processed as a frame image. The score of one score range may be processed as a frame image.

In other words, when processing the entire video to be processed, an image appearing in the above detection process represents a frame image in the video to be processed. If it is a target score range (it may be an expanded range or a merged adjacent range), the image appearing in the above detection process corresponds to a score range, and the designated image above is a designated score range. For an entire video, the designated image may be the frame image with the highest score. For a target score range, the designated image represents the range with the highest score among the score ranges contained in the target score range. Similarly, for the entire video, the above video score may be calculated based on the image scores of frame images contained in the entire video, and for the target score range, it may be calculated based on score ranges contained in the target score ranges.

In practical applications, for the pyramid range above-mentioned, for the score range of the highest level, when event detection is performed on the video clip corresponding to the score range of the level, the above sliding window method may be used or not. Optionally, for the detection of each score range at the highest level, a detection threshold may be configured. Based on whether the score of each score range is greater than the threshold, it is determined whether an event occurs in the corresponding video clip range. For each score range at other levels, the above sliding window method may be used for detection. Certainly, the detection of each target score range of levels other than the highest level may use the above-mentioned threshold method, and the threshold for each level may be different. Here, the threshold may be set as an empirical value, or may be determined based on the score of the entire video. For example, the threshold used may be: 0.8×average of the score of the entire video.

For each size of sliding window, the initial motion state representation information of a window under the size of the sliding window is the initial score, which may be the mean of the image scores of each frame image (for the entire video) contained in the window, or the mean of score of each score range (for the target score range) contained in the window. When determining the final score of the window based on the initial score of a window under the size of sliding window and the score of the video to be processed (or the target score range), the final score is obtained based on the difference value of the initial score and the score of the video to be processed (or the target score range). Certainly, the weight of the initial score may also be determined based on the difference, and the initial score is weighted based on the weight to obtain the final score.

When determining the final score corresponding to a sliding window of this size based on the initial score of each window and whether each frame image (or each score range) corresponding to the window contains the designated image (or the designated score range), as one way, the score weight corresponding to each window is determined based on whether each frame image corresponding to each window under the sliding window of this size contains the designated image. If it contains the designated image, the window may correspond to a higher weight (such as a weight greater than 1), and if it does not contain, the window may correspond to a lower weight (such as a weight equal to 1). Each window is weighted by the determined weight to obtain the final score of each window, and the highest score of the final scores of each window is determined as the final score corresponding to the sliding window of this size. As another way, the highest score is selected based on the initial scores of windows, and whether the designed image is contained is determined based on the window with the highest score. If it contains the designated image, the window may correspond to a higher weight, and if it does not contain the designated image, the window may correspond to a lower weight. The selected highest score is weighted based on the determined weight, and the weighted result is determined as the final score corresponding to the sliding window of this size.

From the foregoing description, it can be seen that the solution of the embodiment of the present application may be directly applied to the video to be processed, or applied to each score range of each level determined based on the pyramid sampling method described above. Specifically, when applied to each score range, for any score range of any level, this solution may be used for event detection, that is, sliding windows corresponding to at least two set sizes may be used to detect the video clip range correspond to the score range respectively. When the sliding window detection method is applied to the score range (such as the target score range described above), each score range corresponds to a video clip that may contain an event. After that, each score range that may contain an event is detected using the sliding window to extract more accurate event clips. Based on this method, one or more video clips in which an event may occur in the entire video to be processed can be detected.

For the convenience of description, the detection solution based on the sliding window being applied to the entire video to be processed is taken as an example for description.

If a fixed-length sliding window is used when applying a sliding window, the calculation formula may be expressed as:

$$\text{Event} = \max_{1 \le i \le (L-D+1)} \left\{ \frac{1}{D} \sum_{j=1}^{D} X_{ij} \right\} \tag{12}$$

Here, Event indicates a video clip in which an event occurs in the video, which is a more accurate clip range. L is the total length of the video (total number of frames). For a pyramid candidate event range, L may be expressed as the number of target candidate ranges, D is the window size (the number of frames that the window contains), that is, number of score corresponding to each window, which is equal to the number of frames contained in the window, L−D+1 represents the number of sliding windows, and $X_{ij}$ is a score of the j-th frame image contained in the i-th window. Based on the principle of the above formula, the video clip corresponding to the window with the largest score among the L−D+1 windows is determined as the actual clip in which an event occurs.

However, in practical applications, the above-mentioned solution with a fixed window size has the problem that the detected clips cannot well match events of different lengths. To solve this problem, an optional method is to use a variable-length window for detection. The formula is as follows:

$$\text{Event} = \max_{D_{min} \le D_k \le D_{max}} \left\{ \max_{1 \le i \le (L-D_k+1)} \left\{ \frac{1}{D_k} \sum_{j=1}^{D_k} X_{ij} \right\} \times D_k \right\} \quad (13)$$

Here, Dmin and Dmax represent the minimum window size and the maximum window size respectively, and Dk represents the size of k-th window. Based on this solution, for each window size, a clip of a corresponding length in which an event occurs may be detected. That is, for each window size, the one with the highest score among the sliding windows corresponding to the window size is regarded as the clip in which an event occurs corresponding to the window size. Finally, in the detection results corresponding to each window size, the score mean corresponding to the clips containing the event is multiplied by the window size, and the final score corresponding to the each window size is obtained. The clip corresponding to the maximum value among the final scores corresponding to multiple sizes is determined as the final clip containing the event.

Figure 21A:
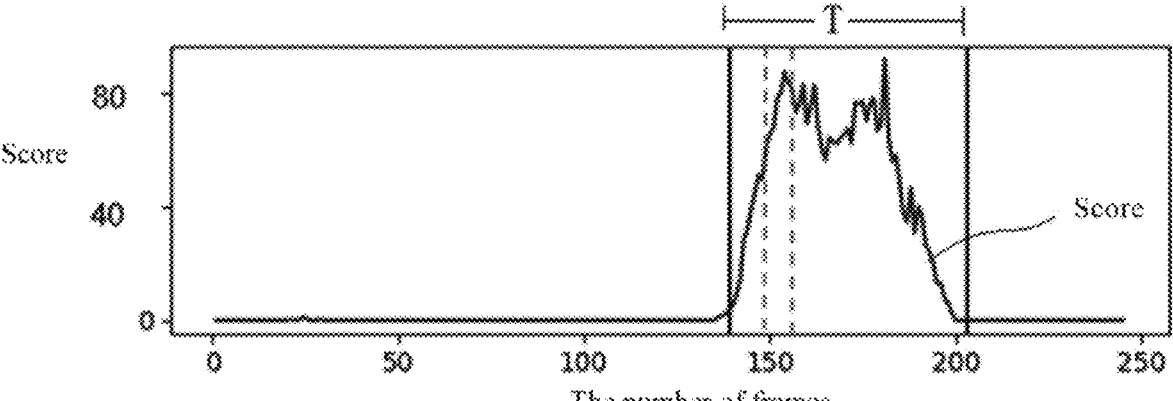
FIG. 21A shows a schematic diagram of a principle of detecting a video clip in which an event occurs based on an image score in an example of the present application.

Although this solution improves the accuracy of detecting events of arbitrary length by using sliding windows of different sizes, the implementation is relatively mechanical and is difficult to achieve better generalization performance. As a schematic rendering, FIG. 21A shows a problem due to using of sliding windows of different sizes, as shown in FIG. 21A, a video clip corresponding to a range T marked by two vertical solid lines in the figure is a real target range, that is, the real event range (that is, the part corresponding to the label in the figure), and if variable-length sliding window is used, the smallest window may be selected, since the smallest window often contains the largest mean score, such as the clip corresponding to the range (that is, the range corresponding to the prediction/detection) marked by the two vertical dotted lines in the figure. In order to solve this problem, an optional method may be to add a weight that is positively related to the window size to the mean for each size of the sliding window, but this weight is difficult to choose, and it is basically impossible to apply to all cases, this will cause the detected motion area to be too large or too small.

Figure 21B:
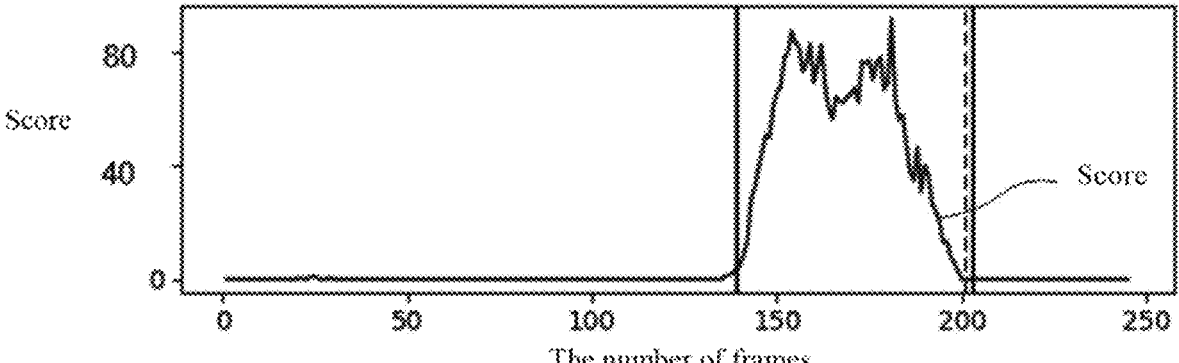
FIG. 21B shows a schematic diagram of a principle of detecting a video clip in which an event occurs based on an image score in another example of the present application.

The inventor of the present application analyzed and studied a large number scoring curves of videos, as shown in the schematic diagrams of the score curves shown in FIG. 21A and FIG. 21B, where the abscissa represents each frame image and the ordinate represents the image score (in the schematic diagram shown in FIG. 21B, the dashed line on the left side of the range corresponding to prediction coincides with the solid line on the left side of the range corresponding to the label), and two statistical rules are found: (1) The score curves of many events approximately conform to a Gaussian distribution, and a priori that the point with the highest score in most cases should be included in the event range is obtained, that is, the frame with the highest image score should be included in the final video clip in which an event occurs; (2) under normal cases, the mean of the event range should be greater than the mean value of the entire video.

With respect to the above conclusion (1), weighting the area containing the largest score may be performed to obtain a higher range score. But there is still a problem: even if the weighted sum is obtained by using the score of first image obtained based on optical flow and the second score obtained through the neural network model when calculating the image score for each frame, the problem of some outliers interfering with the final result is inevitable. For this problem, as an optional solution, in an embodiment of the present application, the determining the video clip in which the event occurs in the video to be processed based on the motion state representation information of each frame image may specifically include: performing smoothing processing on the motion state representation information of each frame image; and based on the motion state representation information of each frame image after smoothing processing, determining a video clip in which the event occurs in the video to be processed.

That is, before processing based on the sliding window, the score image of each frame image of the video may be smoothed to remove some unreasonable disturbances and increase the robustness of the event detection method provided in the embodiments of the present application. Here, the specific method of smoothing processing is not limited in the embodiment of the present application. For example, a window of a set size can be used to smooth each image score by using a window of a set size. For example, a window with a window size of 5 can be used to median filter the score of each frame image of the video. Specifically, at this time, the 5 scores of every five frame images of the video may be sorted in sequence, and the middle score of the 5 scores after sorting may be used to replace the score of the third frame image among the 5 frames images.

For the conclusion (2), the existing variable-length sliding window imposes a weight that is positively related to the window length on the mean of the entire window, which makes the length of the event range corresponding to window of each size more uniform, or the predicted event range being larger than the actual range when the camera moves at a constant speed. With respect to this problem, the above-mentioned solution for determining the final score of the window based on the initial score of the window and the score of the video to be processed for each window provided in the embodiments of the present application may apply a weight to the incremental part, which is used as a basis, of the score mean of the window (that is, the initial score of the window) relative to the overall video mean, thereby ensuring that the mean of the target range is greater than the overall mean. Corresponding to this solution, the formula for determining the event range may be expressed as:

$$\text{Event} = \max_{D_{min} \le D_k \le D_{max}} \left\{ \max_{1 \le i \le (L-D_k+1)} \left\{ \frac{1}{D_k} \sum_{j=1}^{D_k} X_{ij} - \text{Mean} \right\} \times D_k \times W_{max} \right\} \quad (14)$$

Here, Mean is a mean of the entire video score (it may be obtained by averaging the image scores of all frames (which may be the scores after smoothing)), and Wmax refers to an extra weight that may be obtained for the range when the maximum score falls in this range, where Wmax>1.

In other words, for each size of window, when sliding detection is performed based on the size of the window, the mean $$\frac{1}{D_k}\sum\nolimits_{j=1}^{D_k} X_{ij}$$

of the score (i.e., the initial score of each window) of each frame image contained in each window is calculated. Based on the mean and Mean as the final score of the window, after the window with the highest score among the final scores of each window of this size is determined, that is, the window corresponding to $$\max_{1\le i\le(L-D_k+1)}\left\{\frac{1}{D_k}\sum_{j=1}^{D_k} X_{ij}-\text{Mean}\right\},$$

a weight $D_k$ that is positively related to the window size may be configured for the score of the window. In addition, if the window with the highest score contains the frame with the highest score in the video, an extra weight Wmax may be added to the window. If the window with the highest score does not contain the frame with the highest score in the video, there is no extra weight Wmax, and finally the final score of this size window may be calculated, namely $$\left\{\max_{1\le i\le(L-D_k+1)}\left\{\frac{1}{D_k}\sum_{j=1}^{D_k} X_{ij}-\text{Mean}\right\}\times D_k\times W_{max}\right\}.$$

Based on the above method, the final score corresponding to window of each size may be calculated, and the range corresponding to the highest value among the final scores corresponding to each window size is determined as the event range. In this way, when determining each video clip (which may be referred to as the initial target clip) in which an event occurs based on the multi-level pyramid score range, one or more video clips where events may occur may be detected more accurately. Here, when the sliding window detection method is adopted for each target score range, the maximum sliding window size or the smallest sliding window size used may be determined based on the number of score ranges contained in the target score range (which may be expanded and/or merged target score range). For example, if the expanded target score range contains 5 score ranges, the minimum sliding window size may be the number of score ranges minus a set value. Generally, the minimum sliding window size may correspond to at least two score ranges, the maximum sliding window size may be a numerical value not greater than the number of score ranges, that is, the number of score ranges corresponding to the maximum sliding window size does not exceed 5.

In addition, for each optional solution provided in the present application, in actual implementation, in considering of the calculation amount and the calculation timeliness, as an optional way, a scaling processing may be performed on the size of each frame image in the video before processing, that is, an event detection may be performed on small-size images.

The following describes the coarse-to-fine event detection method and the sliding window-based event detection method provided in the embodiments of the present application in conjunction with a specific application scenario. It should be noted that in practical applications, these two methods may also be implemented separately.

Figure 22A:
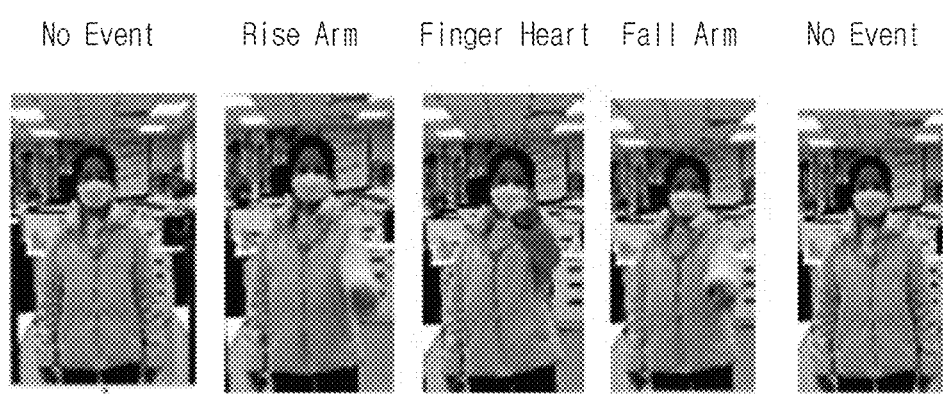
FIG. 22A shows a schematic diagram of an application scenario in an example of the present application.
Figure 22B:
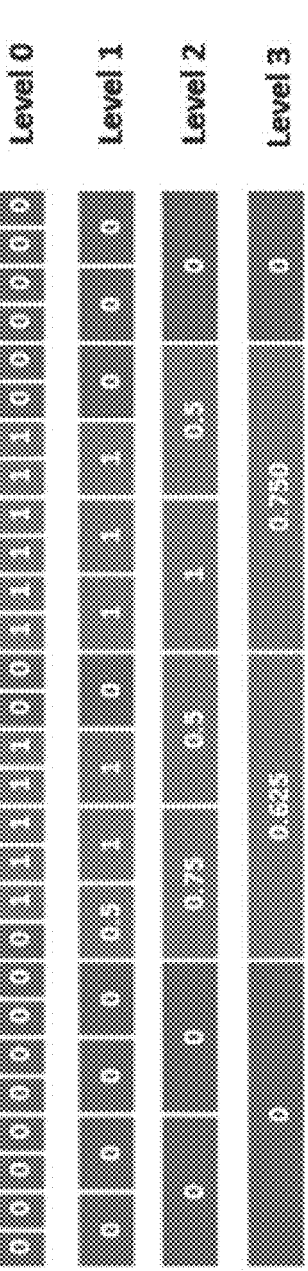
FIG. 22B shows a schematic diagram of the pyramid score range corresponding to the video of the application scenario of FIG. 22A.

An application scenario is shown in FIG. 22A. As shown in the figure, in this application scenario, a person performs an action of rising her arm, making a finger heart, and then falling her arm, and an original video may be obtained through capturing by a mobile phone. The video to be processed corresponding to the original video may be obtained by a key frame selection. Assuming that the video to be processed contains 28 frame images, the image score of each frame image may be determined in any optional embodiment of the present application. The corresponding pyramid candidate event range is obtained by merging range for multiple times for image score of each frame image. As shown in FIG. 22B, the pyramid range in this example has four levels, where level 0 is the first level, levels 1 to 3 are obtained by merging the two ranges of the previous level. The numerical value in the level represents the score of the level.

Figure 22C:
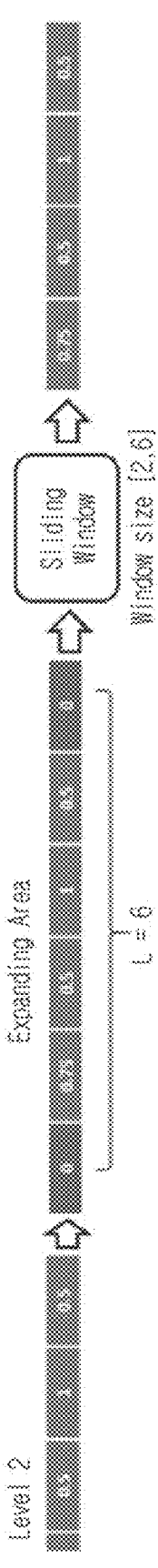
FIGS. 22C and 22D show schematic diagrams of a principle of determining a range in which an event occurs in a second level of the pyramid score range in FIG. 22B.

Assuming that the threshold used to determine whether a range is an event range is 0.34, starting from level 3, the two ranges with scores of 0.625 and 0.750 are event ranges. These two ranges correspond to the four ranges with scores of 0.75, 0.5, 1, and 0.5 of level 2. The following takes level 2 as an example to illustrate the specific process of determining the event range by using a multi-size sliding window. As shown in FIG. 22C, the process may include the following steps:

First, the range may be expanded. As shown in FIG. 22C, the four ranges are expanded to six ranges, that is, L=6. Various sizes of sliding windows may be used for detection on these six ranges. The score mean of the six ranges is Mean=(0.75+0.5+1+0.5)/6=0.458. In this example, the sliding window size ranges from [2, 6], the range in which the event occurs among these six ranges is determined based on the motion state information of each window under each size of sliding window. In this example, the formula for determining the event range regardless of the weight is taken an example for description, that is, the formula for determining the event range is:

$$\text{Event}=\max_{D_{min}\le D_k\le D_{max}}\left\{\max_{1\le i\le(L-D_k+1)}\left\{\frac{1}{D_k}\sum_{j=1}^{D_k} X_{ij}-\text{Mean}\right\}\times D_k\right\} \quad (15)$$

In this formula, the window score (the final motion state representation information) of the sliding window of size $D_k$ is:

$$\max_{1\le i\le(L-D_k+1)}\left\{\frac{1}{D_k}\sum_{j=1}^{D_k} X_{ij}-\text{Mean}\right\}\times D_k \quad (16)$$

Figure 22D:
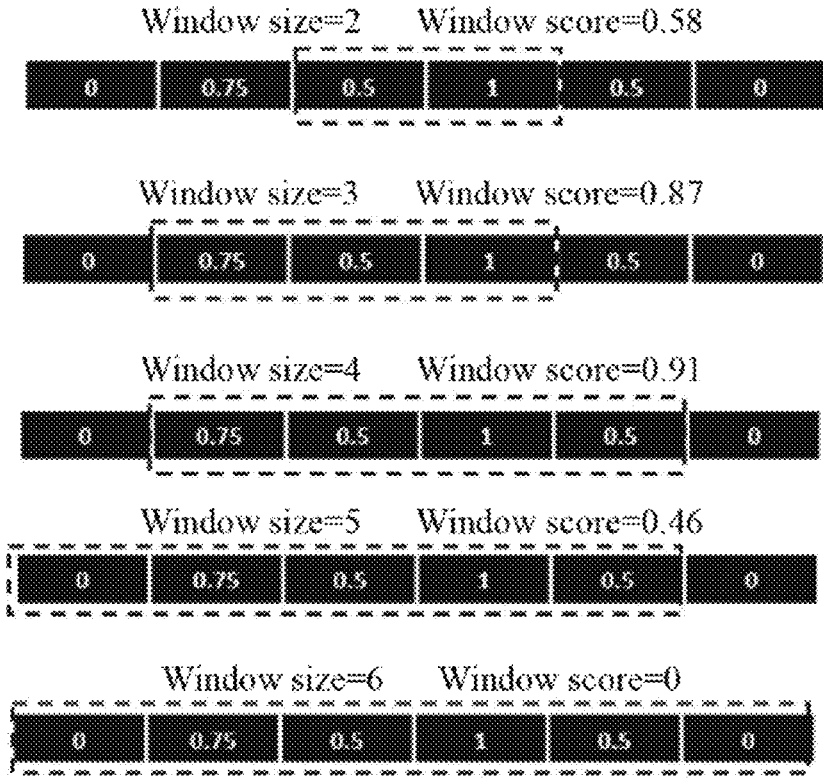

For a sliding window of each size, the score (initial motion state representation information) of each window under the sliding window of this size is determined firstly. Taking the sliding window of size 2 as an example, the first window of this size contains the expanded first and second ranges, the score of this window is: [(0+0.75)/2−0.458]× 2=−0.17, and then sliding one range forward, the second window corresponds to the second range and the first range. The same way may be used to calculate the score of each window of this size, Here the window with the highest score is two windows containing scores of 0.5 and 1, and the score of these two windows is 0.58, then the window score corresponding the window of this size is 0.5, as shown in FIG. 22D, the window size=2, and the window score=0.58.

For the sliding window of each size, the window score corresponding to the sliding window of each size may be calculated by using the above method. As shown in FIG. 22D, the window scores corresponding to sliding window of sizes 2-6 are 0.58, 0.87, 0.91, 0.46 and 0 respectively, and the range corresponding to each score is shown by the dotted line in the figure. Based on the above formula, the largest score is the window score of the sliding window of size 4, and the ranges corresponding to the window score of this size are four ranges with scores of 0.75, 0.5, 1, and 0.5. Therefore, these four ranges are the event ranges corresponding to level 2.

For level 1 and level 0, using the same method as above, the event range corresponding to level 1 may be determined, and then the event range corresponding to level 0 may be determined. The video clip in the original video corresponding to the event range corresponding to level 0 is the video clip in which the event occurs.

Figure 23:
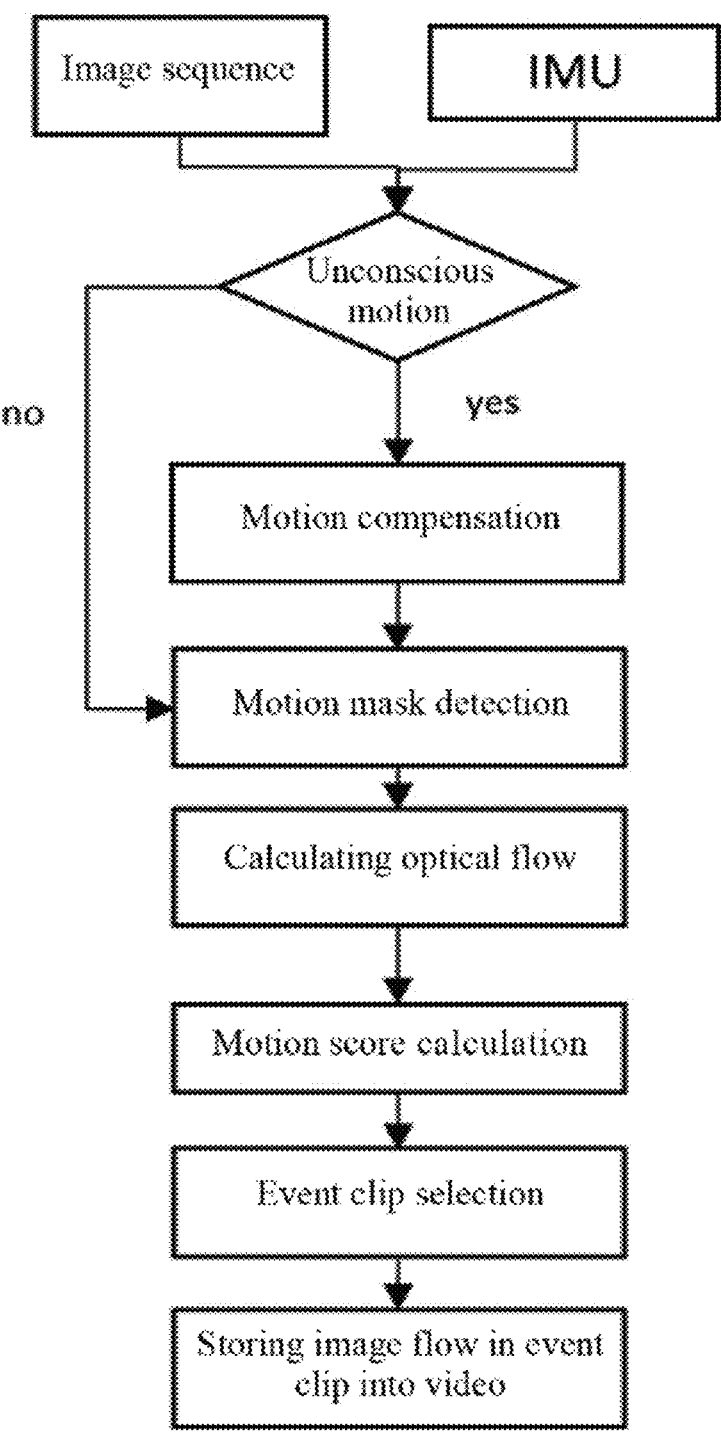
FIG. 23 shows a schematic flowchart of a video processing method in an example of the present application.
Figure 24:
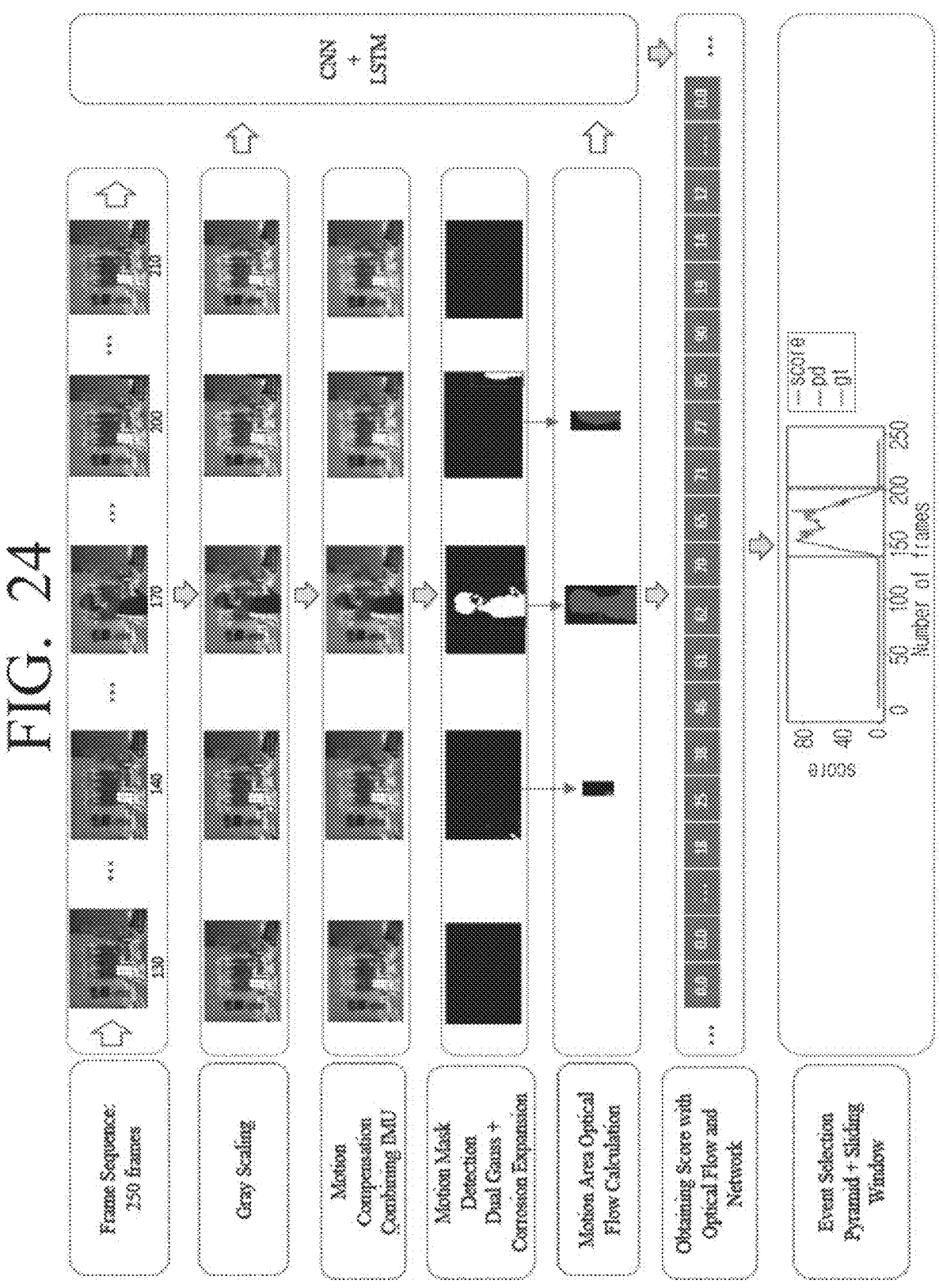
FIG. 24 shows a schematic diagram of a principle of a video processing method in an example of the present application.

In order to more systematically understand the various optional manners provided in the embodiments of the present application, the method will be described below in conjunction with examples. FIGS. 23 and 24 show the schematic flowchart and principle schematic diagram of an example. The image sequence in the figure is a video to be processed. When the video is captured in real time through the mobile phone, the image sequence may be a serial of videos captured every set duration, for example, a video captured every 10 seconds is used as a video to be processed. For the convenience of description, this example uses a video captured by a mobile phone as an example. The following describes the video processing method in this example with reference to FIGS. 23 and 24. The processing process may include the following steps.

For an image sequence, such as a sequence containing 250 frame images (not all shown) as shown in FIG. 24, the corresponding number below each frame image indicates the sequence number of the image in the sequence. If the image is a color image, the color image may be converted into a gray image, and the size of the image may be scaled down (the graying, scaling steps shown in FIG. 24) to reduce subsequent calculation amount and improve processing efficiency.

After the above preprocessing is completed, the mobile phone's IMU may be used to detect whether the mobile phone has unconscious motion when acquiring the image sequence. If there is unconscious motion (yes in FIG. 23), the motion compensation is performed on each frame image of the image sequence (the motion compensation, combining the IMU step shown in FIG. 24) to obtain the processed image sequence. If there is no unconscious motion (no in FIG. 23), it may go directly to the next step.

After that, the motion mask detection may be performed, that is, the step of determining the foreground image area of each frame image to obtain the mask image. As can be seen from the foregoing description, after determining the foreground image area of each frame, the detected noise may be eliminated by using image erosion and expansion. For example, the processing steps of mask detection (dual Gauss+corrosion expansion) shown in FIG. 24, that is, the dual-single Gaussian model may be used to determine the foreground image area of each frame, and the detected area can be corroded and expanded. The processed area is used as the final foreground image area. The example shown in FIG. 24 shows a schematic diagram of the mask detection results of five frame images, where the middle 3 frames among the five frame images have the mask area (the actual mask area may be the area corresponding to the minimum circumscribed rectangle of the detected foreground image area), and the other two frame images do not have the mask area.

After the mask detection is completed, the optical flow information of each frame image may be calculated based on the mask area of each frame image. As shown in FIG. 24, only the optical flow of the mask area of each frame image may be calculated (it may be dense optical flow). Dense optical flow attempts to compute the optical flow vector for every pixel of each frame. While such a computation may be slower, it gives a more accurate result and a denser result suitable for applications such as learning structure from motion and video segmentation. In practical applications, if there is no mask area in a frame image, that is, the mask area is not detected, the calculation of the optical flow of the frame may be omitted. In the next step, the optical flow score of the frame image, that is, the first score, is determined to 0.

After completing the step of calculating the optical flow, the step of obtaining scoring shown in FIG. 24 may be performed. This step may be implemented by combining both the optical flow and neural network models. Specifically, based on the optical flow information of each frame, a part of the maximum and minimum values of the optical flow value of each pixel of each frame image (sorting the optical flow value of each point and then taking the optical flow value in the confidence range) may be cut down and then calculate the mean to obtain the first image score of each frame image. For each frame image, the corresponding scaled gray image and optical flow image of the frame image are input into the neural network model (a model based on convolution and long-term memory network shown in FIG. 24) used to predict the second image score, and the second image score corresponding to each frame image is obtained based on the model output. After that, the first image score and the second image score may be weighted to obtain the final score of each frame image, for example, the score values in the step of obtaining scoring as shown in FIG. 24.

After the final score of each frame image is obtained, the video clip may be selected based on the score of each frame, that is, determining the video clip in which the event occurs. Specifically, as shown in FIG. 24, the pyramid sampling method may perform the range merging on the scores of each frame image to obtain score ranges of multiple levels. Each score corresponds to a respective video clip range, and multiple clips that may contain events may be obtained. In a descending order of levels, for the highest level, the comparison result of the score and the threshold value of each range may be used to determine the range where the event occurs. For each target score range of each level other than the highest level (it can be the target score range after merging adjacent target score ranges, or it can be the expanded target score range), the method of event detection based on sliding window described above may be used to obtain the detection result of the video clip in which the event occurs (it may be referred to as the event clip). After the event clip is obtained, the image stream in the event clip may be stored as a video.

Figure 25A:
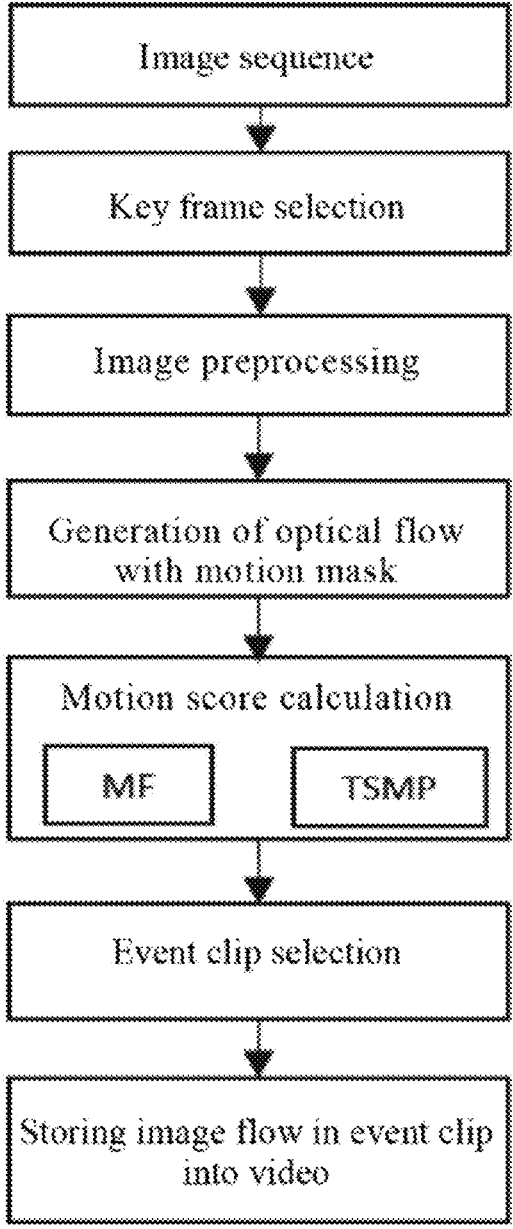
FIG. 25A shows a schematic flowchart of a video processing method in an example of the present application.
Figure 25B:
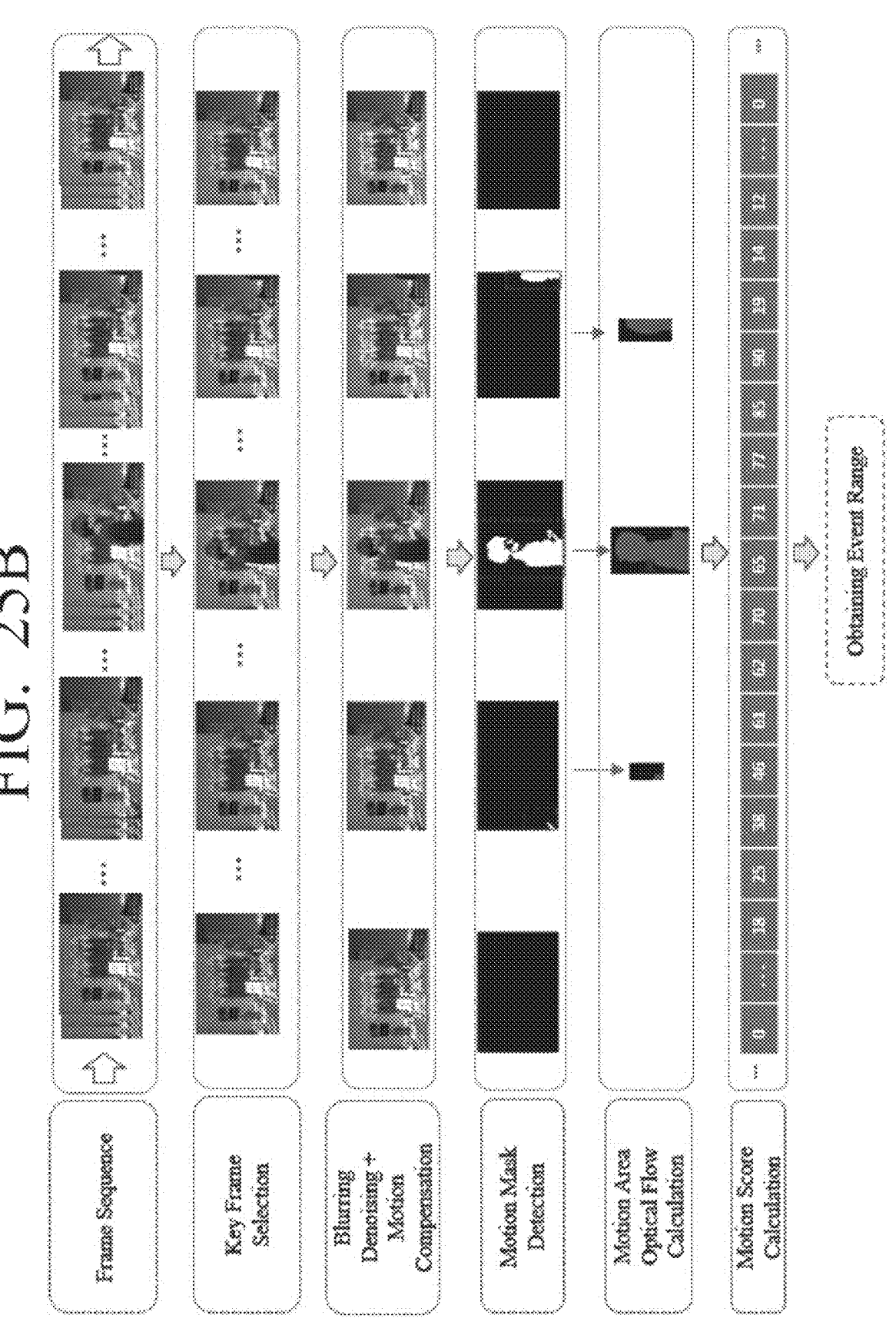
FIG. 25B shows a schematic diagram of a principle of a video processing method in an example of the present application.

FIGS. 25A and 25B show schematic flowcharts of a solution for determining a video clip in which an event occurs in a video provided in another example of the present application. As shown in FIG. 25A and FIG. 25B, the image sequence in FIG. 25A and the frame sequence in FIG. 25B is the original video. For the original video, the key frame selection may be performed firstly, and the selected key frame may be used as the video to be processed. Here, before or after the key frame selection, each frame image of the video or the selected key frame image may be preprocessed (image preprocessing in FIG. 25A), such as graying, denoising, etc., or before determining whether the selected video frames are key frames, the selected video frame is preprocessed. As shown in the figure, for each frame of the video to be processed, image blurring and denoising and motion compensation (blurring denoising+motion compensation) processes may also be performed. For example, when the original video is captured, if the video capturing device has unconscious motion of the user, the motion compensation may be performed on each frame image of the video to be processed.

After that, the motion area detection, that is, the motion mask detection, is performed on each frame image, to determine the motion area of each frame image (the dotted area in the figure). For each frame image, the dense optical flow of the frame image (the optical flow generation with the motion mask shown in FIG. 25A, and the motion area optical flow calculation shown in FIG. 25B) is calculated based on the motion area of the frame image and the next frame image of the frame image. It can be seen from the figure, if there is no motion area in the image, the calculation amount will be greatly reduced, and the optical flow information of this frame image is 0. As can be seen from the above description, optionally, when calculating the optical flow information of the image, for the current frame image and the next frame image of the image, only the optical flow information of the current frame image may be calculated, for example, the optical flow information of the image at time t, time t+2, time t+4, and so on may be calculated. After that, the image score of each frame image may be obtained via the MF network and TSMP based on the gray image and optical flow information of each frame image (corresponding to the motion scoring steps in FIGS. 25A and 25B), and the event range (corresponding to the event clip selection in FIG. 25A) may be obtained based on the image score of each frame image, thereby determining the video clip in which the event occurs in the original video. Optionally, after the event clip is determined, the image stream in the time period may be saved as a video.

Based on the video processing solution provided in the embodiments of the present application, it is possible to conveniently and effectively detect the video clip in which the event occurs in the video, thereby providing technical support for recording, storing, transmitting or editing videos based on the event trigger mechanism. In can be seen that, from the description of each optional embodiment described above, compared with the prior art, the solution provided in the embodiment of the present application has at least the following improvements in technical implementation:

(1) IMU is used to determine the type of camera movement, and the motion compensation is performed on unconscious camera movement.

(2) The motion mask of the image is calculated by detecting the change of image brightness.

(3) For areas where the motion mask has a value, the optical flow is further calculated.

(4) Each frame image is scored combining the optical flow information to obtain the motion possibility of each frame image.

(5) The time period when the event occurs is found according to the motion possibility time series.

(6) If an event occurs, the image stream in the corresponding time period is recorded and stored.

Correspondingly, the solutions provided in the embodiments of the present application have at least the following beneficial effects:

(1) The "event camera" working mode is achieved by using of traditional camera sensors (such as mobile phone camera sensors), to achieve the detection of the video clip in which an event occurs in the video.

(2) This method performs event detection based on image frames, which reduces the dependence on data, and makes the event detection method more universal. And for events, the corresponding semantic information does not need to know. For commonly used electronic devices such as cameras of mobile phones, it is only need to know whether a changed event occurs.

(3) The network model may also be used in the scoring stage (that is, determining the image score (a way of representing the image motion state representation information)), which may make full use of the image and optical flow information. Since semantic information is not required, a relatively shallow network may be designed. The shallow network has the characteristics of small model, fast speed, few parameters, and requiring less training samples.

(4) In order to deal with the mobility of electronic device, the IMU information is introduced for determination. The motion compensation is used to remove the influence of unconscious movement of the mobile phone. The influence of motion compensation errors will also be considered when modeling the model (dual-SGM (dual-semi-global matching, which uses image blocks for modeling), and the optical flow value may be used to exclude minor disturbance.

(5) In the optional solution of the present application, a simpler Gaussian model may be used to detect changed pixels firstly, and these changed pixels are used as a mask to calculate the optical flow value, thereby reducing the calculation amount of optical flow.

(6) In order to detect the occurrence of multiple events, the present invention uses a pyramid to extract the event range. In order to extract the event range more accurately, the present invention combines the sliding window on the basis of the pyramid to refine the result boundary. Since the mainstream variable-length sliding window only uses the size information of the window and does not use the characteristics of the image itself, it is difficult to set a weight to meet the requirements of all images. In order to solve this problem, when calculating the score of each window, the present invention uses the mean and maximum information of the image scores to obtain more reasonable results.

Figure 26:
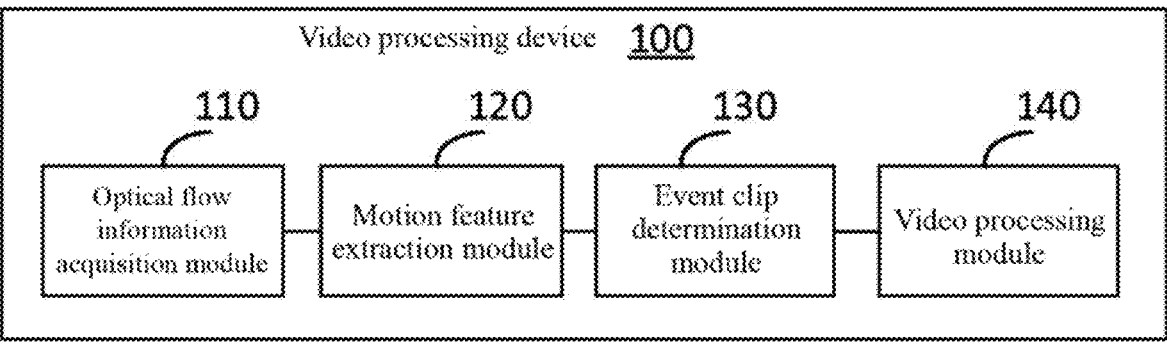
FIG. 26 shows a schematic structural diagram of a video processing device provided in an embodiment of the present application.

Based on the same principle as the method provided in the embodiment of the present application, the present application further provides a video processing device. As shown in FIG. 26, the video processing device 100 may include an optical flow information acquisition module 110, a motion feature extraction module 120, an event clip determination module 130 and a video processing module 140.

The optical flow information acquisition module 110 is configured to acquire optical flow information of at least one frame image in a video to be processed.

The motion feature extraction module 120 is configured to extract motion features of the at least one frame image based on the at least one frame image and the optical flow information of the at least one frame image.

The event clip determination module 130 is configured to determine a video clip in which an event occurs in the video to be processed, based on the motion features of the at least one frame image.

The video processing module 140 is configured to perform corresponding processing on the video to be processed, according to the video clip in which the event occurs. In other words, the video processing module 140 may generate a final video clip based on the determined the video clip in which the event occurs.

Optionally, for any frame image of the at least one frame image, when the motion feature extraction module 120 extracts motion features of the frame image based on the frame image and optical flow information of the frame image, it is used for: extracting semantic features of at least one level of the frame image via several cascaded first feature extraction layers, based on the frame image; and extracting motion features of at least one level of the frame image via several cascaded second feature extraction layers, based on the optical flow information of the frame image, wherein at least one second feature extraction layer merges the motion features and semantic features of corresponding level to output.

Optionally, the number of output channels of the first feature extraction layer is less than the number of output channels of the second feature extraction layer of corresponding level.

Optionally, when the at least one second feature extraction layer merging the motion features and semantic features of the corresponding level to output, the merging is performed by merging the motion features and semantic features of the corresponding level by the at least one second feature extraction layer to obtain merged features; determining weight information corresponding to the merged features via a weight determination network; weighting the merged features according to the weight information to obtain a weighted merged features; and outputting the weighted merged features.

Optionally, the weight information includes first weight information of the motion features and second weight information of the semantic features; when the weighting determination network weights the merged features according to the weight information to obtain the weighted merged features, the merging is performed by weighting the merged features according to the first weight information and the second weight information to obtain the weighted merged features.

Optionally, the device further comprises a global feature extraction module, which is used for: acquiring a global optical flow feature of the at least one frame image based on the optical flow information of the at least one frame image; wherein the motion feature extraction module is used for merging extracted motion features of the at least one frame image with the global optical flow features, to obtain motion features of the at least one frame image based on the merged features.

Optionally, for any frame image of the at least one frame image, the optical flow information acquisition module 110 when acquiring the optical flow information of the frame image, is used for: determining a motion area of the frame image; performing dense optical flow calculation based on the motion area in the frame image and an image area of a next frame image of the frame image corresponding to the motion area, to obtain a dense optical flow of the frame image; or calculating a dense optical flow corresponding to the frame image based on the frame image and the next frame image of the frame image, and using the optical flow of the motion area part of the frame image in the calculated dense optical flow as the dense optical flow of the frame image.

Optionally, for any frame image of the at least one frame image, the optical flow information acquisition module 110, when determining the motion area of the frame image, is used for: determining the motion area of the frame based on brightness information of the frame image and brightness information of a defined number of frame images after the frame image.

Optionally, the optical flow information acquisition module 110, when the determining the motion area of the frame image based on brightness information of the frame image and brightness information of the defined number of frame images after the frame image is used for: dividing the frame image and the defined number of frame images after the frame image into several image blocks; and determining the motion area of the frame image based on brightness information of each image block at the same position in the frame image and the defined number of frame images after the frame image.

Optionally, the optical flow information acquisition module 110, when determining the motion area of the frame image based on the brightness information of each image block at the same position in the frame image and the defined number of frame images after the frame image, is used for: for at least one divided image block, determining a brightness mean and a brightness variance of a Gaussian background model corresponding to the image block through the Gaussian background model, based on the brightness information of the image block in the frame image and the brightness information of the defined number of frame images after the frame image; and determining whether each pixel in the image block is a motion pixel in the frame image or whether the image block is the motion area of the frame image, based on brightness information of each pixel of the image block in the frame image and the brightness mean and the brightness variance of the Gaussian background model corresponding to the image block.

Optionally, event clip determination module 130, when determining the video clip in which the event occurs in the video to be processed, based on the motion features of the at least one frame image, is used for: determining motion state representation information of the at least one frame image based on the motion features of the at least one frame image; and determining the video clip in which the event occurs in the video to be processed based on the motion state representation information of the at least one frame image.

Optionally, the event clip determination module 130, when determining the video clip in which the event occurs in the video to be processed based on the motion state representation information of the at least one frame image, is used for: performing range merging on the motion state representation information of the at least one frame image at least once to obtain a pyramid candidate event range including at least two levels; determining the motion state representation information of each candidate event range based on the motion state representation information of each frame image corresponding to each candidate event range; and determining the video clip in which the event occurs in the video to be processed based on the motion state representation information of each candidate event range.

Optionally, the event clip determination module 130, when determining the video clip in which the event occurs in the video to be processed based on the motion state representation information of each candidate event range, is used for: for the candidate event range of each level, determining a target candidate range of a current level; determining a video clip range in which the event occurs in video clip ranges corresponding to each target candidate range of the current level, based on the motion state representation information of each target candidate range of the current level; and determining the video clip range in which the event occurs determined in the lowest level as the video clip in which the event occurs in the video to be processed.

Optionally, for the candidate event range of each level, when the event clip determination module 130 determines the target candidate range of the current level, it is used for: for the highest level in the candidate event range, determining the candidate event range of the current level as the target candidate range; and for levels other than the highest level, determining, the candidate event range in the current level corresponding to the video clip range in which the event occurs in a higher level, as the target candidate range.

Optionally, the event clip determination module 130 is further used for: for the highest level in the candidate event range, merging target candidate ranges corresponding to adjacent ranges, if the video clip range in which the event occurs in video clip ranges corresponding to each target candidate range of the current level contains the adjacent ranges; and/or for levels other than the highest level, merging adjacent target candidate ranges, if the target candidate range of the current level contains adjacent ranges; and/or expanding the target candidate ranges of the current level to the adjacent candidate event ranges.

Optionally, the event clip determination module 130 when determining the video clip in which the event occurs in the video to be processed based on the motion state representation information of the at least one frame image, is used for: detecting the video to be processed using at least two set sizes of sliding window, and determining initial motion state representation information of each window in each size of sliding window based on the motion state representation information of each frame image corresponding to each window in each size of sliding window; for each size of sliding window, determining final motion state representation information corresponding to the size of the sliding window, based on the initial motion state representation information of each window in the size of the sliding window; and determining the video clip in which the event occurs in the video to be processed, based on the final motion state representation information corresponding to each size of the sliding window.

Optionally, the device further includes a video to be processed acquisition module, which is used for: selecting video frames from an original video at a defined frame rate; determining key frames in the selected video frames by repeatedly performing the following operations: determining scene change information between adjacent frames in the selected video frames, and determining the selected adjacent frames as the key frame based on the scene change information; or selecting the video frame from the video frames between the adjacent frames; and using video stream corresponding to the determined key frame as the video to be processed.

Optionally, the video to be processed acquisition module, when determining the selected adjacent frames as the key frame based on the scene change information, or the selecting the video frame from the video frames between the adjacent frames, it is used for: determining the selected adjacent frames as the key frame, if the scene change information is less than a change information threshold; and selecting the video frame from the video frames between adjacent frames, if the scene change information is not less than the change information threshold.

Optionally, the scene change information is the number of points meeting a preset condition in a sparse optical flow between the selected adjacent frames; wherein, the preset condition is that an optical flow in a horizontal direction is greater than a preset first threshold, and/or an optical flow in a vertical direction is greater than a preset second threshold.

Optionally, the device further includes a motion compensation module, which is used for: before acquiring optical flow information of at least one frame image in the video to be processed, determining movement type of a video acquiring device for the video to be processed when acquiring the video to be processed; and performing motion compensation on at least one frame image of the video to be processed, if the movement type is user's unconscious movement.

The device provided in the embodiment of the present application may implement at least one of the multiple modules through an AI model. The functions associated with AI may be performed by a non-volatile memory, a volatile memory, and a processor.

The processor may include one or more processors. At this time, the one or more processors may be general-purpose processors, such as a central processing unit (CPU), an application processor (AP), etc., or a pure graphics processing units, such as a graphics processing unit (GPU), a visual processing unit (VPU), and/or AI dedicated processor, such as a neural processing unit (NPU).

The one or more processors control the processing of input data according to predefined operating rules or artificial intelligence (AI) models stored in the non-volatile memory and volatile memory. The pre-defined operating rules or artificial intelligence models are provided through training or learning.

Here, providing by learning refers to obtaining predefined operating rules or AI models with desired characteristics by applying learning algorithms to multiple learning data. This learning may be performed in the device itself in which the AI according to the embodiment is executed, and/or may be realized by a separate server/system.

The AI model may contain multiple neural network layers. Each layer has multiple weight values, and the calculation of one layer is performed by the calculation result of the previous layer and multiple weights of the current layer. Examples of neural networks include, but are not limited to, Convolutional Neural Networks (CNN), Deep Neural Networks (DNN), Recurrent Neural Networks (RNN), Restricted Boltzmann Machines (RBM), Deep Belief Networks (DBN), Bidirectional Loops Deep Neural Network (BRDNN), Generative Adversarial Network (GAN), and Deep Q Network.

A learning algorithm is a method of training a predetermined target device (for example, a robot) using a plurality of learning data to make, allow, or control the target device to make determination or prediction. Examples of the learning algorithm include, but are not limited to, supervised learning, unsupervised learning, semi-supervised learning, or reinforcement learning.

Based on the same principles as the method and device provided in the embodiments of the present application, the embodiments of the present application also provide an electronic device that includes a memory and a processor, wherein computer programs are stored in the memory, and the processor is capable to perform the method shown in any optional embodiment of the present application when executing the computer programs.

The embodiment of the present application also provides a computer-readable storage medium, in which computer programs are stored, and when the computer programs are executed by a processor, the processor is capable to perform the method shown in any optional embodiment of the present application. In some embodiments, the computer-readable storage medium is a non-transitory computer-readable storage medium.

Figure 27:
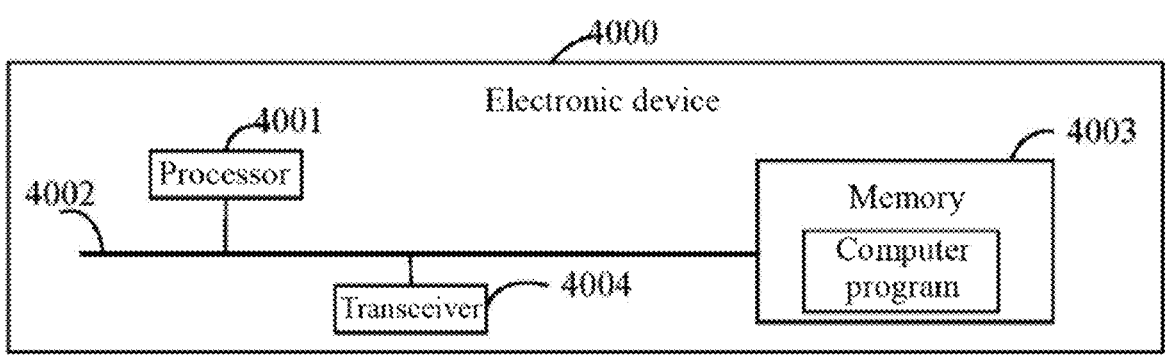
FIG. 27 is a schematic structural diagram of an electronic device provided in an embodiment of the present application.

As an example, FIG. 27 shows a schematic structural diagram of an electronic device to which an embodiment of the present application is applicable. As shown in FIG. 27, the electronic device 4000 shown in FIG. 27 includes a processor 4001 and a memory 4003. Here, the processor 4001 and the memory 4003 are connected, for example, through a bus 4002. Optionally, the electronic device 4000 may further include a transceiver 4004. It should be noted that in actual applications, the transceiver 4004 is not limited to one, and the structure of the electronic device 4000 does not constitute a limitation to the embodiment of the present application.

The processor 4001 may be a Central Processing Unit (CPU), a general-purpose processor, a Digital Signal Processor (DSP), an Application Specific Integrated Circuit (ASIC), an Field Programmable Gate Array (FPGA), or other programmable logic devices, transistor logic devices, hardware components or any combination thereof. It can implement or execute various exemplary logical blocks, modules and circuits described in conjunction with the disclosure of the present application. The processor 4001 may also be a combination that implements computing functions, for example, including a combination of one or more microprocessors, a combination of a DSP and a microprocessor, and so on.

The bus 4002 may include a path for transferring information between the aforementioned components. The bus 4002 may be a Peripheral Component Interconnect (PCI) bus or an Extended Industry Standard Architecture (EISA) bus or the like. The bus 4002 may be divided into an address bus, a data bus, and a control bus. For ease of presentation, only one thick line is used to represent bus in FIG. 27, but it does not mean that there is only one bus or one type of bus.

The memory 4003 may be Read Only Memory (ROM) or other types of static storage devices that can store static information and instructions, Random Access Memory (RAM) or other types of dynamic storage devices that can store information and instructions. It may also be Electrically Erasable Programmable Read Only Memory (EE-PROM), Compact Disc Read Only Memory (CD-ROM) or other optical disc storage, optical disks storage (including compact optical discs, laser discs, optical discs, digital versatile discs, Blu-ray discs, etc.), magnetic disk storage media or other magnetic storage devices, or any other media that can be used to carry or store desired program codes in the form of instructions or data structures and can be accessed by a computer, but not limited to this.

The memory 4003 is used to store application program codes for executing the solutions of the present application, and the processor 4001 controls the execution. The processor 4001 is configured to execute the application program codes stored in the memory 4003 to implement the content shown in any of the method embodiments.

It should be understood that, although the various steps in the flowchart of the drawings are shown in sequence as indicated by the arrows, these steps are not necessarily executed in sequence in the order indicated by the arrows. Unless explicitly stated herein, the execution of these steps is not strictly limited in order, and they may be executed in other orders. Moreover, at least part of the steps in the flowchart of the drawings may include multiple sub-steps or multiple stages. These sub-steps or stages are not necessarily executed at the same time, but may be executed at different times, and the order of execution is also not necessarily performed sequentially, but may be performed alternately or in turn with other steps or at least a part of sub-steps or stages of other steps.

The above is only part of the implementation of the present application. It should be pointed out that for those of ordinary skill in the art, without departing from the principle of the present application, several improvements and modifications may be made, and these improvements and modifications are also should be regarded as the scope of protection of the present application.

What is claimed is:

1. A video processing method, comprising:
   acquiring first optical flow information of at least one object, surface or edge in a video, wherein the video comprises a sequence of frame images;
   extracting motion features of the at least one object, surface or edge based on the sequence of frame images and the first optical flow information;
   extracting semantic features of at least one level of any first frame image of the sequence of frame images via first cascaded feature extraction layers, wherein the sequence of frame images comprises the first frame image;
   determining a first video clip in which an event occurs, based on the extracted semantic features; and
   generating, based on the motion features of the at least one object, surface or edge, a second video clip based on the first video clip,
   wherein the second video clip is a reduced video clip of the determined first video clip such that the second video clip has a shorter length than the first video clip, and
   wherein the second video clip comprises the occurred event.

2. The method of claim 1, wherein the extracting the motion features of the at least one object, surface, or edge comprises:
   extracting motion features of at least one level of the any second frame image via second cascaded feature extraction layers, based on second optical flow information of the first frame image, wherein the sequence of frame images comprises the second frame image; and
   merging, by at least one second feature extraction layer of the second cascaded feature extraction layers, motion features and semantic features of corresponding levels to provide merged features of the corresponding levels.

3. The method of claim 2, wherein a first number of output channels of the first cascaded feature extraction layers is less than a second number of output channels of the second cascaded feature extraction layers of a corresponding level.

4. The method of claim 2, wherein the merging comprises:
   determining first weight information corresponding to the merged features via a weight determination network;
   weighting the merged features according to the first weight information to obtain weighted merged features; and
   outputting the weighted merged features.

5. The method of claim 4, wherein the first weight information includes second weight information of the motion features and third weight information of the semantic features, and the weighting the merged features comprises weighting the merged features according to the second weight information and the third weight information to obtain the weighted merged features.

6. The method of claim 1, further comprising:

acquiring global optical flow features corresponding to the at least one object, surface, or edge based on the first optical flow information; and merging the motion features of the at least one object, surface, or edge with the global optical flow features, to obtain second motion features of the at least one object, surface, or edge.

7. The method of claim 1, wherein the acquiring the first optical flow information comprises:

determining a motion area of a first frame image of the sequence of frame images;

performing a dense optical flow calculation based on the motion area and an image area of a second frame image, wherein the second frame image is a next frame image with respect to the first frame image, to obtain a dense optical flow of the any frame image; or A) calculating the dense optical flow corresponding to the first frame image based on the first frame image and the second frame image, and B) using a third optical flow of the motion area of the first frame image as the dense optical flow of the first frame image.

8. The method of claim 7, wherein the determining the motion area of the first frame image of the sequence of frame images comprises determining the motion area of the first frame image based on first brightness information of the first frame image and second brightness information of a predetermined number of frame images after the first frame image.

9. The method of claim 8, wherein the determining the motion area based on the first brightness information and the second brightness information comprises:

dividing the first frame image and the predetermined number of frame images into a plurality of image blocks; and determining the motion area based on the first brightness information of the first frame image evaluated at a first position of the first frame image and based on the second brightness information evaluated at the first position in each of the predetermined number of frame images after the first frame image.

10. The method of claim 9, wherein the determining the motion area of the first frame image based on the first position of the first frame image and the first position in each of the predetermined number of frame images comprises:

for at least one image block, determining a first brightness mean and a first brightness variance of a Gaussian background model corresponding to the at least one image block based on the first brightness information of the at least one image block in the first frame image and the second brightness information of the predetermined number of frame images after the first frame image; and determining whether a first pixel in the at least one image block is a motion pixel in the first frame image or whether the at least one image block corresponds to the motion area of the first frame image, based on third brightness information of the first pixel of the at least one image block in the first frame image and the Gaussian background model.

11. The method of claim 1, wherein the determining the first video clip in which the event occurs comprises:

determining motion state representation information of the at least one object, surface, or edge based on the motion features of the at least one object, surface, or edge; and determining the first video clip based on the motion state representation information of the at least one object, surface, or edge.

12. The method of claim 11, wherein the determining the first video clip based on the motion state representation information of the at least one object, surface, or edge further comprises:

performing range merging on the motion state representation information of the at least one object, surface, or edge at least once to obtain a pyramid candidate event range including at least two levels;

determining the motion state representation information of each level of the at least two levels based on the motion state representation information of each frame image corresponding to each level of the at least two levels; and determining the first video clip based on the motion state representation information of each level of the at least two levels.

13. The method of claim 12, wherein the determining the first video clip based on the motion state representation information of the at least one object, surface, or edge further comprises:

for a candidate event range of each level of the at least two levels, determining a target candidate range of a current level;

determining a first video clip range in which the event occurs in video clip ranges corresponding to the target candidate range of the current level, based on the motion state representation information of the target candidate range of the current level; and retaining a second video clip range, wherein the second video clip range is determined in a lowest level as the first video clip in which the event occurs.

14. The method of claim 13, wherein for the determining the target candidate range of the current level comprises:

for a highest level in the candidate event range, determining the candidate event range of the current level as the target candidate range; and for levels other than the highest level, determining, the candidate event range in the current level corresponding to a third video clip range in which the event occurs in a higher level, as the target candidate range.

15. The method according to claim 1, wherein the first optical flow information of the at least one object includes a velocity of pixel motion of at least one object.

16. A video processing device, comprising:

one or more processors configured to:

acquire optical flow information of at least one object, surface or edge in a video, wherein the video comprises a sequence of frame images;

extract motion features of the at least one object, surface or edge based on the sequence of frame images and the optical flow information;

extract semantic features of at least one level of any first frame image of the sequence of frame images via first cascaded feature extraction layers, wherein the sequence of frame images comprises the first frame image;

determine a first video clip in which an event occurs, based on the extracted semantic features; and generate, based on the motion features of the at least one object, surface or edge, a second video clip based on the first video clip, wherein the second video clip is a reduced video clip of the determined first video clip such that the second video clip has a shorter length than the first video clip, and wherein the second video clip comprises the occurred event.

17. The video processing device according to claim 16, wherein the optical flow information of the at least one object includes a velocity of pixel motion of at least one object.

18. A non-transitory computer readable medium having instructions stored therein, which when executed by one or more processors of a computing device cause the computing device to:

acquire optical flow information of at least one object, surface or edge in a video, wherein the video comprises a sequence of frame images;

extract motion features of the at least one object, surface, or edge based on the sequence of frame images and the optical flow information;

extract semantic features of at least one level of any first frame image of the sequence of frame images via first cascaded feature extraction layers, wherein the sequence of frame images comprises the first frame image;

determine a first video clip in which an event occurs, based on the extracted semantic features; and generate, based on the motion features of the at least one object, surface or edge, a second video clip based on the first video clip, wherein the second video clip is a reduced video clip of the determined first video clip such that the second video clip has a shorter length than the first video clip, and wherein the second video clip comprises the occurred event.

19. The non-transitory computer readable medium according to claim 18, wherein the optical flow information of the at least one object includes a velocity of pixel motion of at least one object.

\* \* \* \* \*